US012673319B2

(12) United States Patent
Lin et al.

(10) Patent No.: US 12,673,319 B2
(45) Date of Patent: Jul. 7, 2026

(54) CATALYTIC CRACKING CATALYST AND PROCESS FOR PREPARING THE SAME

(71) Applicants: CHINA PETROLEUM & CHEMICAL CORPORATION, Beijing (CN); RESEARCH INSTITUTE OF PETROLEUM PROCESSING, SINOPEC, Beijing (CN)

(72) Inventors: Wei Lin, Beijing (CN); Xue Yang, Beijing (CN); Min Sun, Beijing (CN); Jihong Zhou, Beijing (CN); Zhenbo Wang, Beijing (CN); Ningyuan Shen, Beijing (CN)

(73) Assignees: CHINA PETROLEUM & CHEMICAL CORPORATION, Beijing (CN); RESEARCH INSTITUTE OF PETROLEUM PROCESSING, SINOPEC, Beijing (CN)

( * ) Notice: Subject to any disclaimer, the term of this patent is extended or adjusted under 35 U.S.C. 154(b) by 707 days.

(21) Appl. No.: 18/003,199

(22) PCT Filed: Jun. 23, 2021

(86) PCT No.: PCT/CN2021/101780

§ 371 (c)(1),
(2) Date: Dec. 23, 2022

(87) PCT Pub. No.: WO2021/259317

PCT Pub. Date: Dec. 30, 2021

(65) Prior Publication Data

US 2023/0249165 A1 Aug. 10, 2023

(30) Foreign Application Priority Data

| | | |
|---|---|---|
| Jun. 23, 2020 | (CN) | 202010581808.9 |
| Jun. 23, 2020 | (CN) | 202010581809.3 |
| Sep. 27, 2020 | (CN) | 202011030810.3 |
| Oct. 15, 2020 | (CN) | 202011103672.7 |
| Nov. 13, 2020 | (CN) | 202011268563.0 |
| Nov. 25, 2020 | (CN) | 202011344700.4 |

(51) Int. Cl.
| | |
|---|---|
| *B01J 29/80* | (2006.01) |
| *B01J 6/00* | (2006.01) |
| *B01J 29/08* | (2006.01) |
| *B01J 35/64* | (2024.01) |
| *B01J 37/00* | (2006.01) |
| *B01J 37/04* | (2006.01) |
| *B01J 37/30* | (2006.01) |
| *C10G 11/05* | (2006.01) |

(52) U.S. Cl.
CPC ............... *B01J 29/80* (2013.01); *B01J 6/001* (2013.01); *B01J 29/088* (2013.01); *B01J 35/643* (2024.01); *B01J 37/0045* (2013.01); *B01J 37/04* (2013.01); *B01J 37/30* (2013.01); *C10G 11/05* (2013.01); *B01J 2229/42* (2013.01)

(58) Field of Classification Search
CPC ...... B01J 29/80; B01J 35/643; B01J 37/0045; B01J 37/30; B01J 2229/42; C10G 11/05
See application file for complete search history.

(56) References Cited

U.S. PATENT DOCUMENTS

| | | | |
|---|---|---|---|
| 3,574,538 A | | 4/1971 | Mcdaniel et al. |
| 3,639,099 A | | 2/1972 | Elliott, Jr. et al. |
| 3,671,191 A | | 6/1972 | Maher et al. |
| 4,166,099 A | | 8/1979 | Mcdaniel et al. |
| 2004/0266607 A1 | | 12/2004 | Zhou et al. |
| 2019/0375646 A1* | | 12/2019 | Zhou ...................... B01J 35/647 |

FOREIGN PATENT DOCUMENTS

| | | | |
|---|---|---|---|
| CN | 1533982 | A | 10/2004 |
| CN | 1621349 | A | 6/2005 |
| CN | 1709794 | A | 12/2005 |
| CN | 1743422 | A | 3/2006 |
| CN | 101468803 | A | 7/2009 |
| CN | 101940941 | A | 1/2011 |
| CN | 102133542 | A | 7/2011 |
| CN | 102553630 | A | 7/2012 |
| CN | 102974384 | A | 3/2013 |
| CN | 103043680 | A | 4/2013 |
| CN | 103657712 | A | 3/2014 |
| CN | 112142064 | A | 12/2020 |
| EP | 0209332 | B1 | 6/1989 |
| EP | 0435625 | A2 | 7/1991 |
| RU | 2064835 | C1 | 8/1996 |
| RU | 2399415 | C2 | 9/2010 |
| RU | 2673811 | C1 | 11/2018 |

* cited by examiner

*Primary Examiner* — Anthony J Zimmer
*Assistant Examiner* — Annette Phan
(74) *Attorney, Agent, or Firm* — NKL Law; Allen Xue

(57) ABSTRACT

A catalytic cracking catalyst contains 10-70 wt % of a cracking active component, 10-60 wt % of a binder and 10-70 wt % of a clay. The cracking active component has 5-100 wt % of a first Y-type molecular sieve and 0-95 wt % of a second molecular sieve. The first Y-type molecular sieve is a modified molecular sieve based on the crystal modification of kaolin and has the sodium oxide content of less than 2 wt %. The process for preparing the catalyst includes the steps of vigorously mixing and stirring a cracking active component comprising a modified molecular sieve based on the crystal modification of kaolin, a binder and a clay with water; spray drying; washing; filtering; and drying. The catalyst is used in the catalytic cracking reaction of heavy oils, and has a good coke selectivity, as well as a higher heavy oil conversion rate.

23 Claims, No Drawings

CATALYTIC CRACKING CATALYST AND PROCESS FOR PREPARING THE SAME

TECHNICAL FIELD

The present invention relates to a catalytic cracking catalyst, and more particularly to a catalytic cracking catalyst with low coke formation and a process for preparing the same.

BACKGROUND TECHNOLOGY

Fluid catalytic cracking (FCC) is an important secondary processing process of crude oil and occupies a pivotal position in the oil refining industry. In the catalytic cracking process, heavy fractions such as vacuum distillate oil or heavier fractions such as residual oil react in the presence of catalyst and are converted into high additional value products such as liquefied gas, gasoline, and diesel oil. In this process, it is usually necessary to use catalytic materials with high cracking activity. Y-type zeolite is widely used in catalytic cracking reactions due to its excellent shape-selective catalytic performance and high cracking reaction activity. Y-type zeolite is obtained through two techniques: one technique is to use alkaline silica-alumina gel synthesis to obtain Y-type zeolite, then mix Y-type zeolite with matrix, and spray-dry to obtain microsphere catalyst. The Y-type zeolite synthesized by silica-alumina gel has the characteristics of high molecular sieve content and high silica-alumina ratio. Different modification methods can have various reaction characteristics; another technology is in-situ crystallization technology, in which microspheres are firstly formed, and then crystallized on the microspheres to form molecular sieves, so that catalyst microspheres containing both the active component-molecular sieves and non-molecular sieve components are directly obtained. The catalyst synthesized by in-situ crystallization technology has strong resistance to heavy metal pollution, high activity index, hydrothermal stability, good structural stability and so on. However, when the existing Y-type molecular sieve synthesized by in-situ crystallization is used for heavy oil conversion, the coke yield is relatively high.

Bao Xiaojun (CN103043680A) used natural kaolin minerals and natural diatomite minerals to provide all the silicon and aluminum sources for molecular sieve synthesis, and used them as substrate for molecular sieve growth to form crystal products through in-situ crystallization. In the composite material, the weight percentage content of the NaY molecular sieve is 25%-50%, and the silica-alumina ratio of the NaY molecular sieve is 3-5.5.

ZHENG Shuqin (Synthesis of hierarchical catalytic materials from Si—Al gel and kaolin by hydrothermal crystallization, ACTA PETROLEI SINICA (Petroleum Processing Section), V30 (1), 32-37) reported that a Si—Al gel and kaolin were used to hydrothermally synthesize hierarchical porous catalytic material, and its process was as follows: water glass and sodium metaaluminate were used as silicon source and aluminum source respectively to prepare the Si—Al gel, then the Si—Al gel and kaolin were sprayed into shperes, and then the synthesis was performed.

The above publications do not relate to how to reduce the coke selectivity of the catalyst containing in-situ crystallized Y-type molecular sieve for heavy oil conversion.

SUMMARY OF THE INVENTION

Aiming at the problem of high coke formation of in-situ crystallized Y-type molecular sieve catalytic cracking catalyst in the prior art, the technical problem to be solved by the invention is to provide a catalytic cracking catalyst with less coke formation under the condition of higher heavy oil conversion rate, which contains as active component a molecular sieve based on the crystal modification of kaolin.

A catalytic cracking catalyst, comprising 10-70 wt % of a cracking active component, 10-60 wt % of a binder and 10-70 wt % of a clay, wherein the cracking active component comprises 5-100 wt % of a first Y-type molecular sieve and 0-95 wt % of a second molecular sieve; wherein the first Y-type molecular sieve is a modified molecular sieve based on the crystal modification of kaolin, the modified molecular sieve based on the crystal modification of kaolin is obtained from the modification of a molecular sieve based on the crystal modification of kaolin.

For the molecular sieve based on the crystal modification of kaolin, when measured with an X-ray diffraction method, the crystallinity by the peak height method is $\geq 60\%$, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina. The crystallinity by the peak height method is $\geq 80\%$. The K1=0.80-0.89 or the K1=0.80-0.85. The K2=0.87-0.92 or the K2=0.88-0.90.

In a preferable embodiment, for the molecular sieve based on the crystal modification of kaolin, K1=0.77-0.88, and K2=0.87-0.91.

In an embodiment, the molecular sieve based on the crystal modification of kaolin has a proportion of macropores and mesopores of 10-20%.

In an embodiment, the molecular sieve based on the crystal modification of kaolin has the silica-alumina ratio measured with the unit cell constant a0 of 5.2-5.5.

In a preferable embodiment, the modified molecular sieve based on the crystal modification of kaolin contains rare earth (the rare earth-containing modified Y-type molecular sieve is also known as the rare earth-containing molecular sieve based on the crystal modification of kaolin), and its rare earth content, as $RE_2O_3$, is preferably 10-20 wt %. If the rare earth content of the modified molecular sieve based on the crystal modification of kaolin is within the above-mentioned content range, the catalytic cracking catalyst may have a higher heavy oil conversion activity.

The present invention provides a process for preparing the catalytic cracking catalyst, comprising the following steps:

(S1) preparing a modified molecular sieve based on the crystal modification of kaolin;

(S2) making a clay, a cracking active component (comprising a modified molecular sieve based on the crystal modification of kaolin and an optional second molecular sieve) and a binder form a slurry;

(S3) spray-drying the slurry obtained in step S2.

According to the process for preparing the catalytic cracking catalyst provided by the present invention, the modified molecular sieve based on the crystal modification of kaolin is a modified molecular sieve based on the crystal modification of kaolin obtained from the modification treatment of a molecular sieve based on the crystal modification of kaolin (also known as a molecular sieve synthesized by in-situ crystallization).

According to the process for preparing the catalytic cracking catalyst provided by the present invention, the modified molecular sieve based on the crystal modification of kaolin can be obtained by the modification treatment of the molecular sieve based on the crystal modification of kaolin. The molecular sieve based on the crystal modification of kaolin is a Y-type molecular sieve composite, when measured with an X-ray diffraction method, for the molecular sieve based on the crystal modification of kaolin (or known as the Y-type molecular sieve composite), the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, the K2=0.87-0.90, the silica-alumina ratios are both the molar ratio of silica to alumina. The modified molecular sieve based on the crystal modification of kaolin is a molecular sieve material obtained from the modification treatment of the molecular sieve based on the crystal modification of kaolin, and the modification treatment is to reduce the sodium oxide content in the molecular sieve based on the crystal modification of kaolin to 2 wt % or less, and the modification treatment is for example the ion-exchanging.

The molecular sieve based on the crystal modification of kaolin according to the present invention has a sphere-like shape of 5-20 micrometers, wherein the crystallinity by the peak height method is ≥60%, that is, the weight percentage content of the NaY molecular sieve is at least 60%. Preferably, the crystallinity by the peak height method is greater than 75%, more preferably ≥80%.

According to the crystal crystallization common knowledge, the difference between the crystallinity measured by the peak height method and the crystallinity measured by the peak area method is related to the size of crystal grains. According to the Y-type molecular sieve composite of the present invention (referred to as the composite), the crystal grain coefficient K1 is set, $K1=S_{peak\ height}/S_{peak\ area}$, that is, the ratio of the crystallinity by the peak height method to the crystallinity by the peak area method. The size of the K1 value indicates the size of the crystal grains, and larger the K1 value is, larger the particle diameter of the crystal grains is. Preferably, K1 is 0.80-0.89, more preferably 0.80-0.85.

The molar ratio of silica to alumina calculated from the unit cell constant a0 is the framework silica-alumina ratio of the molecular sieve, and the molar ratio of silica to alumina measured with the chemical method is the whole silica-alumina ratio of the composite. The molecular sieve based on the crystal modification of kaolin according to the present invention has a framework silica-alumina ratio of 5.0-5.5, preferably 5.2-5.5, calculated and determined by the unit cell constant a0, and the whole silica-alumina ratio determined by the chemical method is the macroscopic silica-alumina ratio of the whole material. These two values, i.e. the framework silica-alumina ratio and the whole silica-alumina ratio, are related to the framework integrality and purity of the molecular sieve in the composite. The molecular sieve based on the crystal modification of kaolin according to the present invention is obtained from the crystal modification of metakaolin, in which a part of metakaolin is present in an intermediate that is in the crystal modification (crystal transformation) into the Y-type molecular sieve. Therefore, the intermediate coefficient K2 is set, that is, K2=framework silica-alumina ratio/whole silica-alumina ratio. The size of the K2 value indicates the composite degree of the composite, the smaller the K2 value is, the more intermediates it contains. Preferably, K2 is 0.87-0.92, more preferably 0.88-0.90.

For the molecular sieve based on the crystal modification of kaolin according to the present invention (also known as the Y-type molecular sieve composite), preferably, the K1=0.77-0.88, for example the K1=0.81-0.88 or the K1=0.86-0.88 and the K2=0.87-0.91.

In the present invention, pores with the pore diameter larger than 0.8 nm are defined as mesopores and macropores. The molecular sieve based on the crystal modification of kaolin according to the present invention has an appropriate proportion of mesopores and macropores, which can be 10-20%.

According to the process for preparing the catalytic cracking catalyst provided by the present invention, the molecular sieve based on the crystal modification of kaolin according to the present invention is a Y-type molecular sieve composite, which can be prepared by a process, comprising the following steps: (1) converting kaolin into metakaolin by calcining and dehydrating at 500-900° C., and pulverizing it into metakaolin powder with a particle size of less than 10 microns; (2) adding a directing agent, sodium silicate, a sodium hydroxide solution and water to the metakaolin powder to produce a reaction raw material A having a molar composition of (1-2.5) $Na_2O$:$Al_2O_3$:(4-9) $SiO_2$:(40-100)$H_2O$, wherein the mass ratio of the directing agent to the metakaolin is 0.01-1.0; (3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon; (4) crystallizing the reaction raw material B under stirring at 88-98° C. and recovering the product.

According to the process for preparing the catalytic cracking catalyst provided by the present invention, in the process for preparing the molecular sieve based on the crystal modification of kaolin, the directing agent can be synthesized according to the conventional methods, for example, according to the preparation processes disclosed in U.S. Pat. Nos. 3,574,538, 3,639,099, 3,671,191, 4,166,099 or EUP0435625. The directing agent can have a molar composition of (10-17)$SiO_2$:(0.7-1.3)$Al_2O_3$:(11-18)$Na_2O$:(200-350)$H_2O$. During synthesis, the raw materials are aged at 4-35° C., preferably 4-20° C. to obtain the directing agent.

According to the process for preparing the catalytic cracking catalyst provided by the present invention, in the process for preparing the molecular sieve based on the crystal modification of kaolin, the second silicon source can have a sodium content as $Na_2O$ of 0.01-10 wt %, preferably <1 wt %. Considering the cost control, the preferred second silicon source is a solid silica gel. The solid silica gel is included in the total synthesis formulation, and the used solid silica gel may be solid silica gels with different pore sizes. The pore size is used for the category, and the silica gel comprises microporous silica gel, macroporous silica gel and mesoporous silica gel between microporous silica gel and macroporous silica gel. Conventionally, the silica gel having an average pore size of below 1.5-2.0 nm is referred to as the microporous silica gel (for example Type A solid silica gel from Qingdao Ocean Chemical Engineering Group Special Silica Gel Factory), the silica gel having an average pore size of above 4.0-5.0 nm is referred to as the macroporous silica gel (for example Type C solid silica gel from Qingdao Ocean Chemical Engineering Group Special Silica Gel Factory); moreover, the silica gel having an average pore size of above 10.0 nm is referred to as the ultra-macroporous silica gel, the silica gel having an average pore size of 0.8 nm or less is referred to as the ultra-microporous silica gel (for example Type B solid silica gel from Qingdao Ocean Chemical Engineering Group Special Silica Gel Factory). The second silicon source can also be a liquid silica gel. When the liquid silica gel is used as the second silicon source, preferably, the $SiO_2$ content thereof is at least 30 wt %.

According to the process for preparing the catalytic cracking catalyst provided by the present invention, in the process for preparing the molecular sieve based on the crystal modification of kaolin, a hierarchical Y-type molecular sieve composite product containing mesopores and macropores is obtained by crystallization under stirring. The stirring rate for crystallization can be, but is not limited to 50-1000 rpm, preferably 300-500 rpm, and the time for crystallization can be, but is not limited to 16-48 hours, preferably 24-32 hour. The drying temperature of the zeolite after crystallization is 100-120° C.

According to the process for preparing the catalytic cracking catalyst provided by the present invention, in the process for preparing the molecular sieve based on the crystal modification of kaolin, both as silica, the second silicon source comprises 0.1-10 wt %, preferably 4-10 wt % of the total amount of the added silicon.

According to the process for preparing the catalytic cracking catalyst provided by the present invention, in the process for preparing the molecular sieve based on the crystal modification of kaolin, sodium silicate and the second silicon source are supplemented into the synthesis preparation system in different processes, especially the period when the second silicon source is added is during the crystal growth period. The present invention combines a technology of controlling a synthesis ratio by means of adding different silicon sources in different stages of the crystallization process and a technology of the kaolin in-situ crystallization synthesis (using natural minerals as main aluminum sources and silicon sources), changes a crystal growth environment through the silicon sources, and adopts two completely different material proportions in two stages of a crystal nucleation period and a crystal growth period. In the crystal nucleation period, the present invention uses a higher sodium-silicon ratio ($Na_2O/SiO2$) in the material, which is beneficial to the rapid nucleation of the Y-type molecular sieve, and in the crystal growth period, a low-sodium or sodium-free silicon source is added, so that the sodium-silicon ratio ($Na_2O/SiO_2$) in the material is reduced while the silica-alumina ratio ($SiO_2/Al_2O_3$) in the synthetic material is increased, which is beneficial to increasing the silica-alumina ratio of the product, and raising the framework silica-alumina ratio to 5.0-5.5, on the premise of shortening the crystallization time.

According to the process for preparing the catalytic cracking catalyst provided by the present invention, in the preparation step (4) of the molecular sieve based on the crystal modification of kaolin, the product is recovered after the completion of crystallization to produce the molecular sieve based on the crystal modification of kaolin. Said recovering generally includes a step of filtering, and optionally, may also include one or more operations of washing, drying, and calcining. According to the process for preparing the catalytic cracking catalyst provided by the present invention, the process for preparing the modified molecular sieve based on the crystal modification of kaolin includes: subjecting the recovered product to a modification treatment such as ion-exchanging to produce a modified molecular sieve based on the crystal modification of kaolin. According to the process for preparing the catalytic cracking catalyst provided by the present invention, the obtained molecular sieve based on the crystal modification of kaolin can be processed by any method capable of reducing the sodium content therein so that the sodium oxide content therein does not exceed 2 wt %, for example, by the ion-exchanging to produce the modified molecular sieve based on the crystal modification of kaolin. The ion-exchanging can be carried out with ammonium salt and/or rare earth salt solution, which is not particularly required in the present invention. Preferably, the ion-exchanging is carried out so that the modified molecular sieve based on the crystal modification of kaolin has the rare earth content as $RE_2O_3$ of 10-20 wt %, and the sodium oxide content of less than 2 wt %. In one embodiment, the molecular sieve based on the crystal modification of kaolin is mixed with the exchange solution, and the mixture is stirred at 20-90° C. for 10-120 minutes. The above process can be carried out one or more times, and the exchange solution for each exchange can contain ammonium ions, rare earth ions or both ammonium ions and rare earth ions. Preferably, the ammonium salt concentration in the exchange solution is 5-700 g/L, such as 5-100 g/L and/or the rare earth salt concentration is 5-400 g/L, such as 5-200 g/L as $RE_2O_3$. The ammonium salt is, for example, one or more of ammonium chloride, ammonium nitrate, and ammonium sulfate. The rare earth salt is, for example, one or more of rare earth chlorides and rare earth nitrates. The rare earth may include one or more of lanthanide series rare earths and actinide series rare earths, for example one or more of La, Ce, Pr, Nd, Pm, Sm, Eu, Gd, Tb, Dy, Ho, Er, Tm, Yb, and Lu.

According to the process for preparing the catalytic cracking catalyst provided by the present invention, the molecular sieve based on the crystal modification of kaolin, can be subjected to one or more steps of filtering, washing, drying and calcining after being subjected to ion exchange. These steps can refer to the filtering, washing, drying and calcining methods well known to those skilled in the art.

According to the process for preparing the catalytic cracking catalyst provided by the present invention, the step S2 of making a clay, a modified molecular sieve based on the crystal modification of kaolin, an optional second molecular sieve and a binder form a slurry can be performed by mixing the clay, the modified molecular sieve based on the crystal modification of kaolin, the optional second molecular sieve, the binder and water and stirring evenly.

According to the process for preparing the catalytic cracking catalyst provided by the present invention, in step S3, the slurry obtained in step S2 is spray-dried to obtain catalyst microsphere particles, and the catalyst microsphere particles can be further calcined and/or washed, and the washing can be carried out before and/or after the calcining. The spray-drying, washing and calcining can be carried out according to the existing methods of spray-drying and calcining in the production of the catalytic cracking catalyst. For example, the washing is performed with an ammonium salt solution, and the calcining can be performed at 350-650° C., and the calcining time can be 1-4 hours.

The catalytic cracking catalyst provided by the present invention has good coke formation selectivity, and can reduce coke selectivity on the basis of higher hydrocarbon oil conversion catalytic activity. Preferably, the catalytic cracking catalyst provided by the present invention can also have higher hydrocarbon oil conversion activity and/or liquid product yield.

DETAILED DESCRIPTION

The following specific embodiments and examples are used to further illustrate the present invention. It should be understood that the specific embodiments described herein are only used to illustrate and explain the present invention and are not intended to limit the present invention.

The catalytic cracking catalyst provided by the present invention comprises 10-70 wt %, for example 20-60 wt %, or 25-65 wt % of a cracking active component, 10-60 wt %, for example 20-45 wt % of a binder and 10-70 wt %, for example 20-60 wt %, or 25-55 wt % of a clay, wherein the cracking active component comprises 5-100 wt %, for example 40-100 wt % of a first Y-type molecular sieve and 0-95 wt %, for example 0-60 wt % of a second molecular sieve.

The catalytic cracking catalyst provided by the present invention can also contain a second molecular sieve, the second molecular sieve is preferably faujasite and/or pentasil molecular sieve, the faujasite is for example one or more of HY, REY, REHY, USY, REUSY, DASY and REDASY. The pentasil molecular sieve is for example BEA structure molecular sieve, MFI structure molecular sieve, or mordenite, preferably one or more of BEA structure molecular sieve, and MFI structure molecular sieve. The BEA structure molecular sieve can be obtained by crystallization without amine, or can be obtained by calcining a molecular sieve prepared from the template agent method, for example, the BEA structure molecular sieve is for example beta molecular sieve; the MFI structure molecular sieve is for example at least one of rare earth-containing MFI structure molecular sieve, phosphorus-containing MFI structure molecular sieve, Fe-containing MFI structure molecular sieve, and phosphorus- and transition metal-containing MFI structure molecular sieve; the mordenite is for example at least one of high silica mordenite and low silica mordenite.

The catalytic cracking catalyst provided by the present invention may contain a clay, the clay can be one or more of kaolin, giagerite, montmorillonite, diatomite, halloysite, metahalloysite, saponite, rectorite, sepiolite, attapulgite, hydrotalcite and bentonite.

The catalytic cracking catalyst provided by the present invention may contain a binder, and the binder can be one or more of silica sol, alumina sol, acidified pseudo-boehmite, and metal-modified pseudo-boehmite.

In the catalytic cracking catalyst provided by the present invention, the first Y-type molecular sieve is a modified molecular sieve based on the crystal modification of kaolin, preferably a rare earth-containing molecular sieve based on the crystal modification of kaolin, having the rare earth content as $RE_2O_3$ of 10-20 wt %, and the sodium oxide content of not more than 2 wt %, preferably not more than 1.5 wt %.

In an embodiment, the modified molecular sieve based on the crystal modification of kaolin is prepared according to the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction slurry, wherein the mass ratio of the directing agent to the metakaolin is 0.01-1.0;

(3) crystallizing the reaction slurry obtained in step (2) at 88-98° C. under stirring for 1-70 hours, for example, 5-40 hours or 6-30 hours or 8-16 hours, then supplementing a solid silica gel, wherein the mass ratio of the solid silica gel to the metakaolin is 0.01-1.0;

(4) crystallizing the reaction raw material obtained in step (3) under stirring at 88-98° C. for 1-20 hours, for example, 8-20 hours or 12-16 hours, then filtering and drying to produce a molecular sieve based on the crystal modification of kaolin and synthesized by in-situ crystallization; and (5) contacting the resulting molecular sieve based on the crystal modification of kaolin and synthesized by in-situ crystallization with ammonium salt and/or rare-earth salt solution for the ion-exchanging, then filtering, washing, drying, and calcining to produce a modified molecular sieve based on the crystal modification of kaolin, wherein the modified molecular sieve based on the crystal modification of kaolin has the rare earth content as $RE_2O_3$ of preferably 10-20 wt %, and the sodium oxide content of less than 2 wt %. The contacting can be carried out one or more times, and each contacting exchange can be carried out with a solution containing rare earth ions and ammonium ions simultaneously for ion-exchanging, and can also be carried out with a solution containing one of two ions for either ammonium ion exchanging or rare earth ion exchanging.

In an embodiment, in the molecular sieve based on the crystal modification of kaolin and synthesized by in-situ crystallization, there are 20%-30% by weight of metakaolin, which is present as an intermediate that is in the crystal modification (crystal transformation) into the Y-type molecular sieve. Due to the presence of the intermediate, K2 is in the range of 0.87-0.93.

The present invention aims to provide a catalyst with good catalytic activity. When the catalyst is used in catalytic cracking reaction, the catalyst can achieve at least one, two, three or all of the following properties: (1) good wear resistance, (2) low coke selectivity, (3) high heavy oil conversion rate and high total liquid yield, (4) strong metal pollution resistance; and the catalyst can be used for catalytic cracking of hydrocarbon oil (such as heavy oil), for example, for production of lower carbon olefins.

To achieve the above objects, the present invention provides the following six groups of technical solutions:

[Group A]

1. A catalytic cracking catalyst, comprising 10-70 wt % of a cracking active component, 10-60 wt % of a binder and 10-70 wt % of a clay, wherein the cracking active component comprises 5-100 wt % of a first Y-type molecular sieve and 0-95 wt % of a second molecular sieve; wherein the first Y-type molecular sieve is a modified molecular sieve based on the crystal modification of kaolin obtained from the modification treatment of a molecular sieve based on the crystal modification of kaolin, and has a sodium oxide content of less than 2 wt %.

2. The catalytic cracking catalyst according to technical solution 1 of Group A, wherein for the molecular sieve based on the crystal modification of kaolin, when measured with an X-ray diffraction method, the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

3. The catalytic cracking catalyst according to technical solution 2 of Group A, wherein the crystallinity by the peak height method is ≥80%.

4. The catalytic cracking catalyst according to technical solution 2 of Group A, wherein the K1=0.80-0.89.

5. The catalytic cracking catalyst according to technical solution 2 of Group A, wherein the K1=0.80-0.85.

6. The catalytic cracking catalyst according to technical solution 2 of Group A, wherein the K2=0.87-0.92.

7. The catalytic cracking catalyst according to technical solution 2 of Group A, wherein the K2=0.88-0.90.

8. The catalytic cracking catalyst according to technical solution 2 of Group A, wherein the K1=0.77-0.88 and the K2=0.87-0.91.

9. The catalytic cracking catalyst according to technical solution 2 of Group A, wherein the molecular sieve based on the crystal modification of kaolin have a proportion of macropores and mesopores of 10-20%.

10. The catalytic cracking catalyst according to technical solution 2 of Group A, wherein the silica-alumina ratio measured with the unit cell constant a0 is 5.2-5.5.

11. The catalytic cracking catalyst according to technical solution 1 or 2 of Group A, wherein the molecular sieve based on the crystal modification of kaolin is prepared with a process comprising the steps of:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A, wherein the mass ratio of the directing agent to the metakaolin is 0.01-1.0, and the reaction raw material A has a composition by molar ratio of $(1\text{-}2.5)Na_2O:Al_2O_3:(4\text{-}9)SiO_2:(40\text{-}100)H_2O$;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product. 12. The catalytic cracking catalyst according to any of technical solutions 1-11 of Group A, wherein the modified molecular sieve based on the crystal modification of kaolin contains rare earth, the modified molecular sieve based on the crystal modification of kaolin has the content of rare earth as $RE_2O_3$ of 10-20 wt %.

13. The catalytic cracking catalyst according to technical solution 1 of Group A, wherein the second molecular sieve is selected from faujasite and/or pentasil molecular sieve; for example, the faujasite is one or more of HY, REY, REHY, USY, REUSY, DASY and REDASY; the pentasil molecular sieve comprises one or more of BEA structure molecular sieve, MFI structure molecular sieve, and mordenite; the binder is one or more of silica sol, alumina sol, acidified pseudo-boehmite, and metal-modified pseudo-boehmite; the clay is one or more of kaolin, montmorillonite, diatomite, halloysite, metahalloysite, saponite, rectorite, sepiolite, attapulgite, hydrotalcite and bentonite.

14. A process for preparing the catalytic cracking catalyst according to any of technical solutions 1-13 of Group A, comprising the following steps:

(1) preparing a modified molecular sieve based on the crystal modification of kaolin;

(2) making a clay, a cracking active component and a binder form a slurry; the cracking active component comprises the modified molecular sieve based on the crystal modification of kaolin and an optional second molecular sieve;

(3) spray-drying the slurry obtained in step (2).

15. The process for preparing the catalytic cracking catalyst according to technical solution 14 of Group A, wherein the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1\text{-}2.5)Na_2O:Al_2O_3:(4\text{-}9)SiO_2:(40\text{-}100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product;

(5) ion-exchanging the recovered product.

16. The process for preparing the catalytic cracking catalyst according to technical solution 15 of Group A, wherein the directing agent has a composition of $(10\text{-}17)SiO_2:(0.7\text{-}1.3)Al_2O_3:(11\text{-}18) Na_2O:(200\text{-}350)H_2O$.

17. The preparation process according to technical solution 15 of Group A, wherein the second silicon source has the sodium content as $Na_2O$ of <1 wt %.

18. The process for preparing the catalytic cracking catalyst according to technical solution 15 or 17 of Group A, wherein the second silicon source is a solid silica gel.

19. The process for preparing the catalytic cracking catalyst according to technical solution 18 of Group A, wherein the solid silica gel has an average pore size of 1.5-2.0 nm, or the solid silica gel has an average pore size of 4.0-5.0 nm, or the solid silica gel has an average pore size of 10.0 nm or more, or the solid silica gel has an average pore size of 0.8 nm or less.

20. The process for preparing the catalytic cracking catalyst according to technical solution 15 or 17 of Group A, wherein the second silicon source is a liquid silica gel.

21. The process for preparing the catalytic cracking catalyst according to technical solution 20 of Group A, wherein the liquid silica gel has the $SiO_2$ content by weight of 1-30%.

22. The process for preparing the catalytic cracking catalyst according to technical solution 15 of Group A, wherein both as silica, the second silicon source comprises 4-10 wt % of the total amount of the added silicon.

23. The process for preparing the catalytic cracking catalyst according to technical solution 15 of Group A, wherein the ion-exchanging in step (5) is the ammonium ion exchanging and/or the rare earth ion exchanging.

24. The process for preparing the catalytic cracking catalyst according to technical solution 15 or 23 of Group A, wherein the ion-exchanged product obtained from step (5) is further calcined.

25. The process for preparing the catalytic cracking catalyst according to technical solution 15 or 24 of Group A, wherein the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

26. A catalytic cracking process, which comprises a step of contacting a hydrocarbon oil with the catalytic cracking catalyst according to any of technical solutions 1-13 of Group A to react.

[Group B]

1. A silica-alumina material, which has an anhydrous chemical formula by weight of $(0-1)Na_2O \cdot (15-50)$ $Al_2O_3 \cdot (85-50)SiO_2$, a most probable pore size of 10-100 nm, a specific surface area of 150-600 $m^2/g$, a pore volume of 0.5-1.5 mL/g, and a proportion of the pore volume of the pores having a pore diameter of greater than 10 nm to the total pore volume of 70%-98%.

2. The silica-alumina material according to technical solution 1 of Group B, wherein the silica-alumina material contains pseudo-boehmite crystal grains, and the average size of pseudo-boehmite crystal grains is 1.5 nm-3.5 nm.

3. The silica-alumina material according to technical solution 1 of Group B, wherein the silica-alumina material has a pore volume of 0.8-1.5 mL/g.

4. The silica-alumina material according to technical solution 1 of Group B, wherein the silica-alumina material has a specific surface area of 280-450 $m^2/g$.

5. The silica-alumina material according to technical solution 1 of Group B, wherein the silica-alumina material has a $SiO_2:Al_2O_3$ weight ratio of 2-4:1.

6. The process for preparing the silica-alumina material according to any of technical solutions 1-5 of Group B, comprising the following steps:

(1) an alkaline silicon source is gradually added to an acidic aluminum source according to the weight ratio of $SiO_2:Al_2O_3=(50-85):(50-15)$ at a temperature between room temperature and 95° C.;

(2) After all the alkaline silicon source is added to the acidic aluminum source, then an alkaline solution is added until the pH value of the slurry is 8-10.5, and then the slurry is aged at 50-95° C. for 1-10 hours to obtain a solid precipitate;

(3) contacting the solid precipitate with a solution containing an ammonium salt and/or an acid, and filtering to produce a silica-alumina material having the sodium content as $Na_2O$ of below 1 wt %, wherein the solid precipitate is optionally dried before contacting with the solution containing an ammonium salt and/or an acid.

7. The process for preparing the silica-alumina material according to technical solution 6 of Group B, wherein the acidic aluminum source is selected from aluminum sulfate, aluminum chloride, alumina sol, and an acidic hydrolysis product of aluminum alkoxide, the aluminum alkoxide is for example one or more of aluminium isopropoxide, aluminium sec-butoxide, aluminium triethoxide, and the like.

8. The process for preparing the silica-alumina material according to technical solution 6 of Group B, wherein the alkaline silicon source is selected from an alkaline silica sol, water glass, sodium silicate, and an alkaline hydrolysis product of silicate ester, the silicate ester is for example one or more of tetramethyl orthosilicate, tetraethyl silicate, tetraisopropyl orthosilicate, tetrabutyl orthosilicate, and the like.

9. The process for preparing the silica-alumina material according to technical solution 6 of Group B, wherein the alkaline solution is one or more of ammonia water, sodium hydroxide solution, potassium hydroxide solution, sodium metalluminate solution, further preferably sodium metalluminate solution.

10. The process for preparing the silica-alumina material according to technical solution 6 of Group B, wherein the treatment by contacting the solid precipitate with a solution containing an ammonium salt and/or an acid comprises: contacting the resulting solid precipitate with the solution containing an ammonium salt at a temperature between room temperature and 100° C. according to the weight ratio of the solid precipitate (dry basis):ammonium salt:$H_2O$=1:(0.05-0.1):(5-30).

11. The process for preparing the silica-alumina material according to technical solution 6 or 10 of Group B, wherein the ammonium salt is one or more of ammonium chloride, ammonium sulfate, ammonium nitrate, ammonium carbonate and ammonium bicarbonate.

12. The process for preparing the silica-alumina material according to technical solution 6 of Group B, wherein the solution containing an ammonium salt and/or an acid is an acid solution, the treatment by contacting the solid precipitate with the solution containing an ammonium salt and/or an acid is to contact the solid precipitate with the acid solution at a temperature between room temperature and 100° C. for at least 0.5 hour, for example 0.5-2 hours according to the weight ratio of the solid precipitate (dry basis):acid:$H_2O$=1:(0.03-0.3): (5-30), the contacting (exchanging) can be performed one or more times.

13. The process for preparing the silica-alumina material according to technical solution 6 or 12 of Group B, wherein the acid is one or more of sulfuric acid, hydrochloric acid and nitric acid.

14. The process for preparing the silica-alumina material according to any of technical solutions 6-13 of Group B, wherein the treatment by contacting with the solution containing an ammonium salt and/or an acid is performed one or more times, each contacting for 0.5-1 hours, until the sodium oxide content in the solid precipitate is below 1 wt %.

15. The silica-alumina material obtained from the process for preparing the silica-alumina material according to any of technical solutions 6-14 of Group B.

16. A catalytic cracking catalyst, comprising 10-70 wt % of a cracking active component, 1-20 wt % of a silica-alumina material, 10-60 wt % of a binder and 10-70 wt % of a clay; wherein, the cracking active component comprises 25-100 wt % of a first Y-type molecular sieve and 0-75 wt % of a second molecular sieve; the first Y-type molecular sieve is a Y-type molecular sieve synthesized by in-situ crystallization having a sodium oxide content of less than 2 wt %, the silica-alumina material is the silica-alumina material according to any of technical solutions 1-5 of Group B or technical solution 15 of Group B.

17. The catalytic cracking catalyst according to technical solution 16 of Group B, wherein the Y-type molecular sieve synthesized from kaolin by in-situ crystallization having the sodium oxide content of less than 2 wt % contains rare earth, wherein the rare earth content as $RE_2O_3$ is 10-20 wt %.

18. The catalytic cracking catalyst according to technical solution 16 or 17 of Group B, wherein the Y-type molecular sieve synthesized from kaolin by in-situ crystallization having the sodium oxide content of less than 2 wt % is a modified molecular sieve based on the crystal modification of kaolin, the modified molecular sieve based on the crystal modification of kaolin is obtained by the treatment of reducing the sodium content and/or the treatment of introducing the rare earth from a molecular sieve based on the crystal modification of kaolin, the modified molecular sieve based on the crystal modification of kaolin has the sodium oxide content of less than 2 wt %.

19. The catalytic cracking catalyst according to technical solution 18 of Group B, wherein for the molecular sieve based on the crystal modification of kaolin, when measured with an X-ray diffraction method, the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

20. The catalytic cracking catalyst according to technical solution 19 of Group B, wherein the crystallinity by the peak height method is ≥80%.

21. The catalytic cracking catalyst according to technical solution 19 of Group B, wherein the K1=0.77-0.88, and the K2=0.87-0.91.

22. The catalytic cracking catalyst according to technical solution 19 or 21 of Group B, wherein the K1=0.80-0.89 or the K1=0.80-0.85.

23. The catalytic cracking catalyst according to technical solution 19, 21 or 22 of Group B, wherein the K2=0.87-0.92 or the K2=0.88-0.90.

24. The catalytic cracking catalyst according to technical solution 19 of Group B, wherein the molecular sieve based on the crystal modification of kaolin has a proportion of macropores and mesopores of 10-20%.

25. The catalytic cracking catalyst according to technical solution 19 of Group B, wherein the silica-alumina ratio measured with the unit cell constant a0 is 5.2-5.5.

26. The catalytic cracking catalyst according to technical solution 18 of Group B, wherein the molecular sieve based on the crystal modification of kaolin is prepared with a process comprising the steps of:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A, wherein the mass ratio of the directing agent to the metakaolin is 0.01-1.0, and the reaction raw material A has a composition by molar ratio of $(1-2.5)Na_2O:Al_2O_3:(4-9)SiO_2:(40-100)H_2O$;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product.

27. The catalytic cracking catalyst according to technical solution 16 of Group B, wherein the second molecular sieve is selected from faujasite and/or pentasil molecular sieve, for example, the faujasite is one or more of HY, REY, REHY, USY, REUSY, DASY and REDASY, the pentasil molecular sieve comprises one or more of BEA structure molecular sieve, MFI structure molecular sieve, and mordenite; the binder is one or more of silica sol, alumina sol, acidified pseudo-boehmite, and metal-modified pseudo-boehmite; the clay is one or more of kaolin, montmorillonite, diatomite, halloysite, metahalloysite, saponite, rectorite, sepiolite, attapulgite, hydrotalcite and bentonite.

28. A process for preparing the catalytic cracking catalyst, comprising the following steps: making a clay, a silica-alumina material, a cracking active component, and a binder form a slurry, and spray drying the slurry; wherein the silica-alumina material is the silica-alumina material according to any of technical solutions 1-5 of Group B or technical solution 15 of Group B, the cracking active component comprises a first Y-type molecular sieve and an optional second molecular sieve; the first Y-type molecular sieve is a Y-type molecular sieve synthesized by in-situ crystallization having a sodium oxide content of less than 2 wt %.

29. The process for preparing the catalytic cracking catalyst according to technical solution 28 of Group B, wherein the first Y-type molecular sieve is a modified molecular sieve based on the crystal modification of kaolin, the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1-2.5)Na_2O:Al_2O_3:(4-9)SiO_2:(40-100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product;

(5) ion-exchanging the recovered product.

30. The preparation process according to technical solution 29 of Group B, wherein the directing agent has the molar composition of $(10-17)SiO_2:(0.7-1.3)Al_2O_3:(11-18)Na_2O:(200-350)H_2O$.

31. The preparation process according to technical solution 29 of Group B, wherein the second silicon source has the sodium content as $Na_2O$ of <1 wt %.

32. The preparation process according to technical solution 29 or 31 of Group B, wherein the second silicon source is a solid silica gel and/or a liquid silica gel.

33. The preparation process according to technical solution 32 of Group B, wherein the solid silica gel has an average pore size of 0.8 nm or less, or the solid silica gel has an average pore size of 1.5-2.0 nm, or the solid silica gel has an average pore size of 4.0-5.0 nm, or the solid silica gel has an average pore size of 10.0 nm or more; the liquid silica gel has the $SiO_2$ content by weight of 1%-30%.

34. The preparation process according to technical solution 29 of Group B, wherein both as silica, the second silicon source comprises 4-10 wt % of the total amount of the added silicon.

35. The process for preparing the catalytic cracking catalyst according to technical solution 29 of Group B, wherein the ion-exchanging in step (5) is the ammonium ion exchanging and/or the rare earth ion exchanging; preferably, the ion-exchanged product obtained from step (5) is further calcined.

36. The process for preparing the catalytic cracking catalyst according to technical solution 29 or 35 of Group B, wherein the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

37. The catalytic cracking catalyst obtained from the process for preparing the catalytic cracking catalyst according to any of technical solutions 28-36 of Group B.

[Group C]

1. A zirconia sol, comprising 0.5-20 wt % of $ZrO_2$, a stabilizer, an alkali cation and water, wherein the molar ratio of the stabilizer to Zr is 1-6, the pH value of the zirconia sol is 1-7.

2. The zirconia sol according to technical solution 1 of Group C, which is characterized in that the zirconia sol has a colloidal particle size of 5 nm-15 nm, an average particle diameter of about 10 nm (i.e., 10±2 nm), and a degree of concentration of 90% or higher.

3. The zirconia sol according to technical solution 1 or 2 of Group C, which is characterized in that the zirconia sol is subjected to the heat treatment, i.e., dried at 100° C. for 6 hours and calcined at 600° C. for 2-6 hours, the monoclinic phase and the tetragonal phase coexist in the resulting product, the ratio of the monoclinic phase to the tetragonal phase is preferably 0.05-0.6:1; and/or the zirconia sol is subjected to the heat treatment, i.e., dried at 100° C. for 6 hours and calcined at 800° C. for 2-6 hours, $ZrO_2$ exists in the tetragonal phase in the resulting product.

4. The zirconia sol according to technical solution 1 of Group C, which is characterized in that said stabilizer is an organic acid, said stabilizer is preferably one or more of glycolic acid, oxalic acid, acetic acid, malonic acid, malic acid, tartaric acid, succinic acid, adipic acid, maleic acid, itaconic acid, and citric acid.

5. The zirconia sol according to technical solution 1 of Group C, which is characterized in that the alkali cation is a nitrogen-containing cation, for example an ammonium ion or a nitrogen-containing cation formed by the hydrolysis of a water soluble organic base, the water soluble organic base is for example one or more of methylamine, dimethylamine, trimethylamine, methanolamine, dimethanolamine, trimethanolamine, triethylamine, ethanolamine, diethanolamine, triethanolamine, N-methyl ethanol amine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide, monomethyltributylammonium hydroxide, and the like.

6. The zirconia sol according to technical solution 1 of Group C, which is characterized in that the molar ratio of the alkali cation to Zr is 1-8.

7. The zirconia sol according to technical solution 1 of Group C, which is characterized in that the zirconia sol further contains an inorganic acid radical and/or an alcohol, the molar ratio of the inorganic acid radical and/or the alcohol to Zr is 1-6:1; preferably, the inorganic acid radical is one or more of sulfate radical, chloride ion, and nitrate radical, the alcohol is one or more of methanol, ethanol, propanol, and butanol.

8. The zirconia sol according to technical solution 1 of Group C, which is characterized in that the pH value of the zirconia sol is 2-4.

9. A process for preparing the zirconia sol, comprising the following steps:

(1) formulating a zirconium source solution, wherein the zirconium source solution has a concentration of 0.5-20 wt % as $ZrO_2$;

(2) adding a stabilizer to the zirconium source solution to produce a first mixed solution; wherein the molar ratio of the stabilizer to zirconium is 1-6;

(3) adding an alkali solution to the first mixed solution to produce a zirconia sol at a temperature between room temperature and 50° C., wherein the alkali solution is used in such an amount that the pH of the zirconia sol is 1-7.

10. The process for preparing the zirconia sol according to technical solution 9 of Group C, which is characterized in that the alkali solution is slowly added to the first mixed solution to produce a clear and transparent zirconia sol, and the slow addition can be the dropwise addition, or controlling the addition velocity to be 0.05 mL-50 mL of the alkali solution per minute per liter of the first mixed solution.

11. The process for preparing the zirconia sol according to technical solution 9 of Group C, which is characterized in that the zirconium source is one or more of inorganic zirconium salt and organic zirconium salt, the inorganic zirconium salt is one or more of zirconium tetrachloride, zirconium oxychloride, zirconium acetate, zirconium nitrate, zirconyl nitrate, zirconyl sulphate and zirconyl carbonate; the organic zirconium salt is one or more of zirconium n-propoxide, zirconium isopropoxide, zirconium ethoxide, and zirconium butoxide.

12. The process for preparing the zirconia sol according to technical solution 9 of Group C, which is characterized in that the stabilizer is an organic acid that can generate a coordination polymer with zirconium, said stabilizer is preferably at least one of glycolic acid, acetic acid, oxalic acid, malonic acid, malic acid, tartaric acid, succinic acid, adipic acid, maleic acid, itaconic acid, citric acid, and the like, more preferably one or more of acetic acid, oxalic acid and citric acid.

13. The process for preparing the zirconia sol according to technical solution 9 of Group C, which is characterized in that the alkali solution is selected from ammonia water or an aqueous solution of water soluble organic base, the water soluble organic base is for example one or more of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide, and monomethyltributylammonium hydroxide.

14. A zirconia sol obtained from the process for preparing zirconia sol according to any of technical solutions 9-13 of Group C.

15. A heavy oil cracking catalyst, according to the dry basis weight, comprising: 10-60 wt % of a cracking active component, 20-60 wt % of a binder, and 10-70 wt % of a clay; wherein the binder comprises 1-50 wt % of a zirconia sol, and 50-99 wt % of a second binder, A heavy oil cracking catalyst, according to the dry basis weight, comprising: 10-60 wt % of a cracking active component, 20-60 wt % of a binder, and 10-70 wt % of a clay; wherein the binder comprises 1-50 wt % of a zirconia sol, and 50-99 wt % of a second binder, the zirconia sol according to any of technical solutions 1-9 of Group C or the zirconia sol according to technical solution 14 of Group C; Preferably, the cracking active component comprises 70-100 wt % of a Y-type molecular sieve and 0-30 wt % of a second molecular sieve.

16. The heavy oil cracking catalyst according to technical solution 15 of Group C, which is characterized in that the second binder is one or more of alumina sol, acidified pseudo-boehmite, and metal-modified pseudo-boehmite.

17. The heavy oil cracking catalyst according to technical solution 15 of Group C, which is characterized in that the Y-type molecular sieve has the rare earth content of 0-20 wt %, the Y-type molecular sieve has the unit cell constant of 2.430 nm-2.480 nm; the clay is one or more of kaolin, montmorillonite, diatomite, halloysite, metahalloysite, saponite, rectorite, sepiolite, attapulgite, hydrotalcite and bentonite.

18. The heavy oil cracking catalyst according to technical solution 15 of Group C, which is characterized in that the Y-type molecular sieve is one or more of a DASY molecular sieve, a rare earth-containing DASY molecular sieve, a USY molecular sieve, a rare earth-containing USY molecular sieve, a REY molecular sieve, an HY molecular sieve, a REHY molecular sieve, a modified Y-type molecular sieve synthesized from kaolin by in-situ crystallization; the modified Y-type molecular sieve synthesized from kaolin by in-situ crystallization has the sodium oxide content of less than 2 wt %.

19. The heavy oil cracking catalyst according to technical solution 15 of Group C, which is characterized in that the Y-type molecular sieve comprises a first Y-type molecular sieve and an optional third Y-type molecular sieve; wherein, the first Y-type molecular sieve is a modified molecular sieve based on the crystal modification of kaolin obtained from the modification treatment of a molecular sieve based on the crystal modification of kaolin, having the sodium oxide content of less than 2 wt %, the modification treatment comprises the super-stabilizing treatment and/or the ion-exchanging treatment; the third Y-type molecular sieve is one or more of HY, REY, REHY, USY, REUSY, DASY and REDASY.

20. The heavy oil cracking catalyst according to technical solution 15 of Group C, which is characterized in that the second molecular sieve is selected from pentasil molecular sieves, for example can comprise one or more of BEA structure molecular sieve, MFI-type molecular sieve, and mordenite, preferably one or more of BEA structure molecular sieve, and MFI-type molecular sieve; the BEA structure molecular sieve can be obtained by crystallization without amine, or can be obtained by calcining a molecular sieve prepared from the template agent method, for example, beta molecular sieve; the MFI structure molecular sieve comprises at least one of rare earth-containing MFI molecular sieve, phosphorus-containing MFI molecular sieve, and Fe-containing MFI molecular sieve; the mordenite comprises at least one of high silica mordenite and low silica mordenite.

21. The heavy oil cracking catalyst according to technical solution 19 of Group C, wherein for the molecular sieve based on the crystal modification of kaolin, when measured with an X-ray diffraction method, the crystallinity by the peak height method is $\geq 60\%$, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

22. The heavy oil cracking catalyst according to technical solution 21 of Group C, wherein the crystallinity by the peak height method is $\geq 80\%$.

23. The heavy oil cracking catalyst according to technical solution 21 of Group C, wherein the K1=0.80-0.89.

24. The heavy oil cracking catalyst according to technical solution 21 of Group C, wherein the K1=0.80-0.85.

25. The heavy oil cracking catalyst according to technical solution 21 of Group C, wherein the K2=0.87-0.92.

26. The heavy oil cracking catalyst according to technical solution 21 of Group C, wherein the K2=0.88-0.90.

27. The heavy oil cracking catalyst according to technical solution 21 of Group C, wherein the K1=0.77-0.88 and the K2=0.87-0.91.

28. The heavy oil cracking catalyst according to technical solution 21 of Group C, wherein the molecular sieve based on the crystal modification of kaolin has a proportion of macropores and mesopores of 10-20%.

29. The heavy oil cracking catalyst according to technical solution 21 of Group C, wherein the silica-alumina ratio measured with the unit cell constant a0 is 5.2-5.5.

30. The heavy oil cracking catalyst according to technical solution 21 of Group C, wherein the molecular sieve based on the crystal modification of kaolin is prepared with a process comprising the steps of:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A, wherein the mass ratio of the directing agent to the metakaolin is 0.01-1.0, and the reaction raw material A has a composition by molar ratio of $(1-2.5)Na_2O:Al_2O_3:(4-9)SiO_2:(40-100)H_2O$;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product.

31. The heavy oil cracking catalyst according to technical solution 19 of Group C, wherein the modified molecular sieve based on the crystal modification of kaolin contains rare earth, the modified molecular sieve based on the crystal modification of kaolin has the rare earth content as $RE_2O_3$ of 10-20 wt %.

32. The process for preparing the heavy oil cracking catalyst according to technical solution 15 of Group C, which comprises making the zirconia sol, a second binder, a clay, a cracking active component and water form a mixture, and spray drying, the cracking active component comprises a molecular sieve, the molecular sieve comprises a Y-type molecular sieve and an optional second molecular sieve.

33. The process for preparing the heavy oil cracking catalyst according to technical solution 32 of Group C, which is characterized in that the second binder comprises alumina sol and acidified pseudo-boehmite, the process for preparing the heavy oil cracking catalyst comprises the following steps:

(S1) firstly mixing a zirconium sol and an aluminum sol to form a first sol, preferably, controlling the pH value of the first sol to be 2.5-3.5;

(S2) preparing a clay slurry and a cracking active component slurry respectively;

(S3) mixing the clay slurry, the cracking active component slurry, the first sol, and the acidified pseudo-boehmite, and dispersing the mixture uniformly (such as stirring, homogenizing, grinding) to produce a second colloid mixture;

(S4) spray-drying the second colloid mixture obtained in step (S3).

34. The process for preparing the heavy oil cracking catalyst according to technical solution 33 of Group C, wherein the Y-type molecular sieve comprises a modified molecular sieve based on the crystal modification of kaolin, the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1-2.5)Na_2O:Al_2O_3:(4-9)SiO_2:(40-100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product;

(5) ion-exchanging and/or super-stabilizing the recovered product.

35. The process for preparing the heavy oil cracking catalyst according to technical solution 34 of Group C, wherein the directing agent has a composition of $(10-17)SiO_2:(0.7-1.3)Al_2O_3:(11-18)$ $Na_2O:(200-350)H_2O$.

36. The process for preparing the heavy oil cracking catalyst according to technical solution 34 of Group C, wherein the second silicon source has the sodium content as $Na_2O$ of <1 wt %.

37. The process for preparing the heavy oil cracking catalyst according to technical solution 34 or 36 of Group C, wherein the second silicon source is a solid silica gel; wherein, the solid silica gel has an average pore size of 1.5-2.0 nm, or the solid silica gel has an average pore size of 4.0-5.0 nm, or the solid silica gel has an average pore size of 10.0 nm or more, or the solid silica gel has an average pore size of 0.8 nm or less.

38. The process for preparing the heavy oil cracking catalyst according to technical solution 34 or 36 of Group C, wherein the second silicon source is a liquid silica gel, the liquid silica gel has the Sift content by weight of 1-30%.

39. The process for preparing the heavy oil cracking catalyst according to technical solution 34 of Group C, wherein both as silica, the second silicon source comprises 4-10 wt % of the total amount of the added silicon.

40. The process for preparing the heavy oil cracking catalyst according to technical solution 34 of Group C, wherein the ion-exchanging in step (5) is the ammonium ion exchanging and/or the rare earth ion exchanging.

41. The process for preparing the heavy oil cracking catalyst according to technical solution 34 or 40 of Group C, wherein the product obtained from step (5) is further calcined.

42. The process for preparing the heavy oil cracking catalyst according to technical solution 34 or 41 of Group C, wherein the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

[Group D]

1. An anti-metal pollution catalytic cracking catalyst, based on the dry basis weight of the catalytic cracking catalyst, comprising: 10-70 wt % of a cracking active component, 1-20 wt % of a zirconia binder, 1-20 wt % of a silica sol binder, 0-50 wt % of an alumina-based binder and 10-70 wt % of a clay.

2. The catalytic cracking catalyst according to technical solution 1 of Group D, which is characterized in that the zirconia binder is a zirconia sol, the zirconia sol comprises 0.5-20 wt %, for example 5-15 wt %, of $ZrO_2$, a stabilizer, an alkali cation and water, wherein the molar ratio of the stabilizer to Zr is 1-6, the pH value of the zirconia sol is 1-7.

3. The catalytic cracking catalyst according to technical solution 2 of Group D, which is characterized in that the zirconia sol has a colloidal particle size of 5 nm-15 nm, an average particle diameter of 10±2 nm, and the degree of concentration of 90% or higher.

4. The catalytic cracking catalyst according to technical solution 2 of Group D, which is characterized in that the zirconia sol is subjected to the heat treatment, i.e., dried at 100° C. for 6 hours and calcined at 600° C. for 2-6 hours, the monoclinic phase and the tetragonal phase coexist in the resulting product, the ratio of the monoclinic phase to the tetragonal phase is preferably 0.05-0.6:1; and/or the zirconia sol is subjected to the heat treatment, i.e., dried at 100° C. for 6 hours and calcined at 800° C. for 2-6 hours, $ZrO_2$ exists in the tetragonal phase in the resulting product.

5. The catalytic cracking catalyst according to technical solution 2 of Group D, which is characterized in that said stabilizer in the zirconia sol is one or more of glycolic acid, oxalic acid, acetic acid, malonic acid, malic acid, tartaric acid, succinic acid, adipic acid, maleic acid, itaconic acid, citric acid, and the like.

6. The catalytic cracking catalyst according to technical solution 2 of Group D, which is characterized in that in the zirconia sol, the alkali cation is an ammonium ion or a nitrogen-containing cation formed by the hydrolysis of a water soluble organic base, the water soluble organic base is one or more of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis (2-hydroxyethyl)-N-methylethan-1-aminium hydroxide, monomethyltributylammonium hydroxide, and the like.

7. The catalytic cracking catalyst according to technical solution 2 of Group D, which is characterized in that in the zirconia sol, the molar ratio of the alkali cation to Zr is 1-8.

8. The catalytic cracking catalyst according to technical solution 2 of Group D, which is characterized in that in the zirconia sol, the zirconia sol further contains an inorganic acid radical and/or an alcohol, the molar ratio of the inorganic acid radical and/or the alcohol to Zr is 1-6; the inorganic acid radical is for example one or more of sulfate radical, chloride ion, and nitrate radical; the alcohol is for example one or more of methanol, ethanol, propanol, and butanol.

9. The catalytic cracking catalyst according to technical solution 2 of Group D, which is characterized in that the pH value of the zirconia sol is 1.5-5 preferably 2-3.

10. The catalytic cracking catalyst according to technical solution 1 of Group D, which is characterized in that the pH value of the silica sol is 1.5-3.5, the particle size of the silica sol is 2 nm-20 nm; in the silica sol, the Sift content is preferably 5-15 wt %; in an embodiment, the silica sol is the silica sol prepared by directly acidifying the water glass, the pH value of the silica sol=1.5-3.

11. The catalytic cracking catalyst according to technical solution 1 of Group D, which is characterized in that the alumina binder is one or more of alumina sol, acidified pseudo-boehmite, phosphorus and/or metal-modified pseudo-boehmite.

12. The catalytic cracking catalyst according to technical solution 1 of Group D, which is characterized in that the cracking active component comprises 70-100 wt % of a Y-type molecular sieve and 0-30 wt % of a second molecular sieve; the Y-type molecular sieve has the unit cell constant of 2.430 nm-2.480 nm, and the rare earth content as $RE_2O_3$ of 0-20 wt %; the second molecular sieve is a pentasil molecular sieve; the clay is one or more of kaolin, montmorillonite, diatomite, halloysite, metahalloysite, saponite, rectorite, sepiolite, attapulgite, hydrotalcite and bentonite.

13. The catalytic cracking catalyst according to technical solution 12 of Group D, which is characterized in that the Y-type molecular sieve is a modified molecular sieve based on the crystal modification of kaolin obtained from the modification treatment of a molecular sieve based on the crystal modification of kaolin, having the sodium oxide content of less than 2 wt %, the modification treatment comprises super-stabilizing treatment and/or ion-exchange treatment.

14. The heavy oil cracking catalyst according to technical solution 13 of Group D, wherein for the molecular sieve based on the crystal modification of kaolin, when measured with an X-ray diffraction method, the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

15. The heavy oil cracking catalyst according to technical solution 14 of Group D, wherein the crystallinity by the peak height method is ≥80%.

16. The heavy oil cracking catalyst according to technical solution 14 of Group D, wherein for the molecular sieve based on the crystal modification of kaolin, the K1=0.77-0.88 and the K2=0.87-0.91.

17. The heavy oil cracking catalyst according to technical solution 14 of Group D, wherein the molecular sieve based on the crystal modification of kaolin has a proportion of macropores and mesopores of 10-20%.

18. The heavy oil cracking catalyst according to technical solution 14 of Group D, wherein for the molecular sieve based on the crystal modification of kaolin, the silica-alumina ratio measured with the unit cell constant a0 is 5.2-5.5.

19. The heavy oil cracking catalyst according to technical solution 14 of Group D, wherein in the process for preparing the catalytic cracking catalyst, firstly the zirconia binder and the silica sol binder are mixed, and then mixed with the cracking active component, the clay and the alumina-based binder.

20. The heavy oil cracking catalyst according to technical solution 14 of Group D, wherein the modified molecular sieve based on the crystal modification of kaolin contains rare earth, the modified molecular sieve based on the crystal modification of kaolin has the rare earth content as $RE_2O_3$ of 10-20 wt %.

21. The process for preparing the catalytic cracking catalyst according to any of technical solutions 1-20 of Group D, comprising:

forming a mixture of zirconia sol and silica sol; making the mixture of zirconia sol and silica sol, a cracking active component, a clay and an optional alumina binder form a slurry; and spray drying; wherein the cracking active component comprises a Y-type molecular sieve and an optional second molecular sieve.

22. The process for preparing the catalytic cracking catalyst according to technical solution 21 of Group D, which comprises the following steps:

(s1) mixing a zirconium sol and an aluminum sol, preferably, controlling the pH value of the mixture to be 2.5-3.5;

(s2) preparing a clay slurry;

(s3) preparing a molecular sieve slurry;

(s4) mixing the clay slurry, the molecular sieve slurry, the mixture obtained in step (s1), and an alumina binder;

(s5) uniformly dispersing the slurry obtained in step (s4), and spray drying.

23. The process for preparing the catalytic cracking catalyst according to technical solution 21 or 22 of Group D, which is characterized in that the process for preparing the zirconia sol comprises the following steps:

(1) formulating a zirconium source solution, wherein the zirconium source solution has a concentration of 0.5-20 wt %, for example 5-15 wt % as $ZrO_2$;

(2) adding a stabilizer to the zirconium source solution and stirring for 0.5-3 hours at a temperature between room temperature and 90° C. to produce a first mixed solution; wherein the molar ratio of the stabilizer to zirconium is 1-6;

(3) adding an alkali solution to the first mixed solution to produce a zirconia sol at a temperature between room temperature and 50° C., wherein the alkali solution is used in such an amount that the pH of the zirconia sol is 1-7.

24. The process for preparing the catalytic cracking catalyst according to technical solution 23 of Group D, which is characterized in that in the process for preparing the zirconia sol, the alkali solution is slowly added to the first mixed solution to produce a clear and transparent zirconia sol; the slow addition is the dropwise addition, or controlling the addition velocity of the alkali solution to be 0.05 mL-50 mL of the alkali solution per minute per liter of the first mixed solution; preferably the alkali solution is added in such an amount that the pH value of the zirconia sol is 1.5-5, for example 2-3.

25. The process for preparing the catalytic cracking catalyst according to technical solution 23 of Group D, which is characterized in that the zirconium source is one or more of inorganic zirconium salt and organic zirconium salt, the inorganic zirconium salt is one or more of zirconium tetrachloride, zirconium oxychloride, zirconium acetate, zirconium nitrate, zirconyl nitrate, zirconyl sulphate and zirconyl carbonate; the organic zirconium salt is one or more of zirconium n-propoxide, zirconium isopropoxide, zirconium ethoxide, and zirconium butoxide.

26. The process for preparing the catalytic cracking catalyst according to technical solution 23 of Group D, which is characterized in that said stabilizer is one or more of glycolic acid, acetic acid, oxalic acid, malonic acid, malic acid, tartaric acid, succinic acid, adipic acid, maleic acid, itaconic acid, and citric acid.

27. The process for preparing the catalytic cracking catalyst according to technical solution 23 of Group D, which is characterized in that the alkali solution is selected from ammonia water or an aqueous solution of water soluble organic base, the water soluble organic base is for example one or more of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide, and monomethyltributylammonium hydroxide.

28. The process for preparing the catalytic cracking catalyst according to technical solution 21 of Group D, wherein the Y zeolite comprises a modified molecular sieve based on the crystal modification of kaolin, the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1-2.5)Na_2O:Al_2O_3:(4-9)SiO_2:(40-100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product to produce the molecular sieve based on the crystal modification of kaolin;

(5) ion-exchanging and/or super-stabilizing the recovered molecular sieve based on the crystal modification of kaolin.

29. The process for preparing the catalytic cracking catalyst according to technical solution 28 of Group D, wherein the directing agent has a composition of $(10-17)SiO_2:(0.7-1.3)Al_2O_3:(11-18) Na_2O:(200-350)H_2O$.

30. The process for preparing the catalytic cracking catalyst according to technical solution 28 of Group D, wherein the second silicon source has the sodium content as $Na_2O$ of <1 wt %, both as silica, the second silicon source comprises 4-10 wt % of the total amount of the added silicon.

31. The process for preparing the catalytic cracking catalyst according to technical solution 28 or 30 of Group D, wherein in the process for preparing the modified molecular sieve based on the crystal modification of kaolin, the second silicon source is a solid silica gel and/or a liquid silica gel; wherein, the solid silica gel has an average pore size of 1.5-2.0 nm, or the solid silica gel has an average pore size of 4.0-5.0 nm, or the solid silica gel has an average pore size of 10.0 nm or more, or the solid silica gel has an average pore size of 0.8 nm or less, the liquid silica gel has a $SiO_2$ weight content of 1-30%.

32. The process for preparing the catalytic cracking catalyst according to technical solution 28 of Group D, wherein the ion-exchanging in step (5) is the ammonium ion exchanging and/or the rare earth ion exchanging.

33. The process for preparing the catalytic cracking catalyst according to technical solution 28 or 32 of Group D, wherein the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

[Group E]

1. A catalytic cracking catalyst for producing lower carbon olefins, comprising: 10-60 wt % of a cracking active component on the dry basis, 20-60 wt % of a binder on the dry basis, and 0-70 wt % of a second clay on the dry basis; wherein, based on the dry basis weight of the binder, on the dry basis, the binder comprises 1-50 wt % of a zirconia sol, 50-99 wt % of a phosphorus-aluminum inorganic binder and 0-45 wt % of a third binder;

the cracking active component comprises a first molecular sieve and optionally a second molecular sieve, the first molecular sieve is a pentasil molecular sieve; on the dry basis, the first molecular sieve comprises 70 wt % or more of the cracking active component; Preferably, the cracking active component contains 70-100 wt % of the first molecular sieve, and 0-30 wt % of the second molecular sieve;

the zirconia sol comprises 0.5-20 wt % of $ZrO_2$, a stabilizer, an alkali cation and water, wherein the molar ratio of the stabilizer to Zr is 1-6, the pH value of the zirconia sol is 1-7;

the phosphorus-aluminum inorganic binder contains 15-40 wt % of an alumina source component as $Al_2O_3$, 45-80 wt % of a phosphorus component (as $P_2O_5$) and 0-40 wt % of a first clay on the dry basis, and has a P/Al weight ratio of 1-6, a pH value of 1-3.5, and a solid content of 15-60 wt %.

2. The catalytic cracking catalyst according to technical solution 1 of Group E, which is characterized in that the third binder is one or more of silica sol, alumina sol, silica-alumina gel, acidified pseudo-boehmite, and metal-modified pseudo-boehmite.

3. The catalytic cracking catalyst according to technical solution 1 of Group E, which is characterized in that the first molecular sieve is one or more of MFI-structured molecular sieve, BEA structure molecular sieve, and mordenite.

4. The catalytic cracking catalyst according to technical solution 1 of Group E, which is characterized in that the second molecular sieve is a Y-type molecular sieve, the Y-type molecular sieve has a rare earth content of 0-20 wt %, preferably 0-12 wt %.

5. The catalytic cracking catalyst according to technical solution 1 or 4 of Group E, which is characterized in that the Y-type molecular sieve is one or more of a DASY molecular sieve, a rare earth-containing DASY molecular sieve, a USY molecular sieve, a rare earth-containing USY molecular sieve, a REY molecular sieve, an HY molecular sieve, a REHY molecular sieve, a modified Y-type molecular sieve synthesized from kaolin by in-situ crystallization.

6. The catalytic cracking catalyst according to technical solution 1 or 5 of Group E, which is characterized in that the second molecular sieve is an ion-modified super-stabilized molecular sieve based on the crystal modification of kaolin; based on the weight of the catalytic cracking catalyst, the content of the ion-modified super-stabilized molecular sieve based on the crystal modification of kaolin in the catalytic cracking catalyst is preferably 1-10 wt %.

7. The catalytic cracking catalyst according to technical solution 1 of Group E, which is characterized in that the second clay is one or more of kaolin, montmorillonite, diatomite, halloysite, metahalloysite, saponite, rectorite, sepiolite, attapulgite, hydrotalcite and bentonite; the first clay is one or more of kaolin, montmorillonite, diatomite, halloysite, metahalloysite, saponite, rectorite, sepiolite, attapulgite, hydrotalcite and bentonite, the first clay is preferably one or more of kaolin, sepiolite, attapulgite, rectorite, montmorillonite and diatomite.

8. The catalytic cracking catalyst according to technical solution 1 of Group E, which is characterized in that the process for preparing the phosphorus-aluminum inorganic binder comprises:

(1) an alumina source, a first clay and water are mixed under vigorously stirring and dispersed into a slurry having a solid content of 8-45 wt %; the alumina source is aluminum hydroxide and/or alumina that can be peptized by an acid, and the weight ratio of the first clay (dry basis) to the alumina source as $Al_2O_3$ is 0-40:15-40;

(2) a concentrated phosphoric acid is added into the slurry obtained in step (1) under stirring according to the weight ratio of P/Al=1-6; wherein the concentration of the concentrated phosphoric acid is, for example, 50-98 wt %;

(3) the slurry obtained in step (2) is reacted at a temperature of 50-99° C. for 15-90 minutes.

9. The catalytic cracking catalyst according to technical solution 8 of Group E, which is characterized in that the phosphorus-aluminum inorganic binder comprises 15-35 wt % of $Al_2O_3$ derived from the alumina source, 50-75 wt % of $P_2O_5$, and 0-35 wt % of the first clay on a dry basis, e.g. 5-30 wt % of the first clay.

10. The catalytic cracking catalyst according to technical solution 1 or 8 of Group E, which is characterized in that the P/Al weight ratio is 2-5.

11. The catalytic cracking catalyst according to technical solution 8 of Group E, which is characterized in that the alumina source is one or more of ρ-alumina, χ-alumina, η-alumina, γ-alumina, κ-alumina, δ-alumina, θ-alumina, gibbsite, bayerite, nordstrandite, diaspore, boehmite and pseudo-boehmite.

12. The catalytic cracking catalyst according to technical solution 1 of Group E, which is characterized in that the zirconia sol has a colloidal particle size of 5 nm-15 nm, an average particle diameter of 10±2 nm, and a degree of concentration of 90% or higher.

13. The zirconia sol according to technical solution 1 or 12 of Group E, which is characterized in that the zirconia sol is subjected to the heat treatment, i.e., dried at 100° C. for 6 hours and calcined at 600° C. for 2-6 hours, the monoclinic phase and the tetragonal phase coexist in the resulting product, the ratio of the monoclinic phase to the tetragonal phase is preferably 0.05-0.6:1; and/or the zirconia sol is subjected to the heat treatment, i.e., dried at 100° C. for 6 hours and calcined at 800° C. for 2-6 hours, $ZrO_2$ exists in the tetragonal phase in the resulting product.

14. The catalytic cracking catalyst according to technical solution 1 of Group E, which is characterized in that said stabilizer is one or more of glycolic acid, oxalic acid, acetic acid, malonic acid, malic acid, tartaric acid, succinic acid, adipic acid, maleic acid, itaconic acid, and citric acid.

15. The catalytic cracking catalyst according to technical solution 1 of Group E, which is characterized in that the alkali cation is an ammonium ion or a nitrogen-containing cation formed by the hydrolysis of a water soluble organic base, the water soluble organic base is for example one or more of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis (2-hydroxyethyl)-N-methylethan-1-aminium hydroxide, monomethyltributylammonium hydroxide, and the like.

16. The catalytic cracking catalyst according to technical solution 1 of Group E, which is characterized in that the molar ratio of the alkali cation to Zr is 1-8.

17. The catalytic cracking catalyst according to technical solution 1 of Group E, which is characterized in that the zirconia sol further contains an inorganic acid radical and/or an alcohol, the molar ratio of the inorganic acid radical and/or the alcohol to Zr is 1-6:1; preferably, the inorganic acid radical is one or more of sulfate radical, chloride ion, and nitrate radical, the alcohol is one or more of methanol, ethanol, propanol, and butanol.

18. The zirconia sol according to technical solution 1 of Group E, which is characterized in that the pH value of the zirconia sol is 2-4.

19. The catalytic cracking catalyst according to technical solution 1 of Group E, which is characterized in that the zirconia sol is prepared from a preparation process comprising the following steps:

(1) formulating a zirconium source solution, wherein the zirconium source solution has a concentration of 0.5-20 wt % as $ZrO_2$;

(2) adding a stabilizer to the zirconium source solution to produce a first mixed solution; wherein the molar ratio of the stabilizer to zirconium is 1-6;

(3) adding an alkali solution to the first mixed solution to produce a zirconia sol at a temperature between room temperature and 50° C., wherein the alkali solution is used in such an amount that the pH of the zirconia sol is 1-7.

20. The catalytic cracking catalyst according to technical solution 1 of Group E, the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1-2.5)Na_2O:Al_2O_3:(4-9)SiO_2:(40-100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein all silicon are calculated as silica, and the second silicon source comprises 0.1-10 wt % of the total amount of the added silicon;

(4) crystallizing the reaction raw material B under stirring at 88-98° C. and recovering the product to produce the molecular sieve based on the crystal modification of kaolin;

(5) ion-exchanging and/or super-stabilizing the obtained molecular sieve based on the crystal modification of kaolin.

21. The process for preparing the catalytic cracking catalyst according to any of technical solutions 1-20 of Group E, which comprises: making a cracking active component, a binder, water and an optional clay form a slurry and spray drying.

22. The process for preparing the catalytic cracking catalyst according to technical solution 21 of Group E, which comprises the following steps:

(S1) obtaining a molecular sieve slurry, (S2) obtaining a second clay slurry, (S3) obtaining a zirconia sol, (S4) obtaining a phosphorus-aluminum inorganic binder, (S5) mixing the molecular sieve slurry, the second clay slurry, the zirconia sol, the phosphorus-aluminum inorganic binder and the optional third binder;

(S6) spray drying the slurry obtained in step (S5).

23. A catalytic cracking process, comprising a step of contacting a heavy oil with the catalytic cracking catalyst according to any of technical solutions 13-20 of Group E to react.

[Group F]

1. A composite, which is characterized in that the composite comprises a zirconia sol and a silica-alumina material, based on the total amount of the composite, on the dry basis, the content of the zirconia sol is 30-80 wt %, the content of the silica-alumina material is 20-70 wt %.

2. The composite according to technical solution 1 of Group F, wherein the zirconia sol has a colloidal particle size of 5-15 nm, an average particle diameter of 8-12 nm, and a degree of concentration of 90% or higher.

3. The composite according to technical solution 1 or 2 of Group F, wherein the process for preparing the zirconia sol comprises:

(a) mixing a solution containing a zirconium source with an acid to obtain a first mixed solution;

(b) adding an alkali solution to the first mixed solution to obtain the zirconium sol.

4. The composite according to technical solution 3 of Group F, wherein in step (a), as $ZrO_2$, the concentration of the solution containing the zirconium source is 0.5-20 wt %;

preferably, in step (a), the molar ratio of the solution containing the zirconium source as the Zr element to the acid is 1:1-6;

Preferably, the mixing conditions in step (a) include: the temperature is 20-90° C., and the time is 0.5-3 hours;

preferably, the acid in step (a) is an organic acid, more preferably at least one of glycolic acid, acetic acid, oxalic acid, malonic acid, malic acid, tartaric acid, succinic acid, adipic acid, maleic acid, itaconic acid and citric acid, further preferably acetic acid and/or citric acid;

preferably, the zirconium source is an inorganic zirconium salt and/or an organic zirconium salt;

further preferably, the inorganic zirconium salt is at least one of zirconium tetrachloride, zirconium oxychloride, zirconium acetate, zirconium nitrate, zirconyl nitrate, zirconyl sulphate and zirconyl carbonate;

further preferably, the organic zirconium salt is at least one of zirconium n-propoxide, zirconium isopropoxide, zirconium ethoxide and zirconium butoxide.

5. The composite according to technical solution 3 or 4 of Group F, wherein the alkali solution in step (b) is added in such an amount that the pH value of the zirconia sol is 1-7, preferably 1.5-5, further preferably 2-3;

preferably, the alkali solution in step (b) is an ammonia water and/or a water soluble organic base; further preferably, the water soluble organic base is at least one of methylamine, dimethylamine, trimethylamine, methanolamine, dimethanolamine, trimethanolamine, triethylanmine, ethanolamine, diethanolamine, triethanolamine, N-methyl ethanol amine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide and monomethyltributylammonium hydroxide.

6. The composite according to any of technical solutions 1-5 of Group F, wherein the silica-alumina material has a composition as the weight ratio of oxides of (0-1) $Na_2O \cdot (15-50)Al_2O_3 \cdot (85-50)$ $SiO_2$;

preferably, the silica-alumina material has an average pore size of 10-100 nm, a specific surface area of 150-600 m$^2$/g, and a pore volume of 0.5-1.5 cm$^3$/g.

7. The composite according to any of technical solutions 1-6 of Group F, wherein the process for preparing the silica-alumina material comprises:

(i) mixing a silicon source with an aluminum source to obtain a mixture containing the silicon source and the aluminum source;

(ii) adding an alkali solution to the mixture containing the silicon source and the aluminum source to produce a slurry, and then aging the slurry to produce a solid precipitate;

(iii) contacting the solid precipitate with an ammonium salt or an acid to produce a silica-alumina material.

8. The composite according to technical solution 7 of Group F, wherein in step (i), the molar ratio of the silicon source as Sift to the aluminum source as $Al_2O_3$ is 50-85:50-15;

preferably, the mixing conditions in step (i) comprise: the temperature is 20-95° C.;

preferably, the silicon source in step (i) is an alkaline silicon source, more preferably one or more of alkaline silica sol, water glass, sodium silicate, and an alkaline hydrolysis product of silicon alkoxide;

preferably, in step (i) the aluminum source is an acidic aluminum source, more preferably one or more of aluminum sulfate, aluminum chloride, alumina sol, and an acidic hydrolysis product of aluminum alkoxide.

9. The composite according to technical solution 7 or 8 of Group F, wherein in step (ii) the alkali solution is added in such an amount that the pH value of the slurry is 8-10.5;

preferably, in step (ii), the aging conditions comprise: the temperature is 50-95° C., the time is 1-10 hours;

preferably, in step (ii) the alkali solution is at least one of ammonia water, sodium hydroxide solution, potassium hydroxide solution and sodium metalluminate solution.

10. The composite according to any of technical solutions 7-9 of Group F, wherein in step (iii), the mode of contacting the solid precipitate with the ammonium salt is to mix the solid precipitate with the ammonium salt and water to perform the ammonium exchanging;

preferably, the weight ratio of the solid precipitate (on the dry basis):ammonium salt:water is 1:0.05-0.1:5-30;

preferably, the ammonium exchanging condition is such one that the sodium content of the silica-alumina material is below 1 wt %;

further preferably, the ammonium exchanging conditions comprise: the temperature is 20-100° C., the exchanging number is 1-3 times, the time for each exchanging is 0.5-1 hours;

preferably, the ammonium salt is at least one of ammonium chloride, ammonium sulfate, ammonium nitrate, ammonium carbonate and ammonium bicarbonate.

11. The composite according to any of technical solutions 7-9 of Group F, wherein in step (iii), the mode of contacting the solid precipitate with the acid is to mix the solid precipitate with the acid and water to perform the acid treatment;

preferably, the weight ratio of the solid precipitate (on the dry basis):acid:water is 1:0.03-0.3:5-30;

preferably, the acid treatment condition is such one that the sodium content of the silica-alumina material is below 1 wt %;

further preferably, the acid treatment condition comprises: the temperature is 20-100° C., the time is at least 0.5 hour, more preferably 1-3 hours;

preferably, the acid is at least one of sulfuric acid, hydrochloric acid and nitric acid.

12. A catalytic cracking catalyst, which is characterized in that the catalyst comprises a molecular sieve, an alumina-based binder, a clay and the composite according to any of technical solutions 1-11 of Group F, based on the total amount of the catalyst, the content of the molecular sieve is 10-70 wt %, the content of the alumina-based binder is 5-30 wt %, the content of the clay is 10-70 wt %, the content of the composite is 6-50 wt %;

the molecular sieve comprises a first molecular sieve and an optional second molecular sieve, based on the total amount of the molecular sieve, the content of the first molecular sieve is 70-100 wt %, the content of the second molecular sieve is 0-30 wt %;

the first molecular sieve is a Y-type molecular sieve, wherein the content of the rare earth element in the Y-type molecular sieve is 0-20 wt %; the second molecular sieve is a pentasil molecular sieve.

13. The catalyst according to technical solution 12 of Group F, wherein the Y-type molecular sieve is at least one of an HY molecular sieve, a REY molecular sieve, a molecular sieve based on the crystal modification of kaolin, a REHY molecular sieve, a USY molecular sieve, a REUSY molecular sieve, a DASY molecular sieve and a REDASY molecular sieve;

preferably, the first molecular sieve is a REY molecular sieve and/or a rare earth element-modified molecular sieve based on the crystal modification of kaolin;

further preferably, the content of the rare earth element in the molecular sieve based on the crystal modification of kaolin is 10-20 wt %;

preferably, the rare earth element is at least one of La, Ce, Pr, Nd, Pm, Sm, Eu, Gd, Tb, Dy, Ho, Er, Tm, Yb and Lu, more preferably La.

14. The catalyst according to technical solution 12 of Group F, wherein for the molecular sieve based on the crystal modification of kaolin, the ratio of the crystallinity by the peak height method to the crystallinity by the peak area method is 0.76-0.89;

preferably, for the molecular sieve based on the crystal modification of kaolin, the ratio of the silica-alumina ratio obtained from the calculation with the unit cell constant to the silica-alumina ratio measured with the chemical method is 0.87-0.93;

preferably, the molecular sieve based on the crystal modification of kaolin has a proportion of macropores and mesopores of 10-20%.

15. The catalyst according to any of technical solutions 12-14 of Group F, wherein the process for preparing the molecular sieve based on the crystal modification of kaolin comprises:

(1) calcining kaolin to produce metakaolin, and then mixing the metakaolin with a sodium silicate solution, a directing agent and an alkali solution to produce a mixed slurry;

(2) subjecting the mixed slurry to a first crystallization, mixing a solid silica gel, and then subjecting to a second crystallization and drying to produce a molecular sieve based on the crystal modification of kaolin.

16. The catalyst according to technical solution 15 of Group F, wherein in step (1), said calcining conditions comprise: the temperature is 500-900° C., and the time is 1-10 hours;

preferably, in step (1), the mass ratio of the directing agent to metakaolin is 0.01-1.

17. The catalyst according to technical solution 15 or 16 of Group F, wherein in step (2), the conditions for the first crystallization comprise: the temperature is 88-98° C., the time is 1-70 hours;

preferably, in step (2) the mass ratio of the solid silica gel to metakaolin is 0.01-1;

preferably, in step (2) the conditions for the second crystallization comprise: the temperature is 88-98° C., the time is 1-20 hours.

18. The catalyst according to any of technical solutions 12-17 of Group F, wherein the pentasil molecular sieve is at least one of BEA-type molecular sieve, MFI-type molecular sieve and mordenite-type molecular sieve, more preferably BEA-type molecular sieve and/or MFI-type molecular sieve;

preferably, the MFI-type molecular sieve is at least one of rare earth-containing MFI-type molecular sieve, phosphorus-containing MFI-type molecular sieve and Fe-containing MFI-type molecular sieve;

preferably, the mordenite-type molecular sieve is high silica mordenite-type molecular sieve and/or low silica mordenite-type molecular sieve.

19. The catalyst according to any of technical solutions 12-18 of Group F, wherein the alumina-based binder is at least one of alumina sol, acidified pseudo-boehmite and metal-modified pseudo-boehmite;

preferably, the clay is one or more of kaolin, giagerite, montmorillonite, diatomite, metahalloysite, saponite, rectorite, sepiolite, attapulgite, hydrotalcite, and bentonite.

20. A process for preparing a catalytic cracking catalyst, which is characterized in that the process comprises: mixing a molecular sieve, the composite according to any of technical solutions 1-11 of Group F or the zirconia sol and the silica-alumina material for forming the composite, an alumina-based binder and a clay, and then successively drying and calcining to produce a catalytic cracking catalyst;

the molecular sieve, the composite, the alumina-based binder and the clay are used in such an amount that, based on the total amount of the catalyst, the content of the molecular sieve is 10-70 wt %, the content of the composite is 6-50 wt %, the content of the alumina-based binder is 5-30 wt %, the content of the clay is 10-70 wt %;

the molecular sieve comprises a first molecular sieve and an optional second molecular sieve, based on the total amount of the molecular sieve, the content of the first molecular sieve is 70-100 wt %, the content of the second molecular sieve is 0-30 wt %;

the first molecular sieve is a Y-type molecular sieve, wherein the content of the rare earth element in the Y-type molecular sieve is 0-20 wt %; the second molecular sieve is a pentasil molecular sieve.

More particular, in order to achieve the above objectives, the present invention also provides the following technical solutions:

1. A catalytic cracking catalyst, comprising: 10-70 wt % of a cracking active component, 10-60 wt % of a binder and 10-70 wt % of a clay, wherein the cracking active component comprises 5-100 wt % of a first Y-type molecular sieve and 0-95 wt % of a second molecular sieve; wherein, the first Y-type molecular sieve is a modified molecular sieve based on the crystal modification of kaolin obtained from the modification treatment of a molecular sieve based on the crystal modification of kaolin, and has the sodium oxide content of less than 2 wt %.

2. The catalytic cracking catalyst according to technical solution 1, wherein for the molecular sieve based on the crystal modification of kaolin, when measured with an X-ray diffraction method, the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

3. The catalytic cracking catalyst according to technical solution 2, wherein the crystallinity by the peak height method is ≥80%.

4. The catalytic cracking catalyst according to any of technical solutions 2-3, wherein the K1=0.80-0.89, for example the K1=0.80-0.85.

5. The catalytic cracking catalyst according to any of technical solutions 2-4, wherein the K2=0.87-0.92, for example the K2=0.88-0.90.

6. The catalytic cracking catalyst according to any of technical solutions 2-5, wherein the K1=0.77-0.88 and the K2=0.87-0.91.

7. The catalytic cracking catalyst according to any of technical solutions 2-6, wherein the molecular sieve based on the crystal modification of kaolin has a proportion of macropores and mesopores of 10-20%.

8. The catalytic cracking catalyst according to any of technical solutions 2-7, wherein the silica-alumina ratio measured with the unit cell constant a0 is 5.2-5.5.

9. The catalytic cracking catalyst according to any of technical solutions 1-8, wherein the molecular sieve based on the crystal modification of kaolin is prepared with a process comprising the steps of:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A, wherein the mass ratio of the directing agent to the metakaolin is 0.01-

1.0, and the reaction raw material A has a composition by molar ratio of $(1\text{-}2.5)Na_2O:Al_2O_3:(4\text{-}9)SiO_2:(40\text{-}100)H_2O$;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product.

10. The catalytic cracking catalyst according to any of the precedent technical solutions, wherein the modified molecular sieve based on the crystal modification of kaolin contains rare earth, the modified molecular sieve based on the crystal modification of kaolin has the content of rare earth as $RE_2O_3$ of 10-20 wt %.

11. The catalytic cracking catalyst according to any of the precedent technical solutions, wherein the second molecular sieve is selected from faujasite and/or pentasil molecular sieve; for example, the faujasite is one or more of HY, REY, REHY, USY, REUSY, DASY and REDASY; the pentasil molecular sieve comprises one or more of BEA structure molecular sieve, MFI structure molecular sieve, and mordenite; the binder is one or more of zirconia sol, silica sol, alumina sol, acidified pseudo-boehmite, and metal-modified pseudo-boehmite; the clay is one or more of kaolin, montmorillonite, diatomite, halloysite, metahalloysite, saponite, rectorite, sepiolite, attapulgite, hydrotalcite and bentonite.

12. A process for preparing the catalytic cracking catalyst according to any of the precedent technical solutions, comprising the following steps:

(1) preparing a modified molecular sieve based on the crystal modification of kaolin;

(2) making a clay, a cracking active component and a binder form a slurry; the cracking active component comprises the modified molecular sieve based on the crystal modification of kaolin and an optional second molecular sieve;

(3) spray-drying the slurry obtained in step (2).

13. The process for preparing the catalytic cracking catalyst according to technical solution 12, wherein the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1\text{-}2.5)Na_2O:Al_2O_3:(4\text{-}9)SiO_2:(40\text{-}100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product;

(5) ion-exchanging the recovered product.

14. The catalytic cracking catalyst according to technical solution 9 or the process for preparing the catalytic cracking catalyst according to technical solution 13, wherein the directing agent has a composition of $(10\text{-}17)SiO_2:(0.7\text{-}1.3)Al_2O_3:(11\text{-}18)Na_2O:(200\text{-}350)H_2O$.

15. The preparation process according to technical solution 13, wherein the second silicon source has the sodium content as $Na_2O$ of <1 wt %.

16. The process for preparing the catalytic cracking catalyst according to any of technical solutions 13-15, wherein the second silicon source is a solid silica gel.

17. The process for preparing the catalytic cracking catalyst according to technical solution 16, wherein the solid silica gel has an average pore size of 1.5-2.0 nm, or the solid silica gel has an average pore size of 4.0-5.0 nm, or the solid silica gel has an average pore size of 10.0 nm or more, or the solid silica gel has an average pore size of 0.8 nm or less.

18. The process for preparing the catalytic cracking catalyst according to any of technical solutions 13-17, wherein the second silicon source is a liquid silica gel.

19. The process for preparing the catalytic cracking catalyst according to technical solution 18, wherein the liquid silica gel has the $SiO_2$ content by weight of 1-30%.

20. The process for preparing the catalytic cracking catalyst according to any of technical solutions 13-19, wherein both as silica, the second silicon source comprises 4-10 wt % of the total amount of the added silicon.

21. The process for preparing the catalytic cracking catalyst according to any of technical solutions 13-20, wherein the ion-exchanging in step (5) is the ammonium ion exchanging and/or the rare earth ion exchanging.

22. The process for preparing the catalytic cracking catalyst according to any of technical solutions 13-21, wherein the ion-exchanged product obtained from step (5) is further calcined.

23. The process for preparing the catalytic cracking catalyst according to any of technical solutions 13-22, wherein the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

24. A catalytic cracking process, which comprises a step of contacting a hydrocarbon oil with the catalytic cracking catalyst according to any of technical solutions 1-11 to react.

25. The catalytic cracking catalyst according to any of the precedent technical solutions 1-11, wherein the catalytic cracking catalyst comprises a silica-alumina material, which has an anhydrous chemical formula by weight of $(0\text{-}1)Na_2O\cdot(15\text{-}50)Al_2O_3\cdot(85\text{-}50)SiO_2$, a most probable pore size of 10-100 nm, a specific surface area of 150-600 $m^2$/g, a pore volume of 0.5-1.5 mL/g, and a proportion of the pore volume of the pores having a pore diameter of greater than 10 nm to the total pore volume of 70%-98%.

26. The catalytic cracking catalyst according to any of precedent technical solutions, wherein the silica-alumina material contains pseudo-boehmite crystal grains, and the average size of pseudo-boehmite crystal grains is 1.5 nm-3.5 nm.

27. The catalytic cracking catalyst according to any of precedent technical solutions, wherein the silica-alumina material has a pore volume of 0.8-1.5 mL/g.

28. The catalytic cracking catalyst according to any of precedent technical solutions, wherein the silica-alumina material has a specific surface area of 280-450 $m^2$/g.

29. The catalytic cracking catalyst according to any of precedent technical solutions, wherein the silica-alumina material has a $SiO_2$:$Al_2O_3$ weight ratio of 2-4:1.

30. The catalytic cracking catalyst according to any of precedent technical solutions, wherein the silica-alumina material is prepared by the following process, which includes the following steps:

(1) an alkaline silicon source is gradually added to an acidic aluminum source according to the weight ratio of $SiO_2$:$Al_2O_3$=(50-85):(50-15) at a temperature between room temperature and 95° C.;

(2) After all the alkaline silicon source is added to the acidic aluminum source, then an alkaline solution is added until the pH value of the slurry is 8-10.5, and then the slurry is aged at 50-95° C. for 1-10 hours to obtain a solid precipitate;

(3) contacting the solid precipitate with a solution containing an ammonium salt and/or an acid, and filtering to produce a silica-alumina material having the sodium content as $Na_2O$ of below 1 wt %, wherein the solid precipitate is optionally dried before contacting with the solution containing an ammonium salt and/or an acid.

31. The catalytic cracking catalyst according to any of precedent technical solutions, wherein in the process for preparing the silica-alumina material, the acidic aluminum source is selected from aluminum sulfate, aluminum chloride, alumina sol, and an acidic hydrolysis product of aluminum alkoxide, the aluminum alkoxide is for example one or more of aluminium isopropoxide, aluminium sec-butoxide, aluminium triethoxide, and the like.

32. The catalytic cracking catalyst according to any of precedent technical solutions, wherein in the process for preparing the silica-alumina material, the alkaline silicon source is selected from an alkaline silica sol, water glass, sodium silicate, and an alkaline hydrolysis product of silicate ester, the silicate ester is for example one or more of tetramethyl orthosilicate, tetraethyl silicate, tetraisopropyl orthosilicate, tetrabutyl orthosilicate, and the like.

33. The catalytic cracking catalyst according to any of precedent technical solutions, wherein in the process for preparing the silica-alumina material, the alkaline solution is one or more of ammonia water, sodium hydroxide solution, potassium hydroxide solution, sodium metalluminate solution, further preferably sodium metalluminate solution.

34. The catalytic cracking catalyst according to any of precedent technical solutions, wherein in the process for preparing the silica-alumina material, the treatment by contacting the solid precipitate with a solution containing an ammonium salt and/or an acid comprises: contacting the resulting solid precipitate with the solution containing an ammonium salt at a temperature between room temperature and 100° C. according to the weight ratio of the solid precipitate (dry basis): ammonium salt:$H_2O$=1:(0.05-0.1):(5-30).

35. The catalytic cracking catalyst according to any of precedent technical solutions, wherein in the process for preparing the silica-alumina material, the ammonium salt is one or more of ammonium chloride, ammonium sulfate, ammonium nitrate, ammonium carbonate and ammonium bicarbonate.

36. The catalytic cracking catalyst according to any of precedent technical solutions, wherein in the process for preparing the silica-alumina material, the solution containing an ammonium salt and/or an acid is an acid solution, the treatment by contacting the solid precipitate with the solution containing an ammonium salt and/or an acid is to contact the solid precipitate with the acid solution at a temperature between room temperature and 100° C. for at least 0.5 hour, for example 0.5-2 hours according to the weight ratio of the solid precipitate (dry basis):acid:$H_2O_{=1}$:(0.03-0.3):(5-30), the contacting (exchanging) can be performed one or more times.

37. The catalytic cracking catalyst according to any of precedent technical solutions, wherein in the process for preparing the silica-alumina material, wherein, the acid is one or more of sulfuric acid, hydrochloric acid and nitric acid.

38. The catalytic cracking catalyst according to any of precedent technical solutions, wherein in the process for preparing the silica-alumina material, the treatment by contacting with the solution containing an ammonium salt and/or an acid is performed one or more times, each contacting for 0.5-1 hours, until the sodium oxide content in the solid precipitate is below 1 wt %.

39. The catalytic cracking catalyst according to any of precedent technical solutions, wherein the catalytic cracking catalyst comprises 10-70 wt % of a cracking active component, 1-20 wt % of a silica-alumina material, 10-60 wt % of a binder and 10-70 wt % of a clay; wherein, the cracking active component comprises 25-100 wt % of a first Y-type molecular sieve and 0-75 wt % of a second molecular sieve; the first Y-type molecular sieve is a Y-type molecular sieve synthesized by in-situ crystallization having a sodium oxide content of less than 2 wt %, the silica-alumina material is the silica-alumina material according to any of precedent technical solutions.

40. The catalytic cracking catalyst according to any of precedent technical solutions, wherein the Y-type molecular sieve synthesized from kaolin by in-situ crystallization having the sodium oxide content of less than 2 wt % contains rare earth, wherein the rare earth content as $RE_2O_3$ is 10-20 wt %.

41. The catalytic cracking catalyst according to any of precedent technical solutions, wherein the Y-type molecular sieve synthesized from kaolin by in-situ crystallization having the sodium oxide content of less than 2 wt % is a modified molecular sieve based on the crystal modification of kaolin, the modified molecular sieve based on the crystal modification of kaolin is obtained by the treatment of reducing the sodium content and/or the treatment of introducing the rare earth from a molecular sieve based on the crystal modification of kaolin, the modified molecular sieve based on the crystal modification of kaolin has the sodium oxide content of less than 2 wt %.

42. The catalytic cracking catalyst according to any of precedent technical solutions, wherein for the molecular sieve based on the crystal modification of kaolin, when measured with an X-ray diffraction method, the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

43. The catalytic cracking catalyst according to any of precedent technical solutions, wherein the crystallinity by the peak height method is ≥80%.

44. The catalytic cracking catalyst according to any of precedent technical solutions, wherein the K1=0.77-0.88, and the K2=0.87-0.91.

45. The catalytic cracking catalyst according to any of precedent technical solutions, wherein the K1=0.80-0.89 or the K1=0.80-0.85.

46. The catalytic cracking catalyst according to any of precedent technical solutions, wherein the K2=0.87-0.92 or the K2=0.88-0.90.

47. The catalytic cracking catalyst according to any of precedent technical solutions, wherein the molecular sieve based on the crystal modification of kaolin has a proportion of macropores and mesopores of 10-20%.

48. The catalytic cracking catalyst according to any of precedent technical solutions, wherein the silica-alumina ratio measured with the unit cell constant a0 is 5.2-5.5.

49. The catalytic cracking catalyst according to any of precedent technical solutions, wherein the molecular sieve based on the crystal modification of kaolin is prepared with a process comprising the steps of:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A, wherein the mass ratio of the directing agent to the metakaolin is 0.01-1.0, and the reaction raw material A has a composition by molar ratio of $(1-2.5)Na_2O:Al_2O_3:(4-9)SiO_2:(40-100)H_2O$;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product.

50. The catalytic cracking catalyst according to any of precedent technical solutions, wherein the second molecular sieve is selected from faujasite and/or pentasil molecular sieve, for example, the faujasite is one or more of HY, REY, REHY, USY, REUSY, DASY and REDASY, the pentasil molecular sieve comprises one or more of BEA structure molecular sieve, MFI structure molecular sieve, and mordenite; the binder is one or more of silica sol, alumina sol, acidified pseudo-boehmite, and metal-modified pseudo-boehmite; the clay is one or more of kaolin, montmorillonite, diatomite, halloysite, metahalloysite, saponite, rectorite, sepiolite, attapulgite, hydrotalcite and bentonite.

51. The catalytic cracking catalyst according to any of precedent technical solutions, wherein the catalytic cracking catalyst is prepared by the following preparation process, which comprises the following steps:

making a clay, a silica-alumina material, a cracking active component, and a binder form a slurry, and spray drying the slurry; wherein the silica-alumina material is the silica-alumina material according to any of precedent technical solutions, the cracking active component comprises a first Y-type molecular sieve and an optional second molecular sieve; the first Y-type molecular sieve is a Y-type molecular sieve synthesized by in-situ crystallization having a sodium oxide content of less than 2 wt %.

52. The catalytic cracking catalyst according to any of precedent technical solutions, wherein in the process for preparing the catalytic cracking catalyst, the first Y-type molecular sieve is a modified molecular sieve based on the crystal modification of kaolin, the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1-2.5)Na_2O:Al_2O_3:(4-9)SiO_2:(40-100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product;

(5) ion-exchanging the recovered product.

53. The catalytic cracking catalyst according to any of precedent technical solutions, wherein in the process for preparing the catalytic cracking catalyst, the directing agent has the molar composition of $(10-17)SiO_2:(0.7-1.3)Al_2O_3:(11-18)Na_2O:(200-350)H_2O$.

54. The catalytic cracking catalyst according to any of precedent technical solutions, wherein the second silicon source has the sodium content as $Na_2O$ of <1 wt %.

55. The catalytic cracking catalyst according to any of precedent technical solutions, wherein in the process for preparing the catalytic cracking catalyst, the second silicon source is a solid silica gel and/or a liquid silica gel.

56. The catalytic cracking catalyst according to any of precedent technical solutions, wherein in the process for preparing the catalytic cracking catalyst, the solid silica gel has an average pore size of 0.8 nm or less, or the solid silica gel has an average pore size of 1.5-2.0 nm, or the solid silica gel has an average pore size of 4.0-5.0 nm, or the solid silica gel has an average pore size of 10.0 nm or more; the liquid silica gel has the $SiO_2$ content by weight of 1%-30%.

57. The catalytic cracking catalyst according to any of precedent technical solutions, wherein in the process for preparing the catalytic cracking catalyst, both as silica, the second silicon source comprises 4-10 wt % of the total amount of the added silicon.

58. The catalytic cracking catalyst according to any of precedent technical solutions, wherein in the process for preparing the catalytic cracking catalyst, the ion-exchanging in step (5) is the ammonium ion exchanging and/or the rare earth ion exchanging; preferably, the ion-exchanged product obtained from step (5) is further calcined.

59. The catalytic cracking catalyst according to any of precedent technical solutions, wherein in the process for preparing the catalytic cracking catalyst, the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

60. The catalytic cracking catalyst according to any of the precedent technical solutions 1-11, wherein the binder comprises a zirconia sol, the zirconia sol comprises 0.5-20 wt % of $ZrO_2$, a stabilizer, an alkali cation and water, wherein the molar ratio of the stabilizer to Zr is 1-6, the pH value of the zirconia sol is 1-7.

61. The catalytic cracking catalyst according to any of precedent technical solutions, wherein the zirconia sol has a colloidal particle size of 5 nm-15 nm, an average particle diameter of about 10 nm (i.e., 10±2 nm), and a degree of concentration of 90% or higher.

62. The catalytic cracking catalyst according to any of precedent technical solutions, wherein the zirconia sol is subjected to the heat treatment, i.e., dried at 100° C. for 6 hours and calcined at 600° C. for 2-6 hours, the monoclinic phase and the tetragonal phase coexist in the resulting product, the ratio of the monoclinic phase to the tetragonal phase is preferably 0.05-0.6:1; and/or the zirconia sol is subjected to the heat treatment, i.e., dried at 100° C. for 6 hours and calcined at 800° C. for 2-6 hours, $ZrO_2$ exists in the tetragonal phase in the resulting product.

63. The catalytic cracking catalyst according to any of precedent technical solutions, wherein said stabilizer is an organic acid, said stabilizer is preferably one or more of glycolic acid, oxalic acid, acetic acid, malonic acid, malic acid, tartaric acid, succinic acid, adipic acid, maleic acid, itaconic acid, and citric acid.

64. The catalytic cracking catalyst according to any of precedent technical solutions, wherein the alkali cation is a nitrogen-containing cation, for example an ammonium ion or a nitrogen-containing cation formed by the hydrolysis of a water soluble organic base, the water soluble organic base is for example one or more of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide, monomethyltributylammonium hydroxide, and the like.

65. The catalytic cracking catalyst according to any of precedent technical solutions, wherein the molar ratio of the alkali cation to Zr is 1-8.

66. The catalytic cracking catalyst according to any of precedent technical solutions, wherein the zirconia sol further contains an inorganic acid radical and/or an alcohol, the molar ratio of the inorganic acid radical and/or the alcohol to Zr is 1-6:1; preferably, the inorganic acid radical is one or more of sulfate radical, chloride ion, and nitrate radical, the alcohol is one or more of methanol, ethanol, propanol, and butanol.

67. The catalytic cracking catalyst according to any of precedent technical solutions, wherein the pH value of the zirconia sol is 2-4.

68. The catalytic cracking catalyst according to any of precedent technical solutions, wherein the zirconia sol is prepared from a preparation process comprising the following steps:
(1) formulating a zirconium source solution, wherein the zirconium source solution has a concentration of 0.5-20 wt % as $ZrO_2$;
(2) adding a stabilizer to the zirconium source solution to produce a first mixed solution; wherein the molar ratio of the stabilizer to zirconium is 1-6;
(3) adding an alkali solution to the first mixed solution to produce a zirconia sol at a temperature between room temperature and 50° C., wherein the alkali solution is used in such an amount that the pH of the zirconia sol is 1-7.

69. The catalytic cracking catalyst according to any of precedent technical solutions, wherein the alkali solution is slowly added to the first mixed solution to produce a clear and transparent zirconia sol, and the slow addition can be the dropwise addition, or controlling the addition velocity to be 0.05 mL-50 mL of the alkali solution per minute per liter of the first mixed solution.

70. The catalytic cracking catalyst according to any of precedent technical solutions, wherein the zirconium source is one or more of inorganic zirconium salt and organic zirconium salt, the inorganic zirconium salt is one or more of zirconium tetrachloride, zirconium oxychloride, zirconium acetate, zirconium nitrate, zirconyl nitrate, zirconyl sulphate and zirconyl carbonate; the organic zirconium salt is one or more of zirconium n-propoxide, zirconium isopropoxide, zirconium ethoxide, and zirconium butoxide.

71. The catalytic cracking catalyst according to any of precedent technical solutions, wherein the stabilizer is an organic acid that can generate a coordination polymer with zirconium, said stabilizer is preferably at least one of glycolic acid, acetic acid, oxalic acid, malonic acid, malic acid, tartaric acid, succinic acid, adipic acid, maleic acid, itaconic acid, citric acid, and the like, more preferably one or more of acetic acid, oxalic acid and citric acid.

72. The catalytic cracking catalyst according to any of precedent technical solutions, wherein the alkali solution is selected from ammonia water or an aqueous solution of water soluble organic base, the water soluble organic base is for example one or more of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide, and monomethyltributylammonium hydroxide.

73. The catalytic cracking catalyst according to any of precedent technical solutions, wherein the catalyst is a heavy oil cracking catalyst, according to the dry basis weight, comprising: 10-60 wt % of a cracking active component, 20-60 wt % of a binder, and 10-70 wt % of a clay; wherein the binder comprises 1-50 wt % of a zirconia sol, and 50-99 wt % of a second binder, the zirconia sol is preferably the zirconia sol according to any of precedent technical solutions; preferably, the cracking active component comprises 70-100 wt % of a Y-type molecular sieve and 0-30 wt % of a second molecular sieve.

74. The catalytic cracking catalyst according to any of precedent technical solutions, wherein the second binder is one or more of alumina sol, acidified pseudo-boehmite, and metal-modified pseudo-boehmite.

75. The catalytic cracking catalyst according to any of precedent technical solutions, wherein the Y-type molecular sieve has the rare earth content of 0-20 wt %, the Y-type molecular sieve has the unit cell constant of 2.430 nm-2.480 nm; the clay is one or more of kaolin, montmorillonite, diatomite, halloysite, metahalloy site, saponite, rectorite, sepiolite, attapulgite, hydrotalcite and bentonite.

76. The catalytic cracking catalyst according to any of precedent technical solutions, wherein the Y-type molecular sieve is one or more of a DASY molecular sieve, a rare earth-containing DASY molecular sieve, a USY molecular sieve, a rare earth-containing USY molecular sieve, a REY molecular sieve, an HY molecular sieve, a REHY molecular sieve, a modified Y-type molecular sieve synthesized from kaolin by in-situ crystallization; the modified Y-type molecular sieve synthesized from kaolin by in-situ crystallization has the sodium oxide content of less than 2 wt %.

77. The catalytic cracking catalyst according to any of precedent technical solutions, wherein the Y-type molecular sieve comprises a first Y-type molecular sieve and an optional third Y-type molecular sieve; wherein, the first Y-type molecular sieve is a modified molecular sieve based on the crystal modification of kaolin obtained from the modification treatment of a molecular sieve based on the crystal modification of kaolin, having the sodium oxide content of less than 2 wt %, the modification treatment comprises the super-stabilizing treatment and/or the ion-exchanging treatment; the third Y-type molecular sieve is one or more of HY, REY, REHY, USY, REUSY, DASY and REDASY.

78. The catalytic cracking catalyst according to any of precedent technical solutions, wherein the second molecular sieve is selected from pentasil molecular sieves, for example can comprise one or more of BEA structure molecular sieve, MFI-type molecular sieve, and mordenite, preferably one or more of BEA structure molecular sieve, and MFI-type molecular sieve; the BEA structure molecular sieve can be obtained by crystallization without amine, or can be obtained by calcining a molecular sieve prepared from the template agent method, for example, beta molecular sieve; the MFI structure molecular sieve comprises at least one of rare earth-containing MFI molecular sieve, phosphorus-containing MFI molecular sieve, and Fe-containing MFI molecular sieve; the mordenite comprises at least one of high silica mordenite and low silica mordenite.

79. The catalytic cracking catalyst according to any of precedent technical solutions, wherein for the molecular sieve based on the crystal modification of kaolin, when measured with an X-ray diffraction method, the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

80. The catalytic cracking catalyst according to any of precedent technical solutions, wherein the crystallinity by the peak height method is ≥80%.

81. The catalytic cracking catalyst according to any of the precedent technical solutions, wherein the K1=0.80-0.89, for example, the K1=0.80-0.85.

82. The catalytic cracking catalyst according to any of the precedent technical solutions, wherein the K2=0.87-0.92, for example, the K2=0.88-0.90.

83. The catalytic cracking catalyst according to any of the precedent technical solutions, wherein the K1=0.77-0.88 and the K2=0.87-0.91.

84. The catalytic cracking catalyst according to any of the precedent technical solutions, wherein the molecular sieve based on the crystal modification of kaolin has a proportion of macropores and mesopores of 10-20%.

85. The catalytic cracking catalyst according to any of precedent technical solutions, wherein the silica-alumina ratio measured with the unit cell constant a0 is 5.2-5.5.

86. The catalytic cracking catalyst according to any of precedent technical solutions, wherein the molecular sieve based on the crystal modification of kaolin is prepared with a process comprising the steps of:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A, wherein the mass ratio of the directing agent to the metakaolin is 0.01-1.0, and the reaction raw material A has a composition by molar ratio of $(1-2.5)Na_2O:Al_2O_3:(4-9)SiO_2:(40-100)H_2O$;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product.

87. The catalytic cracking catalyst according to any of precedent technical solutions, wherein the modified molecular sieve based on the crystal modification of kaolin contains rare earth, the modified molecular sieve based on the crystal modification of kaolin has the rare earth content as $RE_2O_3$ of 10-20 wt %.

88. The catalytic cracking catalyst according to any of precedent technical solutions, wherein the process for preparing the heavy oil cracking catalyst, which comprises making the zirconia sol, a second binder, a clay, a cracking active component and water form a mixture, and spray drying, the cracking active component comprises a molecular sieve, the molecular sieve comprises a Y-type molecular sieve and an optional second molecular sieve.

89. The catalytic cracking catalyst according to any of precedent technical solutions, wherein in the process for preparing the heavy oil cracking catalyst, the second binder comprises alumina sol and acidified pseudoboehmite, the process for preparing the heavy oil cracking catalyst comprises the following steps:

(S1) firstly mixing a zirconium sol and an aluminum sol to form a first sol, preferably, controlling the pH value of the first sol to be 2.5-3.5;

(S2) preparing a clay slurry and a cracking active component slurry respectively;

(S3) mixing the clay slurry, the cracking active component slurry, the first sol, and the acidified pseudoboehmite, and dispersing the mixture uniformly (such as stirring, homogenizing, grinding) to produce a second colloid mixture;

(S4) spray-drying the second colloid mixture obtained in step (S3).

90. The catalytic cracking catalyst according to any of precedent technical solutions, wherein in the process for preparing the heavy oil cracking catalyst, the Y-type molecular sieve comprises a modified molecular sieve based on the crystal modification of kaolin, the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1-2.5)Na_2O:Al_2O_3:(4-9)SiO_2:(40-100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product;

(5) ion-exchanging and/or super-stabilizing the recovered product.

91. The catalytic cracking catalyst according to any of precedent technical solutions, wherein in the process for preparing the heavy oil cracking catalyst, the directing agent has a composition of $(10-17)SiO_2:(0.7-1.3)$ $Al_2O_3:(11-18)Na_2O:(200-350)H_2O$.

92. The catalytic cracking catalyst according to any of precedent technical solutions, wherein in the process for preparing the heavy oil cracking catalyst, the second silicon source has the sodium content as $Na_2O$ of <1 wt %.

93. The catalytic cracking catalyst according to any of precedent technical solutions, wherein in the process for preparing the heavy oil cracking catalyst, the second silicon source is a solid silica gel; wherein, the solid silica gel has an average pore size of 1.5-2.0 nm, or the solid silica gel has an average pore size of 4.0-5.0 nm, or the solid silica gel has an average pore size of 10.0 nm or more, or the solid silica gel has an average pore size of 0.8 nm or less.

94. The catalytic cracking catalyst according to any of precedent technical solutions, wherein in the process for preparing the heavy oil cracking catalyst, the second silicon source is a liquid silica gel, the liquid silica gel has the $SiO_2$ content by weight of 1-30%.

95. The catalytic cracking catalyst according to any of precedent technical solutions, wherein in the process for preparing the heavy oil cracking catalyst, both as silica, the second silicon source comprises 4-10 wt % of the total amount of the added silicon.

96. The catalytic cracking catalyst according to any of precedent technical solutions, wherein in the process for preparing the heavy oil cracking catalyst, the ion-exchanging in step (5) is the ammonium ion exchanging and/or the rare earth ion exchanging.

97. The catalytic cracking catalyst according to any of precedent technical solutions, wherein in the process for preparing the heavy oil cracking catalyst, the product obtained from step (5) is further calcined.

98. The catalytic cracking catalyst according to any of precedent technical solutions, wherein in the process for preparing the heavy oil cracking catalyst, the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

99. The catalytic cracking catalyst according to any of precedent technical solutions 1-11, wherein the catalyst is an anti-metal pollution catalytic cracking catalyst, based on the dry basis weight of the catalytic cracking catalyst, comprising: 10-70 wt % of a cracking active component, 1-20 wt % of a zirconia binder, 1-20 wt % of a silica sol binder, 0-50 wt % of an alumina-based binder and 10-70 wt % of a clay.

100. The catalytic cracking catalyst according to any of precedent technical solutions, wherein the zirconia binder is a zirconia sol, the zirconia sol comprises 0.5-20 wt %, for example 5-15 wt %, of $ZrO_2$, a stabilizer, an alkali cation and water, wherein the molar ratio of the stabilizer to Zr is 1-6, the pH value of the zirconia sol is 1-7.

101. The catalytic cracking catalyst according to any of precedent technical solutions, wherein the zirconia sol has a colloidal particle size of 5 nm-15 nm, an average particle diameter of 10±2 nm, and the degree of concentration of 90% or higher.

102. The catalytic cracking catalyst according to any of precedent technical solutions, wherein the zirconia sol is subjected to the heat treatment, i.e., dried at 100° C. for 6 hours and calcined at 600° C. for 2-6 hours, the monoclinic phase and the tetragonal phase coexist in the resulting product, the ratio of the monoclinic phase to the tetragonal phase is preferably 0.05-0.6:1; and/or the zirconia sol is subjected to the heat treatment, i.e., dried at 100° C. for 6 hours and calcined at 800° C. for 2-6 hours, $ZrO_2$ exists in the tetragonal phase in the resulting product.

103. The catalytic cracking catalyst according to any of precedent technical solutions, wherein said stabilizer in the zirconia sol is one or more of glycolic acid, oxalic acid, acetic acid, malonic acid, malic acid, tartaric acid, succinic acid, adipic acid, maleic acid, itaconic acid, citric acid, and the like.

104. The catalytic cracking catalyst according to any of precedent technical solutions, wherein in the zirconia sol, the alkali cation is an ammonium ion or a nitrogen-containing cation formed by the hydrolysis of a water soluble organic base, the water soluble organic base is one or more of methylamine, dimethylamine, trimethylamine, methanol amine, dimethanolamine, trimethanolamine, triethylanmine, ethanolamine, diethanolamine, triethanolamine, N-methyl ethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide, monomethyl-tributylammonium hydroxide, and the like.

105. The catalytic cracking catalyst according to any of precedent technical solutions, wherein in the zirconia sol, the molar ratio of the alkali cation to Zr is 1-8.

106. The catalytic cracking catalyst according to any of precedent technical solutions, wherein in the zirconia sol, the zirconia sol further contains an inorganic acid radical and/or an alcohol, the molar ratio of the inorganic acid radical and/or the alcohol to Zr is 1-6; the inorganic acid radical is for example one or more of sulfate radical, chloride ion, and nitrate radical; the alcohol is for example one or more of methanol, ethanol, propanol, and butanol.

107. The catalytic cracking catalyst according to any of precedent technical solutions, wherein the pH value of the zirconia sol is 1.5-5 preferably 2-3.

108. The catalytic cracking catalyst according to any of precedent technical solutions, wherein the pH value of the silica sol is 1.5-3.5, the particle size of the silica sol is 2 nm-20 nm; in the silica sol, the $SiO_2$ content is preferably 5-15 wt %; in an embodiment, the silica sol is the silica sol prepared by directly acidifying the water glass, the pH value of the silica sol=1.5-3.

109. The catalytic cracking catalyst according to any of precedent technical solutions, wherein the alumina binder is one or more of alumina sol, acidified pseudo-boehmite, phosphorus and/or metal-modified pseudo-boehmite.

110. The catalytic cracking catalyst according to any of precedent technical solutions, wherein the cracking active component comprises 70-100 wt % of a Y-type molecular sieve and 0-30 wt % of a second molecular sieve; the Y-type molecular sieve has the unit cell constant of 2.430 nm-2.480 nm, and the rare earth content as $RE_2O_3$ of 0-20 wt %; the second molecular sieve is a pentasil molecular sieve; the clay is one or more of kaolin, montmorillonite, diatomite, halloysite, metahalloysite, saponite, rectorite, sepiolite, attapulgite, hydrotalcite and bentonite.

111. The catalytic cracking catalyst according to any of precedent technical solutions, wherein the Y-type molecular sieve is a modified molecular sieve based on the crystal modification of kaolin obtained from the modification treatment of a molecular sieve based on the crystal modification of kaolin, having the sodium oxide content of less than 2 wt %, the modification treatment comprises super-stabilizing treatment and/or ion-exchange treatment.

112. The catalytic cracking catalyst according to any of precedent technical solutions, wherein for the molecular sieve based on the crystal modification of kaolin, when measured with an X-ray diffraction method, the crystallinity by the peak height method is ≥60%, and the ratio of the crystallinity by the peak height method to the crystallinity by the peak area method is K1, K1=0.76-0.89; the silica-alumina ratio measured with the unit cell constant a0 is 5.0-5.5, and the ratio of the silica-alumina ratio measured with the unit cell constant a0 to the silica-alumina ratio measured with the chemical method is K2, K2=0.87-0.93, the silica-alumina ratios are both the molar ratio of silica to alumina.

113. The catalytic cracking catalyst according to any of precedent technical solutions, wherein the crystallinity by the peak height method is ≥80%.

114. The catalytic cracking catalyst according to any of precedent technical solutions, wherein for the molecular sieve based on the crystal modification of kaolin, the K1=0.77-0.88 and the K2=0.87-0.91.

115. The catalytic cracking catalyst according to any of precedent technical solutions, wherein the molecular sieve based on the crystal modification of kaolin has a proportion of macropores and mesopores of 10-20%.

116. The catalytic cracking catalyst according to any of precedent technical solutions, wherein for the molecular sieve based on the crystal modification of kaolin, the silica-alumina ratio measured with the unit cell constant a0 is 5.2-5.5.

117. The catalytic cracking catalyst according to any of precedent technical solutions, wherein in the process for preparing the catalytic cracking catalyst, firstly the zirconia binder and the silica sol binder are mixed, and then mixed with the cracking active component, the clay and the alumina-based binder.

118. The catalytic cracking catalyst according to any of precedent technical solutions, wherein the modified molecular sieve based on the crystal modification of kaolin contains rare earth, the modified molecular sieve based on the crystal modification of kaolin has the rare earth content as $RE_2O_3$ of 10-20 wt %.

119. The catalytic cracking catalyst according to any of precedent technical solutions, wherein the catalytic cracking catalyst is prepared with the following process, which comprises: forming a mixture of zirconia sol and silica sol; making the mixture of zirconia sol and silica sol, a cracking active component, a clay and an optional alumina binder form a slurry; and spray drying; wherein the cracking active component comprises a Y-type molecular sieve and an optional second molecular sieve.

120. The catalytic cracking catalyst according to any of precedent technical solutions, wherein the following steps are included:

(s1) mixing a zirconium sol and an aluminum sol, preferably, controlling the pH value of the mixture to be 2.5-3.5;

(s2) preparing a clay slurry;

(s3) preparing a molecular sieve slurry;

(s4) mixing the clay slurry, the molecular sieve slurry, the mixture obtained in step (s1), and an alumina binder;

(s5) uniformly dispersing the slurry obtained in step (s4), and spray drying.

121. The catalytic cracking catalyst according to any of precedent technical solutions, wherein the process for preparing the zirconia sol comprises the following steps:

(1) formulating a zirconium source solution, wherein the zirconium source solution has a concentration of 0.5-20 wt %, for example 5-15 wt % as $ZrO_2$;

(2) adding a stabilizer to the zirconium source solution and stirring for 0.5-3 hours at a temperature between room temperature and 90° C. to produce a first mixed solution; wherein the molar ratio of the stabilizer to zirconium is 1-6;

(3) adding an alkali solution to the first mixed solution to produce a zirconia sol at a temperature between room temperature and 50° C., wherein the alkali solution is used in such an amount that the pH of the zirconia sol is 1-7.

122. The catalytic cracking catalyst according to any of precedent technical solutions, wherein in the process for preparing the zirconia sol, the alkali solution is slowly added to the first mixed solution to produce a clear and transparent zirconia sol; the slow addition is the dropwise addition, or controlling the addition velocity of the alkali solution to be 0.05 mL-50 mL of the alkali solution per minute per liter of the first mixed solution; preferably, the alkali solution is added in such an amount that the pH value of the zirconia sol is 1.5-5, for example 2-3.

123. The catalytic cracking catalyst according to any of precedent technical solutions, wherein the zirconium source is one or more of inorganic zirconium salt and organic zirconium salt, the inorganic zirconium salt is one or more of zirconium tetrachloride, zirconium oxychloride, zirconium acetate, zirconium nitrate, zirconyl nitrate, zirconyl sulphate and zirconyl carbonate; the organic zirconium salt is one or more of zirconium n-propoxide, zirconium isopropoxide, zirconium ethoxide, and zirconium butoxide.

124. The catalytic cracking catalyst according to any of precedent technical solutions, wherein said stabilizer is one or more of glycolic acid, acetic acid, oxalic acid, malonic acid, malic acid, tartaric acid, succinic acid, adipic acid, maleic acid, itaconic acid, and citric acid.

125. The catalytic cracking catalyst according to any of precedent technical solutions, wherein the alkali solution is selected from ammonia water or an aqueous solution of water soluble organic base, the water soluble organic base is for example one or more of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide, and monomethyltributylammonium hydroxide.

126. The catalytic cracking catalyst according to any of precedent technical solutions, wherein the Y zeolite comprises a modified molecular sieve based on the crystal modification of kaolin, the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1-2.5)Na_2O:Al_2O_3:(4-9)SiO_2:(40-100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein both as silica, the second silicon source comprises 0.1-10 wt % of the total amount of the added silicon;

(4) crystallizing the reaction raw material B under stirring at 88-98° C. and recovering the product to produce the molecular sieve based on the crystal modification of kaolin;

(5) ion-exchanging and/or super-stabilizing the recovered molecular sieve based on the crystal modification of kaolin.

127. The catalytic cracking catalyst according to any of precedent technical solutions, wherein the directing agent has a composition of $(10-17)SiO_2:(0.7-1.3)Al_2O_3:(11-18)Na_2O:(200-350)H_2O$.

128. The catalytic cracking catalyst according to any of precedent technical solutions, wherein the second silicon source has the sodium content as $Na_2O$ of <1 wt %, both as silica, the second silicon source comprises 4-10 wt % of the total amount of the added silicon.

129. The catalytic cracking catalyst according to any of precedent technical solutions, Wherein in the process for preparing the modified molecular sieve based on the crystal modification of kaolin, the second silicon source is a solid silica gel and/or a liquid silica gel; wherein, the solid silica gel has an average pore size of 1.5-2.0 nm, or the solid silica gel has an average pore size of 4.0-5.0 nm, or the solid silica gel has an average pore size of 10.0 nm or more, or the solid silica gel has an average pore size of 0.8 nm or less, the liquid silica gel has a $SiO_2$ weight content of 1-30%.

130. The catalytic cracking catalyst according to any of precedent technical solutions, wherein the ion-exchanging in step (5) is the ammonium ion exchanging and/or the rare earth ion exchanging.

131. The catalytic cracking catalyst according to any of precedent technical solutions, wherein the ion-exchanging comprises the rare earth ion exchanging, and the modified molecular sieve based on the crystal modification of kaolin obtained from step (5) has the rare earth content as $RE_2O_3$ of 10-20 wt %, and the sodium oxide content of less than 2 wt %.

132. The catalytic cracking catalyst according to any of the precedent technical solutions 1-11, wherein the catalyst is a catalytic cracking catalyst for producing lower carbon olefins, comprising: 10-60 wt % of a cracking active component on the dry basis, 20-60 wt % of a binder on the dry basis, and 0-70 wt % of a second clay on the dry basis; wherein, based on the dry basis weight of the binder, on the dry basis, the binder comprises 1-50 wt % of a zirconia sol, 50-99 wt % of a phosphorus-aluminum inorganic binder and 0-45 wt % of a third binder;

the cracking active component comprises a first molecular sieve and optionally a second molecular sieve, the first molecular sieve is a pentasil molecular sieve; on the dry basis, the first molecular sieve comprises 70 wt % or more of the cracking active component; Preferably, the cracking active component contains 70-100 wt % of the first molecular sieve, and 0-30 wt % of the second molecular sieve;

the zirconia sol comprises 0.5-20 wt % of $ZrO_2$, a stabilizer, an alkali cation and water, wherein the molar ratio of the stabilizer to Zr is 1-6, the pH value of the zirconia sol is 1-7;

the phosphorus-aluminum inorganic binder contains 15-40 wt % of an alumina source component as $Al_2O_3$, 45-80 wt % of a phosphorus component (as $P_2O_5$) and 0-40 wt % of a first clay on the dry basis, and has a P/Al weight ratio of 1-6, a pH value of 1-3.5, and a solid content of 15-60 wt %.

133. The catalytic cracking catalyst according to any of precedent technical solutions, wherein the third binder is one or more of silica sol, alumina sol, silica-alumina gel, acidified pseudo-boehmite, and metal-modified pseudo-boehmite.

134. The catalytic cracking catalyst according to any of precedent technical solutions, wherein the first molecular sieve is one or more of MFI-structured molecular sieve, BEA structure molecular sieve, and mordenite.

135. The catalytic cracking catalyst according to any of precedent technical solutions, wherein the second molecular sieve is a Y-type molecular sieve, the Y-type molecular sieve has a rare earth content of 0-20 wt %, preferably 0-12 wt %.

136. The catalytic cracking catalyst according to any of precedent technical solutions, wherein the Y-type molecular sieve is one or more of a DASY molecular sieve, a rare earth-containing DASY molecular sieve, a USY molecular sieve, a rare earth-containing USY molecular sieve, a REY molecular sieve, an HY molecular sieve, a REHY molecular sieve, a modified Y-type molecular sieve synthesized from kaolin by in-situ crystallization.

137. The catalytic cracking catalyst according to any of precedent technical solutions, wherein the second molecular sieve is an ion-modified super-stabilized molecular sieve based on the crystal modification of kaolin; based on the weight of the catalytic cracking catalyst, the content of the ion-modified super-stabilized molecular sieve based on the crystal modification of kaolin in the catalytic cracking catalyst is preferably 1-10 wt %.

138. The catalytic cracking catalyst according to any of precedent technical solutions, wherein the second clay is one or more of kaolin, montmorillonite, diatomite, halloysite, metahalloysite, saponite, rectorite, sepiolite, attapulgite, hydrotalcite and bentonite; the first clay is one or more of kaolin, montmorillonite, diatomite, halloysite, metahalloysite, saponite, rectorite, sepiolite, attapulgite, hydrotalcite and bentonite, the first clay is preferably one or more of kaolin, sepiolite, attapulgite, rectorite, montmorillonite and diatomite.

139. The catalytic cracking catalyst according to any of precedent technical solutions, wherein the process for preparing the phosphorus-aluminum inorganic binder comprises:

(1) an alumina source, a first clay and water are mixed under vigorously stirring and dispersed into a slurry having a solid content of 8-45 wt %; the alumina source is aluminum hydroxide and/or alumina that can be peptized by an acid, and the weight ratio of the first clay (dry basis) to the alumina source as $Al_2O_3$ is 0-40:15-40;

(2) a concentrated phosphoric acid is added into the slurry obtained in step (1) under stirring according to the weight ratio of P/Al=1-6; wherein the concentration of the concentrated phosphoric acid is, for example, 50-98 wt %;

(3) the slurry obtained in step (2) is reacted at a temperature of 50-99° C. for 15-90 minutes.

140. The catalytic cracking catalyst according to any of precedent technical solutions, wherein the phosphorus-aluminum inorganic binder comprises 15-35 wt % of $Al_2O_3$ derived from the alumina source, 50-75 wt % of $P_2O_5$, and 0-35 wt % of the first clay on a dry basis, e.g. 5-30 wt % of the first clay.

141. The catalytic cracking catalyst according to any of precedent technical solutions, wherein the P/Al weight ratio is 2-5.

142. The catalytic cracking catalyst according to any of precedent technical solutions, wherein the alumina source is one or more of ρ-alumina, χ-alumina, η-alumina, γ-alumina, κ-alumina, δ-alumina, θ-alumina, gibbsite, bayerite, nordstrandite, diaspore, boehmite and pseudo-boehmite.

143. The catalytic cracking catalyst according to any of precedent technical solutions, wherein the zirconia sol has a colloidal particle size of 5 nm-15 nm, an average particle diameter of 10±2 nm, and a degree of concentration of 90% or higher.

144. The catalytic cracking catalyst according to any of precedent technical solutions, wherein the zirconia sol is subjected to the heat treatment, i.e., dried at 100° C. for 6 hours and calcined at 600° C. for 2-6 hours, the monoclinic phase and the tetragonal phase coexist in the resulting product, the ratio of the monoclinic phase to the tetragonal phase is preferably 0.05-0.6:1; and/or the zirconia sol is subjected to the heat treatment, i.e., dried at 100° C. for 6 hours and calcined at 800° C. for 2-6 hours, $ZrO_2$ exists in the tetragonal phase in the resulting product.

145. The catalytic cracking catalyst according to any of precedent technical solutions, wherein said stabilizer is one or more of glycolic acid, oxalic acid, acetic acid, malonic acid, malic acid, tartaric acid, succinic acid, adipic acid, maleic acid, itaconic acid, and citric acid.

146. The catalytic cracking catalyst according to any of precedent technical solutions, wherein the alkali cation is an ammonium ion or a nitrogen-containing cation formed by the hydrolysis of a water soluble organic base, the water soluble organic base is for example one or more of methylamine, dimethylamine, trimethylamine, methanolamine, dimethanolamine, trimethanolamine, triethylanmine, ethanolamine, diethanolamine, triethanolamine, N-methyl ethanolamine, tetramethylammonium hydroxide, tetraethylammonium hydroxide, tetrapropylammonium hydroxide, tetraisopropylammonium hydroxide, tetrabutylammonium hydroxide, monomethyltriethyl ammonium hydroxide, 2-hydroxy-N,N-bis(2-hydroxyethyl)-N-methylethan-1-aminium hydroxide, monomethyltributylammonium hydroxide, and the like.

147. The catalytic cracking catalyst according to any of precedent technical solutions, wherein the molar ratio of the alkali cation to Zr is 1-8.

148. The catalytic cracking catalyst according to any of precedent technical solutions, wherein the zirconia sol further contains an inorganic acid radical and/or an alcohol, the molar ratio of the inorganic acid radical and/or the alcohol to Zr is 1-6:1; preferably, the inorganic acid radical is one or more of sulfate radical, chloride ion, and nitrate radical, the alcohol is one or more of methanol, ethanol, propanol, and butanol.

149. The catalytic cracking catalyst according to any of precedent technical solutions, wherein the pH value of the zirconia sol is 2-4.

150. The catalytic cracking catalyst according to any of precedent technical solutions, wherein the zirconia sol is prepared from a preparation process comprising the following steps:

(1) formulating a zirconium source solution, wherein the zirconium source solution has a concentration of 0.5-20 wt % as $ZrO_2$;

(2) adding a stabilizer to the zirconium source solution to produce a first mixed solution; wherein the molar ratio of the stabilizer to zirconium is 1-6;

(3) adding an alkali solution to the first mixed solution to produce a zirconia sol at a temperature between room temperature and 50° C., wherein the alkali solution is used in such an amount that the pH of the zirconia sol is 1-7.

151. The catalytic cracking catalyst according to any of precedent technical solutions, wherein the process for preparing the modified molecular sieve based on the crystal modification of kaolin comprises the following steps:

(1) converting kaolin into metakaolin by calcining and dehydrating at 500-900° C., and pulverizing it into metakaolin powder with a particle size of less than 10 microns;

(2) adding a directing agent, sodium silicate, a sodium hydroxide solution and water to the metakaolin powder to produce a reaction raw material A having a composition of $(1\text{-}2.5)Na_2O:Al_2O_3:(4\text{-}9)SiO_2:(40\text{-}100)H_2O$, wherein the mass ratio of the directing agent to the metakaolin is 0.01-1.0;

(3) crystallizing the reaction raw material A at 88-98° C. under stirring for 1-70 hours, then supplementing a second silicon source to obtain a reaction raw material B, wherein all silicon are calculated as silica, and the second silicon source comprises 0.1-10 wt % of the total amount of the added silicon;

(4) crystallizing the reaction raw material B under stirring at 88-98° C. and recovering the product to produce the molecular sieve based on the crystal modification of kaolin;

(5) ion-exchanging and/or super-stabilizing the obtained molecular sieve based on the crystal modification of kaolin.

152. The catalytic cracking catalyst according to any of the precedent technical solutions 1-11, wherein said catalytic cracking catalyst contains a composite, wherein the composite comprises a zirconia sol and a silica-alumina material, based on the total amount of the composite, on the dry basis, the content of the zirconia sol is 30-80 wt %, the content of the silica-alumina material is 20-70 wt %.

153. The catalytic cracking catalyst according to any of precedent technical solutions, wherein the zirconia sol has a colloidal particle size of 5-15 nm, an average particle diameter of 8-12 nm, and a degree of concentration of 90% or higher.

154. The catalytic cracking catalyst according to any of precedent technical solutions, wherein the process for preparing the zirconia sol comprises:

(a) mixing a solution containing a zirconium source with an acid to obtain a first mixed solution;

(b) adding an alkali solution to the first mixed solution to obtain the zirconium sol.

155. The catalytic cracking catalyst according to any of precedent technical solutions, wherein in step (a), as $ZrO_2$, the concentration of the solution containing the zirconium source is 0.5-20 wt %;

preferably, in step (a), the molar ratio of the solution containing the zirconium source as the Zr element to the acid is 1:1-6;

preferably, the mixing conditions in step (a) include: the temperature is 20-90° C., and the time is 0.5-3 hours;

preferably, the acid in step (a) is an organic acid, more preferably at least one of glycolic acid, acetic acid, oxalic acid, malonic acid, malic acid, tartaric acid, succinic acid, adipic acid, maleic acid, itaconic acid and citric acid, further preferably acetic acid and/or citric acid;

preferably, the zirconium source is an inorganic zirconium salt and/or an organic zirconium salt;

further preferably, the inorganic zirconium salt is at least one of zirconium tetrachloride, zirconium oxychloride, zirconium acetate, zirconium nitrate, zirconyl nitrate, zirconyl sulphate and zirconyl carbonate;

further preferably, the organic zirconium salt is at least one of zirconium n-propoxide, zirconium isopropoxide, zirconium ethoxide and zirconium butoxide.

156. The catalytic cracking catalyst according to any of precedent technical solutions, wherein the alkali solution in step (b) is added in such an amount that the pH value of the zirconia sol is 1-7, preferably 1.5-5, further preferably 2-3;

preferably, the alkali solution in step (b) is an ammonia water and/or a water soluble organic base; further preferably, the water soluble organic base is at least one of methylamine, dimethylamine, trimethylamine, methanolamine, dimethanolamine, trimethanolamine, triethylanmine, ethanolamine, diethanolamine, triethanolamine, N-methylethanolamine, tetramethylammonium hydroxide, tetraethylammonium hydroxide, tetrapropylammonium hydroxide, tetraisopropylammonium hydroxide, tetrabutylammonium hydroxide, monomethyltriethylammonium hydroxide, 2-hydroxy-N,N-bis(2-hydroxyethyl)-N-methylethan-1-aminium hydroxide and monomethyltributylammonium hydroxide.

157. The catalytic cracking catalyst according to any of precedent technical solutions, wherein the silica-alumina material has a composition as the weight ratio of oxides of $(0\text{-}1)Na_2O\cdot(15\text{-}50)Al_2O_3\cdot(85\text{-}50)SiO_2$;

preferably, the silica-alumina material has an average pore size of 10-100 nm, a specific surface area of 150-600 $m^2/g$, and a pore volume of 0.5-1.5 $cm^3/g$.

158. The catalytic cracking catalyst according to any of precedent technical solutions, wherein the process for preparing the silica-alumina material comprises:

(i) mixing a silicon source with an aluminum source to obtain a mixture containing the silicon source and the aluminum source;

(ii) adding an alkali solution to the mixture containing the silicon source and the aluminum source to produce a slurry, and then aging the slurry to produce a solid precipitate;

(iii) contacting the solid precipitate with an ammonium salt or an acid to produce a silica-alumina material.

159. The catalytic cracking catalyst according to any of precedent technical solutions, wherein in step (i), the molar ratio of the silicon source as $SiO_2$ to the aluminum source as $Al_2O_3$ is 50-85:50-15;

preferably, the mixing conditions in step (i) comprise: the temperature is 20-95° C.;

preferably, the silicon source in step (i) is an alkaline silicon source, more preferably one or more of alkaline silica sol, water glass, sodium silicate, and an alkaline hydrolysis product of silicon alkoxide;

preferably, in step (i) the aluminum source is an acidic aluminum source, more preferably one or more of aluminum sulfate, aluminum chloride, alumina sol, and an acidic hydrolysis product of aluminum alkoxide.

160. The catalytic cracking catalyst according to any of precedent technical solutions, wherein in step (ii) the alkali solution is added in such an amount that the pH value of the slurry is 8-10.5;

preferably, in step (ii), the aging conditions comprise: the temperature is 50-95° C., the time is 1-10 hours;

preferably, in step (ii) the alkali solution is at least one of ammonia water, sodium hydroxide solution, potassium hydroxide solution and sodium metalluminate solution.

161. The catalytic cracking catalyst according to any of precedent technical solutions, wherein in step (iii), the mode of contacting the solid precipitate with the ammonium salt is to mix the solid precipitate with the ammonium salt and water to perform the ammonium exchanging;

preferably, the weight ratio of the solid precipitate (on the dry basis):ammonium salt:water is 1:0.05-0.1:5-30;

preferably, the ammonium exchanging condition is such one that the sodium content of the silica-alumina material is below 1 wt %;

further preferably, the ammonium exchanging conditions comprise: the temperature is 20-100° C., the exchanging number is 1-3 times, the time for each exchanging is 0.5-1 hours;

preferably, the ammonium salt is at least one of ammonium chloride, ammonium sulfate, ammonium nitrate, ammonium carbonate and ammonium bicarbonate.

162. The catalytic cracking catalyst according to any of precedent technical solutions, wherein in step (iii), the mode of contacting the solid precipitate with the acid is to mix the solid precipitate with the acid and water to perform the acid treatment;

preferably, the weight ratio of the solid precipitate (on the dry basis):acid:water is 1:0.03-0.3:5-30;

preferably, the acid treatment condition is such one that the sodium content of the silica-alumina material is below 1 wt %;

Further preferably, the acid treatment condition comprises: the temperature is 20-100° C., the time is at least 0.5 hour, more preferably 1-3 hours;

preferably, the acid is at least one of sulfuric acid, hydrochloric acid and nitric acid.

163. The catalytic cracking catalyst according to any of precedent technical solutions, wherein the catalyst comprises a molecular sieve, an alumina-based binder, a clay and the aforementioned composite, based on the total amount of the catalyst, the content of the molecular sieve is 10-70 wt %, the content of the alumina-based binder is 5-30 wt %, the content of the clay is 10-70 wt %, the content of the composite is 6-50 wt %;

the molecular sieve comprises a first molecular sieve and an optional second molecular sieve, based on the total amount of the molecular sieve, the content of the first molecular sieve is 70-100 wt %, the content of the second molecular sieve is 0-30 wt %;

the first molecular sieve is a Y-type molecular sieve, wherein the content of the rare earth element in the Y-type molecular sieve is 0-20 wt %; the second molecular sieve is a pentasil molecular sieve.

164. The catalytic cracking catalyst according to any of precedent technical solutions, wherein the Y-type molecular sieve is at least one of an HY molecular sieve, a REY molecular sieve, a molecular sieve based on the crystal modification of kaolin, a REHY molecular sieve, a USY molecular sieve, a REUSY molecular sieve, a DASY molecular sieve and a REDASY molecular sieve;

preferably, the first molecular sieve is a REY molecular sieve and/or a rare earth element-modified molecular sieve based on the crystal modification of kaolin;

further preferably, the content of the rare earth element in the molecular sieve based on the crystal modification of kaolin is 10-20 wt %;

preferably, the rare earth element is at least one of La, Ce, Pr, Nd, Pm, Sm, Eu, Gd, Tb, Dy, Ho, Er, Tm, Yb and Lu, more preferably La.

165. The catalytic cracking catalyst according to any of precedent technical solutions, wherein for the molecular sieve based on the crystal modification of kaolin, the ratio of the crystallinity by the peak height method to the crystallinity by the peak area method is 0.76-0.89;

preferably, for the molecular sieve based on the crystal modification of kaolin, the ratio of the silica-alumina ratio obtained from the calculation with the unit cell constant to the silica-alumina ratio measured with the chemical method is 0.87-0.93;

preferably, the molecular sieve based on the crystal modification of kaolin has a proportion of macropores and mesopores of 10-20%.

166. The catalytic cracking catalyst according to any of precedent technical solutions, wherein the process for preparing the molecular sieve based on the crystal modification of kaolin comprises:

(1) calcining kaolin to produce metakaolin, and then mixing the metakaolin with a sodium silicate solution, a directing agent and an alkali solution to produce a mixed slurry;

(2) subjecting the mixed slurry to a first crystallization, mixing a solid silica gel, and then subjecting to a second crystallization and drying to produce a molecular sieve based on the crystal modification of kaolin.

167. The catalytic cracking catalyst according to any of precedent technical solutions, wherein in step (1), said calcining conditions comprise: the temperature is 500-900° C., and the time is 1-10 hours;

preferably, in step (1), the mass ratio of the directing agent to metakaolin is 0.01-1.

168. The catalytic cracking catalyst according to any of precedent technical solutions, wherein in step (2), the conditions for the first crystallization comprise: the temperature is 88-98° C., the time is 1-70 hours;

preferably, in step (2) the mass ratio of the solid silica gel to metakaolin is 0.01-1;

preferably, in step (2) the conditions for the second crystallization comprise: the temperature is 88-98° C., the time is 1-20 hours.

169. The catalytic cracking catalyst according to any of precedent technical solutions, wherein the pentasil molecular sieve is at least one of BEA-type molecular sieve, MFI-type molecular sieve and mordenite-type molecular sieve, more preferably BEA-type molecular sieve and/or MFI-type molecular sieve;

preferably, the MFI-type molecular sieve is at least one of rare earth-containing MFI-type molecular sieve, phosphorus-containing MFI-type molecular sieve and Fe-containing MFI-type molecular sieve;

preferably, the mordenite-type molecular sieve is high silica mordenite-type molecular sieve and/or low silica mordenite-type molecular sieve.

170. The catalytic cracking catalyst according to any of the precedent technical solutions, wherein the alumina-based binder is at least one of alumina sol, acidified pseudo-boehmite and metal-modified pseudo-boehmite;

preferably, the clay is one or more of kaolin, giagerite, montmorillonite, diatomite, metahalloysite, saponite, rectorite, sepiolite, attapulgite, hydrotalcite, and bentonite.

EXAMPLES

The present invention will be described in detail below by way of examples. In the following examples, all raw materials used can be obtained from commercial sources unless otherwise specified.

The raw materials used in the catalyst preparation examples are as follows:

DASY molecular sieve: a product of Sinopec Catalyst Qilu Branch, with the $Na_2O$ content of 1.02 wt %, the rare earth content (as $RE_2O_3$) of 2.3 wt %, and the silica-alumina ratio ($SiO_2/Al_2O_3$ molar ratio) of 10.4;

REY molecular sieve: a product of Sinopec Catalyst Qilu Branch, with the rare earth content (as $RE_2O_3$) of 16-17.6 wt %;

SOY-8 molecular sieve: a product of Sinopec Catalyst Qilu Branch, with the rare earth content (as $RE_2O_3$) of 8 wt %;

ZRP-1 molecular sieve: a product of Sinopec Catalyst Qilu Branch, with the $P_2O_5$ content of 5 wt %;

ZSP-3 molecular sieve: a product of Sinopec Catalyst Qilu Branch, with the $P_2O_5$ content of 3.02 wt %, the ($SiO_2/Al_2O_3$) ratio of 45, and the $Na_2O$ content of 0.02 wt %;

β molecular sieve: a product of Sinopec Catalyst Qilu Branch, with the silica-alumina ratio ($SiO_2:Al_2O_3$ molar ratio) of 25; Ammonia water: Sinopharm, analytically pure, 28 wt %;

Zirconium oxychloride octohydrate: commercially available from Aldrich company, analytically pure, 98.5%;

Glacial acetic acid: Sinopharm, analytically pure, 99 wt %;

Oxalic acid: Sinopharm, analytically pure, 99 wt %;

Acetic acid: Sinopharm, analytically pure, 99 wt %;

Kaolin: solid content 75 wt %, produced by China Kaolin Clay Co. Ltd. (Suzhou);

Aluminum sulfate: Sinopharm, analytically pure, 99%;

Alumina sol: a product from SINOPEC Catalyst Co., Ltd. QILU Division, having a solid content of 23-25 wt %;

Pseudo-boehmite: a product from Aluminum Corporation of China Limited, Shandong Division, having a solid content of 65-75 wt %;

Sodium hydroxide: Sinopharm, analytically pure, 99 wt %;

Triethanolamine: Sinopharm, analytically pure, 99 wt %;

Water glass: Qilu Catalyst Branch, $SiO_2$: 250 g/L;

Hydrochloric acid: Sinopharm, analytically pure, 36 wt %;

Zirconium oxychloride: commercially available from Aldrich company, analytically pure, content: 98.5 wt %;

Zirconium isopropoxide: Sinopharm, analytically pure, 99 wt %;

The specific surface area: measured with the nitrogen adsorption method (GB/T5816-1995); the pore volume: measured with the nitrogen adsorption method (RIPP151-90), and the pores with a pore diameter greater than 0.8 nm were defined as mesopores and macropores, and the equation for the proportion of mesopores and macropores: ($V_{total\ pores}-V_{micropores}$)/$V_{total\ pores}$×100%.

The contents of elements in catalysts and molecular sieves were determined by XRF, and the specific surface area and the pore volume were determined by low-temperature nitrogen adsorption-desorption method.

Unit cell constant a0 was determined according to the RIPP145-90 standard method. The framework silica-alumina ratio was calculated from the unit cell constant a0 (angstroms) according to the following formula: $SiO_2/Al_2O_3$ (molar ratio)=2×(25.858–a0)/(a0–24.191).

The content of NaY zeolite in the composite in the examples was measured according to the RIPP146-90 standard method (for the RIPP standard method, see "Petrochemical Analysis Method (RIPP Test Method)", edited by Yang Cuiding et al., Science Press, published in 1990, the same below).

The wear index of the catalyst was determined by the RIPP28-90 and RIPP29-90 methods in "Petrochemical Analysis Methods, RIPP Test Method" (edited by Yang Cuiding, Science Press, published in 1990).

Average size of the crystal grains: 50 crystal grains were randomly sampled to measure their sizes and arithmetically averaged.

Preparation of Directing Agent 250 kg of sodium silicate solution (containing 20.05 wt % of $SiO_2$ and 6.41 wt % of $Na_2O$) was slowly added to 120 kg of sodium metaaluminate solution (containing 3.15 wt % of $Al_2O_3$ and 21.1 wt % of $Na_2O$) under rapid stirring at 30° C. The mixture was stirred for 1 hour, and aged at 20° C. for 48 hours to produce a directing agent. The directing agent had a composition of $16Na_2O:Al_2O_3:15SiO_2:320H_2O$.

Preparation of Molecular Sieve Based on the Crystal Modification of kaolinZeolite Material A To 100 kg of pulverized metakaolin powder were added under stirring 400 kg of sodium silicate solution (containing 20.05 wt % of $SiO_2$ and 6.41 wt % of $Na_2O$), 60 kg of directing agent and 100 kg of sodium hydroxide solution having a concentration of 5 wt %. The mixture was heated up to 95° C. and stirred at a constant temperature. After 8 hours, 10 kg of solid silica gel (Qingdao Ocean Chemical Engineering Group Special Silica Gel Factory, Type A) was added, and the resulting mixture was recrystallized for 12 hours. The stirring speed was 400 rpm during the addition and the crystallization. After the crystallization was completed, the product in the crystallization tank was quenched, filtered, washed with water until the pH value of the washing solution was less than 10, and dried at 120° C. for 2 hours to produce the zeolite material A.

The zeolite material A was measured with an X-ray diffraction method. The crystallinity by the peak height method, the ratio of the crystallinity by the peak height method to the crystallinity by the peak area method (the K1 value), the silica-alumina ratio measured with the unit cell constant a0, the ratio of the silica-alumina ratio measured with the unit cell constant a0 to the silica-alumina ratio measured with the chemical method (the K2 value), the proportion of mesopores and macropores were shown in Table 1.

Zeolite Material B

To 100 kg of pulverized metakaolin powder were added under stirring 380 kg of sodium silicate solution (containing 20.05 wt % of $SiO_2$ and 6.41 wt % of $Na_2O$), 60 kg of directing agent and 100 kg of sodium hydroxide solution having a concentration of 5 wt %. The mixture was heated up to 93° C. and stirred at a constant temperature. After 8 hours, 15 kg of solid silica gel (Qingdao Ocean Chemical Engineering Group Special Silica Gel Factory, Type A) was added, and the resulting mixture was recrystallized for 14 hours. The stirring speed was 400 rpm during the addition and the crystallization. After the crystallization was completed, the product in the crystallization tank was quenched, filtered, washed with water until the pH value of the washing solution was less than 10, and dried at 120° C. for 2 hours to produce the zeolite material B.

The zeolite material B was measured with an X-ray diffraction method. The crystallinity by the peak height method, the ratio of the crystallinity by the peak height method to the crystallinity by the peak area method (the K1 value), the silica-alumina ratio measured with the unit cell constant a0, the ratio of the silica-alumina ratio measured with the unit cell constant a0 to the silica-alumina ratio measured with the chemical method (the K2 value), the proportion of mesopores and macropores were shown in Table 1.

Zeolite Material C

To 100 kg of pulverized metakaolin powder were added under stirring 360 kg of sodium silicate solution (containing 20.05 wt % of $SiO_2$ and 6.41 wt % of $Na_2O$), 60 kg of directing agent and 100 kg of sodium hydroxide solution having a concentration of 5 wt %. The mixture was heated up to 95° C. and stirred at a constant temperature. After 8 hours, 20 kg of solid silica gel (Qingdao Ocean Chemical Engineering Group Special Silica Gel Factory, Type A) was added, and the resulting mixture was recrystallized for 16 hours. The stirring speed was 400 rpm during the addition and the crystallization. After the crystallization was completed, the product in the crystallization tank was quenched, filtered, washed with water until the pH value of the washing solution was less than 10, and dried at 120° C. for 2 hours to produce the zeolite material C.

The zeolite material C was measured with an X-ray diffraction method. The crystallinity by the peak height method, the ratio of the crystallinity by the peak height method to the crystallinity by the peak area method (the K1 value), the silica-alumina ratio measured with the unit cell constant a0, the ratio of the silica-alumina ratio measured with the unit cell constant a0 to the silica-alumina ratio measured with the chemical method (the K2 value), the proportion of mesopores and macropores were shown in Table 1.

Zeolite Material D (Comparative)

This comparative example illustrated a case where two silicon sources were added to the reaction system at the same time.

To 100 kg of pulverized metakaolin powder were added under stirring 400 kg of sodium silicate solution (containing 20.05 wt % of $SiO_2$ and 6.41 wt % of $Na_2O$), 60 kg of directing agent, 105 kg of sodium hydroxide solution having a concentration of 5 wt %, and 10 kg of solid silica gel (Qingdao Ocean Chemical Engineering Group Special Silica Gel Factory, Type A). The mixture was heated up to 94° C. and stirred at a constant temperature. The resulting mixture was crystallized for 24 hours. The stirring speed was 400 rpm during the addition and the crystallization. After the crystallization was completed, the product in the crystallization tank was quenched, filtered, washed with water until the pH value of the washing solution was less than 10, and dried at 120° C. for 2 hours to produce the zeolite material D.

The zeolite material D was measured with an X-ray diffraction method. The crystallinity by the peak height method, the ratio of the crystallinity by the peak height method to the crystallinity by the peak area method (the K1 value), the silica-alumina ratio measured with the unit cell constant a0, the ratio of the silica-alumina ratio measured with the unit cell constant a0 to the silica-alumina ratio measured with the chemical method (the K2 value), the proportion of mesopores and macropores were shown in Table 1. The zeolite material D had low crystallinity and contained impurity crystals.

Zeolite Material E (Comparative)

This comparative example illustrated a case where no second silicon source was added.

To 100 kg of pulverized metakaolin powder were added under stirring 400 kg of sodium silicate solution (containing 20.05 wt % of $SiO_2$ and 6.41 wt % of $Na_2O$), 60 kg of directing agent, and 100 kg of sodium hydroxide solution having a concentration of 5 wt %. The mixture was heated up to 94° C. and stirred at a constant temperature. The resulting mixture was crystallized for 24 hours. The stirring speed was 400 rpm during the addition and the crystallization. After the crystallization was completed, the product in the crystallization tank was quenched, filtered, washed with water until the pH value of the washing solution was less than 10, and dried at 120° C. for 2 hours to produce the zeolite material E.

The zeolite material E was measured with an X-ray diffraction method. The crystallinity by the peak height method, the ratio of the crystallinity by the peak height method to the crystallinity by the peak area method (the K1 value), the silica-alumina ratio measured with the unit cell constant a0, the ratio of the silica-alumina ratio measured with the unit cell constant a0 to the silica-alumina ratio measured with the chemical method (the K2 value), the proportion of mesopores and macropores were shown in Table 1. The crystallinity of the zeolite material E was not bad, but its silica-alumina ratio was relatively low.

Zeolite Material F (Comparative)

This comparative example illustrated the NaY molecular sieve prepared according to the method of CN101468803 A.

189 mL of deionized water, 86.6 g of directing agent, 130 mL of aluminum sulfate solution (a product of Changling Oil Refinery Chemical Plant Catalyst Factory, specific gravity=1.28, $Al_2O_3$ content=88.2 g/L) and 100 mL of sodium metaaluminate solution (a product of Changling Oil Refinery Chemical Plant Catalyst Factory, specific gravity=1.23, $Al_2O_3$ content=102 g/L, $Na_2O$ content=151.9 g/L) were added to 401 mL of sodium silicate. The mixture was stirred vigorously for 30 minutes, and stood at 100° C. for 33 hours to crystallize. The obtained product was recovered and denoted as zeolite material F.

The zeolite material F was measured with an X-ray diffraction method. The crystallinity by the peak height method, the ratio of the crystallinity by the peak height method to the crystallinity by the peak area method (the K1 value), the silica-alumina ratio measured with the unit cell constant a0, the ratio of the silica-alumina ratio measured with the unit cell constant a0 to the silica-alumina ratio measured with the chemical method (the K2 value), the proportion of mesopores and macropores were shown in Table 1.

TABLE 1

| Zeolite material | Crystallinity (peak height method) | K1 | Unit cell constant a0, angstrom | Framework silica-alumina ratio | K2 | Proportion of mesopores and macropores, % |
|---|---|---|---|---|---|---|
| A | 78.9 | 0.880 | 24.65 | 5.27 | 0.886 | 20 |
| B | 79.6 | 0.860 | 24.64 | 5.43 | 0.880 | 20 |

TABLE 1-continued

| Zeolite material | Crystal-linity (peak height method) | K1 | Unit cell constant a0, angstrom | Frame-work silica-alumina ratio | K2 | Proportion of mesopores and macropores, % |
|---|---|---|---|---|---|---|
| C | 81.9 | 0.868 | 24.64 | 5.43 | 0.889 | 15 |
| D | 40.8 | 0.758 | 24.64 | 5.43 | 0.896 | 20 |
| E | 77.8 | 0.855 | 24.69 | 4.68 | 0.985 | 15 |
| F | 88.1 | 0.926 | 24.66 | 5.11 | 0.937 | 10 |

Silica-Alumina Material

Silica-Alumina Material A

A water glass solution ($SiO_2$ concentration=250 g/L) was added dropwise to an aluminum sulfate solution (the aluminum sulfate solution had a concentration of 90 g/L as $Al_2O_3$) according to the weight ratio of $SiO_2$:$Al_2O_3$=75:25 at room temperature (25° C.) under stirring. After the completion of addition, a sodium hydroxide solution (concentration=300 g/L) was added until the pH value of the slurry was 10. Then the slurry was aged at 50° C. for 6 hours. The obtained solid precipitate was dried at 120° C. for 6 hours, then washed with an ammonium chloride solution (concentration=50 g/L), and filtered to produce the silica-alumina material A with a sodium content of less than 1%. Its elemental analysis showed a chemical weight composition of 0.2 $Na_2O$·25 $Al_2O_3$·74.8 $SiO_2$; a specific surface area of 324 $m^2$/g, a pore volume of 1.26 $cm^3$/g, and a proportion of the pore volume of the pores having a pore diameter of greater than 10 nm to the total pore volume of 82%. In the material, the pseudo-boehmite crystal grains had an average size of 2.2 nm and a most probable pore size of 33.2 nm.

Silica-Alumina Material B

A water glass solution ($SiO_2$ concentration=250 g/L) was added dropwise to an aluminum sulfate solution (the aluminum sulfate solution had a concentration of 90 g/L as $Al_2O_3$) according to the weight ratio of $SiO_2$:$Al_2O_3$=60:30 at 50° C. under stirring. After the completion of addition, a sodium hydroxide solution (concentration=300 g/L) was added until the pH value of the slurry was 9.5. Then the slurry was aged at 70° C. for 8 hours. The obtained solid precipitate was dried at 120° C. for 6 hours, then washed with an ammonium chloride solution, and filtered to produce the silica-alumina material B with a sodium content of below 1 wt %. Its elemental analysis showed a chemical weight composition of 0.1 $Na_2O$·25.2 $Al_2O_3$·59.7 $SiO_2$; a specific surface area of 331 $m^2$/g, a pore volume of 1.30 $cm^3$/g, and a proportion of the pore volume of the pores having a pore diameter of greater than 10 nm to the total pore volume of 75%. In the material, the pseudo-boehmite crystal grains had an average size of 2.8 nm and a most probable pore size of 26.4 nm.

Silica-Alumina Material C (Comparative)

(1) An $Al_2(SO_4)_3$ solution with a concentration of 90 g $Al_2O_3$/L and a NaAlO2 solution with a concentration of 102 g $Al_2O_3$/L and a caustic ratio of 2.5, used as reaction raw materials, were mixed under vigorous stirring and gelatinized in a co-current gelatinizing mode. The temperature of the system was controlled at 40° C., the pH value of the system was controlled to 9.0, and the gelatinized slurry was collected; (2) water glass with a concentration of 60 g $SiO_2$/L to the gelatinized slurry according to the weight ratio of $SiO_2$:$Al_2O_3$=1:2 under stirring, and the resulting mixture was heated up to 60° C. and aged for 3 hours to produce a first solid precipitate; (3) $NH_4Cl$ and deionized water were added to the first solid precipitate according to the weight ratio of the precipitate (dry basis):ammonium salt:$H_2O$=1:0.5:12, the precipitate was ion-exchanged at 60° C. to remove sodium ions, the ion-exchanging was repeated once, each ion-exchanging for 0.5 hours, until the sodium oxide content was below 0.3%, and a second solid precipitate was obtained; (4) Then the second solid precipitate was vigorously mixed and stirred with water according to the weight ratio of the precipitate (dry basis):$H_2O$=1:8, and then phosphoric acid and magnesium nitrate were added according to the weight ratio of $P_2O_5$:MgO:the material (dry basis)=0.033:0.022:1. The resulting mixture was react at 80° C. for 1 hour, filtered, washed with water, then dried at 120° C. for 10 hours to produce the silica-alumina material C, which had a pseudo-boehmite structure. Its elemental analysis showed a chemical composition of 0.12 $Na_2O$·65.1$Al_2O_3$·28.2$SiO_2$·3.2$P_2O_5$·2.1 MgO; a specific surface area of 391 $m^2$/g, a pore volume of 0.97 $cm^3$/g, and an average pore size of 9.9 nm.

Silica-Alumina Material D (Comparative)

(1) An $Al_2(SO_4)_3$ solution with a concentration of 90 g $Al_2O_3$/L and an ammonia water with a concentration of 25 wt %, used as reaction raw materials, were mixed under vigorous stirring and gelatinized in a co-current gelatinizing mode. The temperature of the system was controlled at 40° C., the pH value of the system was controlled to 9.5, and the gelatinized slurry was collected; (2) water glass with a concentration of 102 g $SiO_2$/L to the gelatinized slurry according to the weight ratio of $SiO_2$:$Al_2O_3$=1:2.6 under stirring, and the resulting mixture was heated up to 70° C. and aged for 2 hours to produce a first solid precipitate; (3) $NH_4Cl$ and deionized water were added to the first solid precipitate according to the weight ratio of the precipitate (dry basis):ammonium salt:$H_2O$=1:0.8:15, the precipitate was ion-exchanged at 60° C. to remove sodium ions until the sodium oxide content was below 0.3%, and a second solid precipitate was obtained; (4) Then the second solid precipitate was vigorously mixed and stirred with water, and then mixed with phosphoric acid according to the weight ratio of $P_2O_5$:the second solid precipitate (the dry basis of the precipitate)=0.05:1. The resulting mixture was heated up to 60° C. and stirred for 1 hour, filtered, and then dried at 120° C. for 10 hours to produce the silica-alumina material D, which had a pseudo-boehmite structure. Its elemental analysis showed a chemical composition of 0.12 $Na_2O$·62.5$Al_2O_3$·31.7$SiO_2$·5.0$P_2O_5$; a specific surface area of 413 $m^2$/g, a pore volume of 0.97 $cm^3$/g, and an average pore size of 9.4 nm.

Zirconia Sol

Zirconia Sol A

To a beaker were added 130 g of deionized water and then 125 g of zirconium oxychloride. The mixture was stirred for 10 minutes. 93 g of acetic acid was added, and the mixture was stirred 30 minutes to obtain a mixed solution. Then to the mixed solution was slowly added ammonia water with a peristaltic pump, and the pump speed (i.e., the addition rate of ammonia water) was controlled at 5 mL/min, and the pH value of the obtained product was controlled to be 2.5 to produce a clear and transparent zirconia sol A.

Based on the TEM image of the zirconium sol A prepared in the present invention, the obtained zirconium sol had a colloidal particle size of 5-15 nm, an average particle diameter of about 10 nm, and a degree of concentration of 90% or higher.

Zirconia Sol B

To a beaker were added 130 g of deionized water and then 125 g of zirconium oxychloride. The mixture was stirred for 10 minutes. 70 g of oxalic acid was added, and the mixture was stirred 30 minutes to obtain a mixed solution. Then to the mixed solution was slowly added ammonia water with a peristaltic pump, and the pump speed was controlled at 5 mL/min of ammonia water, and the pH value was controlled to be 2.5 to produce a clear and transparent zirconia sol B.

Zirconia Sol C

To a beaker were added 170 g of deionized water and then 176 g of zirconium isopropoxide. The mixture was stirred for 10 minutes. 70 g of oxalic acid was added, and the mixture was stirred 30 minutes to obtain a mixed solution. Then to the mixed solution was slowly added triethanolamine with a peristaltic pump, and the pump speed was controlled at 5 mL/min, and the pH value was controlled to be 2.5 to produce a clear and transparent zirconia sol C.

Zirconia Sol D (Comparative)

To a beaker were added 130 g of deionized water and then 125 g of zirconium oxychloride. The mixture was stirred for 10 minutes. Then to the above solution was slowly added ammonia water with a peristaltic pump, and the pump speed was controlled at 5 mL/min to form a precipitate suspension, pH=1.2, denoted as zirconia sol D.

Zirconia Sol E (Comparative)

To a beaker were added 35.38 g of $ZrOCl_2 \cdot 8H_2O$, and then 9.77 g of a sodium hydroxide solution with a concentration of 45 wt % according to the molar ratio of Zr to sodium hydroxide of 1:1. Then the mixture was stirred at 60° C. for 60 minutes to obtain a first contact material after the reaction. Then 19.41 g of hydrochloric acid with a concentration of 31 wt % was added at 40° C. according to the ratio of $Zr:H^+=1:1.5$. Then the mixture was stirred at 40° C. for 60 minutes to obtain a second contact material. Then 19.41 g of hydrochloric acid with a concentration of 31 wt % was added to the second contact material at 40° C. according to the ratio of $Zr:H^+=1:1.5$. Then the mixture was stirred at 40° C. for 60 minutes to obtain the zirconia sol E.

Zirconia Sol F (Comparative)

Zirconia sol D was prepared according to the above-mentioned preparation method. Then zirconia sol D was dried at 120° C. for 12 hours, and then calcined at 600° C. for 4 hours to obtain zirconia powder F (for the terminology harmonization, also known as zirconia sol F herein).

The properties of zirconia sols A-E were shown in the table below.

| Zirconia sol No. | A | B | C | D | E |
|---|---|---|---|---|---|
| $ZrO_2$, wt % | 10.8 | 11.9 | 11.3 | 13.4 | 16.3 |
| pH value | 2.5 | 2.5 | 2.5 | 1.2 | 2.5 |
| Molar ratio of alkali cation to Zr | 2 | 1.67 | 1.74 | 0.6 | 1 |
| Molar ratio of stabilizer to Zr | 4 | 4 | 4 | 0 | 0 |
| Average particle diameter, nm | 10 | 9.8 | 9.7 | | |
| Colloidal particle size, nm | 8-10 | 8-10 | 8-10 | | |
| Degree of concentration, % | 95 | 93 | 92 | | |
| Ratio of monoclinic phase to tetragonal phase* | 0.4:1 | 0.35:1 | 0.3:1 | | |

*Sample was dried at 100° C. for 6 hours and calcined at 600° C. for 4 hours.

Catalyst Preparation

Example 1

(1) Preparation of rare earth-modified molecular sieve based on the crystal modification of kaolin: Zeolite material A and deionized water were mixed under vigorously stirring to produce a molecular sieve slurry having a solid content of 10 wt %; lanthanum chloride and water were mixed under vigorously stirring to form a lanthanum chloride solution having an $La_2O_3$ concentration of 5 wt %; the lanthanum chloride solution was added to the molecular sieve slurry, wherein the weight ratio of lanthanum chloride (as $La_2O_3$) to molecular sieve (on the dry basis) was 1:6; the mixture was stirred at 70° C. for 1 hour, filtered, washed, dried at 150° C. for 8 hours, and calcined at 500° C. for 4 hours to produce a rare earth-modified molecular sieve based on the crystal modification of kaolin (also referred to as "rare earth-modified molecular sieve" herein).

(2) Catalyst preparation: The catalyst formula was shown in the table below, the formula composition in the table was calculated on the dry basis, and the rare earth content in the rare earth-modified molecular sieve was calculated as $RE_2O_3$. Firstly kaolin and water were mixed under vigorously stirring to produce a kaolin slurry having a solid content of 20 wt %; the rare earth-modified molecular sieve and water were mixed under vigorously stirring, and dispersed with homogenizer to produce a rare earth-modified molecular sieve slurry, having a slurry solid content of 35 wt %; the kaolin slurry and the rare earth-modified molecular sieve slurry were mixed under stirring, and then an acidified pseudo-boehmite having a solid content of 10 wt % (wherein for the acidified pseudo-boehmite, the molar ratio of HCl to pseudo-boehmite as $Al_2O_3$ was 0.2) was added, the mixture was stirred for 10 minutes, finally an alumina sol was added, the mixture was stirred for 30 minutes to produce a catalyst slurry. The catalyst slurry was spray-dried to produce catalyst microspheres. The resulting catalyst microspheres were calcined at 500° C. for 2 hours, and then washed with an ammonium sulfate solution having an ammonium sulfate concentration of 2 wt % (the weight ratio of ammonium sulfate solution to catalyst microsphere (dry basis) was 10:1) to produce a catalytic cracking catalyst C1.

Examples 2-6

Catalysts C2-C6 were prepared according to the procedure of Example 1 by adjusting the weight ratio of lanthanum chloride (as $La_2O_3$) to the molecular sieve (on the dry basis), or performing multiple times to produce rare earth-modified molecular sieves. The zeolite materials used and the rare earth content in the obtained rare earth-modified molecular sieve were shown in the table below. The ZSP-3 molecular sieve and water were mixed under vigorously stirring to form a ZSP-3 molecular sieve slurry having a solid content of 35 wt %, and the kaolin slurry and the rare earth-modified molecular sieve slurry were mixed, and then the acidified pseudo-boehmite was added, the mixture was stirred for 10 minutes, an alumina sol was added, the mixture was stirred for 30 minutes, spray-dried, and calcined and washed. Catalyst formulae were shown in the table below.

Comparative Examples 1-4

Catalysts D1 to D4 of Comparative Examples 1 to 4 were prepared according to the procedure of Example 1. Catalyst formulae were shown in the table below. In the catalysts of Comparative Examples 2 to 4, the content of the rare earth-modified molecular sieve, the rare earth content in the rare earth-modified molecular sieve and the $Na_2O$ content in the rare earth-modified molecular sieve respectively corresponded to the percentage content in the catalyst of the rare earth-modified molecular sieve obtained after each of zeolite materials D to F was subjected to the rare earth-exchanging, the rare earth content and the sodium oxide content in the corresponding rare earth-modified molecular sieve.

alumina sol was added, the mixture was stirred for 30 minutes to produce a catalyst slurry. The catalyst slurry was spray-dried to produce catalyst microspheres. The resulting catalyst microspheres were calcined at 500° C. for 2 hours, and then washed with an ammonium sulfate solution having an ammonium sulfate concentration of 2 wt % (the weight ratio of ammonium sulfate

|  |  | Catalyst No. | Kaolin wt % | Zeolite material | wt % | Rare earth content (wt %) | $Na_2O$ content (wt %) | REY wt % | ZSP-3 wt % | Acidified pseudo-boehmite wt % | Alumina sol wt % |
|---|---|---|---|---|---|---|---|---|---|---|---|
| Example | 1 | C1 | 30 | A | 35 | 12 | 0.93 |  | 0 | 25 | 10 |
|  | 2 | C2 | 30 | A | 28 | 16 | 0.91 |  | 7 | 25 | 10 |
|  | 3 | C3 | 30 | A | 20 | 18 | 0.88 |  | 15 | 25 | 10 |
|  | 4 | C4 | 30 | B | 15 | 20 | 0.86 |  | 20 | 25 | 10 |
|  | 5 | C5 | 50 | C | 20 | 18 | 0.89 |  | 5 | 20 | 5 |
|  | 6 | C6 | 25 | A | 40 | 10 | 1.05 |  | 5 | 15 | 15 |
| Comparative | 1 | D1 | 30 |  |  |  |  | 20 | 15 | 25 | 10 |
| Example | 2 | D2 | 30 | D | 20 | 12 | 1.08 |  | 15 | 25 | 10 |
|  | 3 | D3 | 30 | E | 20 | 18 | 1.28 |  | 15 | 25 | 10 |
|  | 4 | D4 | 30 | F | 20 | 18 | 1.5 |  | 15 | 25 | 10 |

Example 7

(1) Preparation of rare earth-modified molecular sieve based on the crystal modification of kaolin: it was carried out in a manner similar to that of Example 1.

(2) Catalyst preparation: The catalyst formula was shown in the table below, the formula composition in the table was calculated on the dry basis, and the rare earth content in the rare earth-modified molecular sieve was calculated as $RE_2O_3$. Firstly kaolin and water were mixed under vigorously stirring to produce a kaolin slurry having a solid content of 20 wt %; the rare earth-modified molecular sieve and water were mixed solution to catalyst microsphere (dry basis) was 10:1) to produce a catalytic cracking catalyst C7.

Examples 8-12 and Comparative Examples 5-10

According to the preparation methods of Examples 2-6 and Comparative Examples 1-4, catalysts C8-C12 and D5-D10 of Examples 8-12 and Comparative Examples 5-10 were prepared, and the catalyst formulae were shown in the table below.

|  |  | Catalyst No. | Kaolin wt % | Zeolite material | wt % | Rare earth content (wt %) | $Na_2O$ content (wt %) | REY wt % | β wt % | Acidified pseudo-boehmite wt % | Silica-alumina material | wt % | Alumina sol wt % |
|---|---|---|---|---|---|---|---|---|---|---|---|---|---|
| Example | 7 | C7 | 30 | A | 30 | 12 | 0.93 |  | 0 | 25 | A | 5 | 10 |
|  | 8 | C8 | 30 | B | 25 | 15 | 0.92 |  | 5 | 20 | B | 10 | 10 |
|  | 9 | C9 | 30 | C | 20 | 18 | 0.88 |  | 10 | 15 | A | 15 | 10 |
|  | 10 | C10 | 30 | B | 25 | 15 | 0.91 |  | 5 | 10 | B | 20 | 10 |
|  | 11 | C11 | 40 | C | 20 | 18 | 0.89 |  | 5 | 20 | A | 10 | 5 |
|  | 12 | C12 | 20 | A | 35 | 10 | 1.05 |  | 5 | 25 | B | 5 | 10 |
| Comparative | 5 | D5 | 40 |  |  |  |  | 20 | 5 | 30 |  |  | 5 |
| Example | 6 | D6 | 40 |  |  |  |  | 20 | 5 | 20 | A | 10 | 5 |
|  | 7 | D7 | 40 | D | 20 | 18 | 1.08 |  | 5 | 20 | A | 10 | 5 |
|  | 8 | D8 | 40 | E | 20 | 18 | 1.28 |  | 5 | 20 | A | 10 | 5 |
|  | 9 | D9 | 40 |  |  |  |  | 20 | 5 | 20 | C | 10 | 5 |
|  | 10 | D10 | 40 | E | 20 | 18 | 1.28 |  | 5 | 20 | D | 10 | 5 | under vigorously stirring, and dispersed with homogenizer to produce a rare earth-modified molecular sieve slurry, having a slurry solid content of 35 wt %; the kaolin slurry and the rare earth-modified molecular sieve slurry were mixed under stirring, and then a silica-alumina material was added, and then an acidified pseudo-boehmite having a solid content of 10 wt % (wherein for the acidified pseudo-boehmite, the molar ratio of HCl to pseudo-boehmite as $Al_2O_3$ was 0.2) was added, the mixture was stirred for 10 minutes, finally an

Examples 13-18 and Comparative Examples 11-14

Catalysts were prepared according to the following method, and the catalyst formulae were shown in the table below.

Firstly kaolin and water were mixed under vigorously stirring to produce a kaolin slurry having a solid content of 20 wt %; each of the DASY molecular sieve and the ZSP-3 molecular sieve and water were mixed under vigorously stirring, and dispersed with homogenizer to produce a DASY molecular sieve slurry having a slurry solid content of 35 wt % and a ZSP-3 molecular sieve slurry having a slurry solid content of 35 wt % respectively; the kaolin slurry and the molecular sieve slurries were mixed under stirring, and then an acidified pseudo-boehmite having a solid content of 10 wt % (wherein the molar ratio of HCl to pseudo-boehmite as $Al_2O_3$ was 0.2) was added, the mixture was stirred for 10 minutes to produce a first mixed slurry. The zirconia sol and the alumina sol were mixed, and then added to the above first mixed slurry, the mixture was stirred for 30 minutes to produce a catalyst slurry. The catalyst slurry was spray-dried to produce catalyst microspheres. The resulting catalyst microspheres were calcined at 500° C. for 2 hours to produce a catalytic cracking catalyst.

slurry having a solid content of 20 wt %; the rare earth-modified molecular sieve and water were mixed under vigorously stirring, and dispersed with homogenizer to produce a rare earth-modified molecular sieve slurry having a slurry solid content of 35 wt %; the kaolin slurry and the rare earth-modified molecular sieve slurry were mixed under stirring, and then an acidified pseudo-boehmite having a solid content of 10 wt % (wherein for the acidified pseudo-boehmite, the molar ratio of HCl to pseudo-boehmite as $Al_2O_3$ was 0.2) was added, the mixture was stirred for 10 minutes, finally a mixture of the alumina sol and the zirconia sol was added, the mixture was stirred for 30 minutes to produce a catalyst slurry. The catalyst slurry was spray-dried to produce catalyst microspheres. The resulting catalyst microspheres were calcined at 500° C. for 2

| | Catalyst | Kaolin | ZSP-3 | DASY | Acidified pseudo-boehmite | Alumina sol | Zirconia sol | |
|---|---|---|---|---|---|---|---|---|
| | No. | wt % | wt % | wt % | wt % | wt % | No. | wt % |
| Example 13 | C13 | 30 | 8 | 22 | 25 | 10 | A | 5 |
| Example 14 | C14 | 30 | 4 | 26 | 20 | 10 | B | 10 |
| Example 15 | C15 | 30 | 0 | 30 | 15 | 10 | C | 15 |
| Example 16 | C16 | 30 | 8 | 22 | 15 | 5 | A | 20 |
| Example 17 | C17 | 50 | 5 | 20 | 15 | 5 | B | 5 |
| Example 18 | C18 | 20 | 5 | 35 | 15 | 15 | C | 10 |
| Comparative Example 11 | D11 | 50 | 5 | 20 | 15 | 10 | | |
| Comparative Example 12 | D12 | 50 | 5 | 20 | 15 | 5 | D | 5 |
| Comparative Example 13 | D13 | 50 | 5 | 20 | 15 | 5 | E | 5 |
| Comparative Example 14 | D14 | 50 | 5 | 20 | 15 | 5 | F | 5 |

Example 19

(1) Preparation of rare earth-modified molecular sieve based on the crystal modification of kaolin: Zeolite material A and deionized water were mixed under vigorously stirring to produce a molecular sieve slurry having a solid content of 10 wt %; lanthanum chloride and water were mixed under vigorously stirring to form a lanthanum chloride solution having an $La_2O_3$ concentration of 5 wt %; the lanthanum chloride solution was added to the molecular sieve slurry, wherein the weight ratio of lanthanum chloride (as $La_2O_3$) to molecular sieve (on the dry basis) was 1:6; the mixture was stirred at 70° C. for 1 hour, filtered, washed, dried at 150° C. for 8 hours, and calcined at 500° C. for 4 hours. The catalyst was again washed with ammonium sulfate in an amount of 5% of the catalyst (on a dry basis) to finally produce a rare earth-modified molecular sieve based on the crystal modification of kaolin having the sodium oxide content of less than 2%.

(2) Catalyst preparation: The catalyst formula was shown in the table below, the formula composition in the table was calculated on the dry basis, and the rare earth content in the rare earth-modified molecular sieve was calculated as $RE_2O_3$. Firstly kaolin and water were mixed under vigorously stirring to produce a kaolin hours, and then exchanged and washed with an ammonium sulfate solution having an ammonium sulfate concentration of 2 wt % (the mass ratio of ammonium sulfate solution to catalyst microsphere (dry basis) was 10:1), and dried to produce a catalytic cracking catalyst C19.

Examples 20-24

Catalysts were prepared according to the method of Example 19, and the catalyst formulae were shown in the table below. The ZRP-1 molecular sieve and water were mixed under vigorously stirring to form a ZRP-1 molecular sieve slurry having a solid content of 35 wt %, mixed with the kaolin slurry and the slurry of the modified molecular sieve based on the crystal modification of kaolin, and then the acidified pseudo-boehmite was added, the mixture was stirred for 10 minutes, the alumina sol and the zirconia sol were added, and the mixture was stirred for 30 minutes, spray-dried, calcined, washed and dried.

Comparative Example 15

Catalyst D15 was prepared according to the method of Example 19, and the catalyst formula was shown in the table below.

| | Catalyst No. | Kaolin wt % | Rare earth-modified molecular sieve Zeolite material | Rare earth-modified molecular sieve wt % | Rare earth content (wt %) | ZRP-1 wt % | Acidified pseudo-boehmite wt % | Alumina sol wt % | Zirconia sol No. | Zirconia sol wt % |
|---|---|---|---|---|---|---|---|---|---|---|
| Example | 19 C19 | 30 | A | 30 | 12 | 0 | 25 | 10 | A | 5 |
| | 20 C20 | 30 | B | 25 | 14 | 5 | 25 | 5 | B | 10 |
| | 21 C21 | 30 | C | 21 | 18 | 9 | 20 | 10 | C | 10 |
| | 22 C22 | 30 | B | 25 | 14 | 5 | 15 | 5 | B | 20 |
| | 23 C23 | 50 | C | 20 | 18 | 5 | 15 | 5 | A | 5 |
| | 24 C24 | 20 | A | 35 | 10 | 5 | 20 | 10 | C | 10 |
| Comparative Example | 15 D15 | 50 | E | 20 | | 5 | 15 | 5 | D | 5 |

Examples 25-29 and Comparative Examples 16-21

Catalysts were prepared according to the following method, and the catalyst formulae were shown in the table below.

C. for 2 hours, then washed with an ammonium sulfate solution (for each wash, the ammonium sulfate comprised 6 wt % of the catalyst (dry basis)) until the sodium oxide content in the catalyst was less than 2 wt %, to produce a catalytic cracking catalyst.

| | Catalyst No. | Kaoln wt % | ZSP-3 wt % | SOY-8 wt % | Acidified pseudo-boehmite wt % | Alumina sol wt % | Zirconia sol No. | Zirconia sol wt % | Acidic silica sol |
|---|---|---|---|---|---|---|---|---|---|
| Example | 25 C25 | 30 | 0 | 30 | 20 | | A | 5 | 15 |
| | 26 C26 | 30 | 4 | 26 | 10 | 10 | B | 10 | 10 |
| | 27 C27 | 30 | 8 | 22 | 20 | | C | 15 | 5 |
| | 28 C28 | 30 | 5 | 25 | 10 | 5 | A | 20 | 5 |
| | 29 C29 | 40 | 5 | 20 | 20 | 5 | B | 5 | 5 |
| Comparative Example | 16 D16 | 40 | 5 | 20 | 30 | 5 | | | |
| | 17 D17 | 40 | 5 | 20 | 25 | 5 | | | 5 |
| | 18 D18 | 40 | 5 | 20 | 25 | 5 | B | 5 | |
| | 19 D19 | 40 | 5 | 20 | 20 | 5 | D | 5 | 5 |
| | 20 D20 | 40 | 5 | 20 | 20 | 5 | E | 5 | 5 |
| | 21 D21 | 40 | 5 | 20 | 20 | 5 | F | 5 | 5 |

(1) Preparation of the acidic silica sol: 25 g of water glass was diluted with 75 g of water, the mixture was stirred for 10 minutes, 5 g of hydrochloric acid was quickly added, the mixture was stirred for 10 minutes to produce a clear and transparent silica sol having a $SiO_2$ content of 5 wt % and a pH value of 2.5. It was denoted as S1. The particle size of the silica sol was 4 nm.

(2) Preparation of catalysts: Firstly kaolin and water were mixed under vigorously stirring to produce a kaolin slurry having a solid content of 20 wt %; each of the SOY molecular sieve and the ZSP-3 molecular sieve and water were mixed under vigorously stirring, and dispersed with homogenizer to produce an SOY molecular sieve slurry having a slurry solid content of 35 wt % and a ZSP-3 molecular sieve slurry having a slurry solid content of 35 wt % respectively; the kaolin slurry, the SOY molecular sieve slurry and the ZSP-3 molecular sieve slurry were mixed under stirring, and then an acidified pseudo-boehmite having a solid content of 10 wt % (the pseudo-boehmite acidified with hydrochloric acid, wherein the molar ratio of HCl to pseudo-boehmite as $Al_2O_3$ was 0.2) was added, the mixture was stirred for 10 minutes to produce a first slurry. The zirconia sol and the above acidic silica sol Si were mixed (pH value=2.5), and then added to the above first slurry, the mixture was stirred for 30 minutes to produce a second slurry. The second slurry was spray-dried to produce catalyst microspheres. The resulting catalyst microspheres were calcined at 500°

Example 30

Catalyst formula was shown in the table below.
(1) Preparation of silica sol: it was carried out in a manner similar to that of Example 25.
(2) Preparation of rare earth-modified molecular sieve based on the crystal modification of kaolin: it was carried out in a manner similar to that of Example 19.
(3) Preparation of catalyst: it was carried out in a manner similar to that of Example 19.

Examples 31-34

Catalysts were prepared according to the method of Example 30, and the catalyst formulae were shown in the table below. The ZSP-3 molecular sieve and water were mixed under vigorously stirring to form a ZSP-3 molecular sieve slurry having a solid content of 35 wt %, mixed with the kaolin slurry and the slurry of the modified molecular sieve based on the crystal modification of kaolin, and then mixed with a mixture of the zirconia sol, the silica sol, and an alumina sol (if any).

Comparative Examples 22-24

Catalysts were prepared according to the method of Example 30, and the catalyst formulae were shown in the table below.

| | Catalyst No. | Kaolin wt % | Rare earth-modified molecular sieve | | | | REY wt % | ZSP-3 wt % | Acidified | | | | Acidic silica sol |
| | | | Zeolite material | wt % | Rare earth content (wt %) | Na$_2$O content (wt %) | | | pseudo-boehmite wt % | Alumina sol wt % | Zirconia sol No. | Zirconia sol wt % | |
|---|---|---|---|---|---|---|---|---|---|---|---|---|---|
| Example | 30 C30 | 30 | A | 30 | 12 | 0.93 | | 0 | 20 | | A | 5 | 15 |
| | 31 C31 | 30 | B | 25 | 14 | 0.91 | | 5 | 10 | 10 | B | 10 | 10 |
| | 32 C32 | 30 | C | 20 | 18 | 0.88 | | 10 | 20 | | C | 15 | 5 |
| | 33 C33 | 30 | B | 25 | 14 | 0.9 | | 5 | 10 | 5 | A | 20 | 5 |
| | 34 C34 | 40 | C | 20 | 18 | 0.89 | | 5 | 20 | 5 | B | 5 | 5 |
| Comparative | 22 D22 | 40 | | | | | 20 | 5 | 30 | 5 | | | |
| Example | 23 D23 | 40 | | | | | 20 | 5 | 20 | 5 | | 5 | 5 |
| | 24 D24 | 40 | D | 20 | 18 | 1.08 | | 5 | 20 | 5 | F | 5 | 5 |

Examples 35-37

Catalysts were prepared according to the following method, and the catalyst formulae were shown in the table below.

(1) Preparation of phosphorus alumina sol: Pseudo-boehmite, kaolin and water were mixed under vigorously stirring and dispersed to produce a slurry having a solid content of 15 wt % (the weight ratio of clay (dry basis) to pseudo-boehmite as Al$_2$O$_3$ was 1:1). A concentrated phosphoric acid (H3PO4 concentration=85 wt %) was added to the slurry under stirring according to the weight ratio of P/Al=3, and the mixture was reacted at 70° C. for 30 minutes to produce the phosphorus alumina sol.

(2) Firstly kaolin and water were mixed under vigorously stirring to produce a kaolin slurry having a solid content of 20 wt %; each of the DASY molecular sieve and the ZSP-3 molecular sieve and water were mixed under vigorously stirring, and dispersed with homogenizer to produce a DASY molecular sieve slurry having a slurry solid content of 35 wt % and a ZSP-3 molecular sieve slurry having a slurry solid content of 35 wt % respectively; the kaolin slurry, the DASY molecular sieve slurry and the ZSP-3 molecular sieve slurry were mixed under stirring, and then an acidified pseudo-boehmite having a solid content of 10 wt % (the molar ratio of HCl to pseudo-boehmite as Al$_2$O$_3$ was 0.2) was added, the mixture was stirred for 10 minutes to produce a first catalyst mixed slurry. The alumina sol, the zirconia sol and the phosphorus alumina sol were mixed, and then added to the above first catalyst mixed slurry, the mixture was stirred for 30 minutes to produce a second catalyst slurry. The second catalyst slurry was spray-dried to produce catalyst microspheres. The resulting catalyst microspheres were calcined at 500° C. for 2 hours, then washed with ammonium sulfate once (ammonium sulfate comprised 6 wt % of the catalyst (dry basis)) to produce a catalytic cracking catalyst.

Examples 38-40

Catalysts were prepared according to the following method, and the catalyst formulae were shown in the table below.

(1) Preparation of phosphorus alumina sol: Pseudo-boehmite, kaolin and water were mixed under vigorously stirring and dispersed to produce a slurry having a solid content of 15 wt % (the weight ratio of clay (dry basis) to pseudo-boehmite as Al$_2$O$_3$ was 1:1). A concentrated phosphoric acid (concentration=85 wt %) was added to the above slurry under stirring according to the weight ratio of P/Al=4, and the mixture was reacted at 80° C. for 20 minutes to produce the phosphorus alumina sol.

(2) Firstly kaolin and water were mixed under vigorously stirring to produce a kaolin slurry having a solid content of 20 wt %; each of the DASY molecular sieve and the ZSP-3 molecular sieve and water were mixed under vigorously stirring, and dispersed with homogenizer to produce a DASY molecular sieve slurry having a slurry solid content of 35 wt % and a ZSP-3 molecular sieve slurry having a slurry solid content of 35 wt % respectively; the kaolin slurry, the DASY molecular sieve slurry and the ZSP-3 molecular sieve slurry were mixed under stirring, and then an acidified pseudo-boehmite having a solid content of 10 wt % (acidified with hydrochloric acid, the molar ratio of HCl to pseudo-boehmite as Al$_2$O$_3$ was 0.2) was added, the mixture was stirred for 10 minutes to produce a slurry containing the molecular sieve and kaolin. The alumina sol, the zirconia sol and the phosphorus alumina sol were mixed, and then added to the above slurry containing the molecular sieve and kaolin, the mixture was stirred for 30 minutes to produce a catalyst slurry. The catalyst slurry was spray-dried to produce catalyst microspheres. The resulting catalyst microspheres were calcined at 500° C. for 2 hours, then washed with ammonium sulfate once (ammonium sulfate comprised 6 wt % of the catalyst (dry basis)) to produce a catalytic cracking catalyst.

Comparative Examples 25-29

Catalysts were prepared according to the method of Example 35, and the catalyst formulae were shown in the table below.

|  | Catalyst No. | Kaolin wt % | ZSP-3 wt % | DASY wt % | Acidified pseudo-boehmite wt % | Alumina sol wt % | Zirconia sol No. | Zirconia sol wt % | Phosphorus alumina sol |
|---|---|---|---|---|---|---|---|---|---|
| Example | 35 C35 | 30 | 29 | 1 | 5 | 5 | A | 5 | 25 |
|  | 36 C36 | 30 | 25 | 5 | 10 | 8 | B | 5 | 17 |
|  | 37 C37 | 30 | 21 | 9 | 8 | 4 | C | 10 | 18 |
|  | 38 C38 | 30 | 25 | 5 | 10 | 5 | B | 20 | 5 |
|  | 39 C39 | 40 | 20 | 5 | 15 | 5 | A | 5 | 10 |
|  | 40 C40 | 20 | 35 | 5 | 8 | 10 | C | 12 | 10 |
| Comparative Example | 25 D25 | 40 | 20 | 5 | 30 | 5 |  |  |  |
|  | 26 D26 | 40 | 20 | 5 | 20 | 5 |  |  | 10 |
|  | 27 D27 | 40 | 20 | 5 | 15 | 5 | D | 5 | 10 |
|  | 28 D28 | 40 | 20 | 5 | 15 | 5 | E | 5 | 10 |
|  | 29 D29 | 40 | 20 | 5 | 15 | 5 | F | 5 | 10 |

Example 41

(1) Preparation of rare earth-modified super-stabilized molecular sieve based on the crystal modification of kaolin:

According to the weight ratio of SiCl4:zeolite material A (dry basis)=0.4:1, zeolite material A and silicon tetrachloride gas were reacted, wherein the reaction temperature was 450° C. and the reaction time was 2 hours, washed and filtered to produce a gas-phase super-stabilized molecular sieve based on the crystal modification of kaolin (abbreviated as super-stabilized molecular sieve), which had the unit cell constant of 2.456. The super-stabilized molecular sieve and deionized water were mixed under vigorously stirring to form an super-stabilized molecular sieve slurry having a solid content of 10 wt %. Lanthanum chloride and water were mixed under vigorously stirring to form a lanthanum chloride solution with a $La_2O_3$ concentration of 5 wt %. The lanthanum chloride solution was added to the super-stabilized molecular sieve slurry, wherein the weight ratio of lanthanum chloride (as $La_2O_3$) to the molecular sieve (dry basis) was 1:20. The mixture was stirred at 70° C. for 1 hour, filtered, washed, dried at 150° C. for 8 hours, and calcined at 500° C. for 4 hours, then washed with an ammonium sulfate solution, wherein the weight ratio of ammonium sulfate to molecular sieve (dry basis) was 1:20, to produce a rare earth-modified super-stabilized molecular sieve based on the crystal modification of kaolin (abbreviated as the rare earth-modified super-stabilized molecular sieve);

(2) Preparation of phosphorus alumina sol: Pseudo-boehmite, kaolin and water were mixed under vigorously stirring to produce a slurry having a solid content of 15 wt %. A concentrated phosphoric acid (concentration=85 wt %) was added to the above slurry under stirring according to the weight ratio of P/Al=3, and the mixture was reacted at 70° C. for 30 minutes to produce the phosphorus alumina sol.

(3) Catalyst preparation: According to the catalyst formula shown in the table below, firstly kaolin and water were mixed under vigorously stirring to produce a kaolin slurry having a solid content of 20 wt %; each of the rare earth-modified super-stabilized molecular sieve and the ZSP-3 molecular sieve and water were mixed under vigorously stirring, and dispersed with homogenizer to produce a rare earth-modified super-stabilized molecular sieve slurry having a slurry solid content of 35 wt % and a ZSP-3 molecular sieve slurry having a slurry solid content of 35 wt % respectively; the kaolin slurry, the rare earth-modified super-stabilized molecular sieve slurry and the ZSP-3 molecular sieve slurry were mixed under stirring, and then an acidified pseudo-boehmite having a solid content of 10 wt % (the molar ratio of HCl to pseudo-boehmite as $Al_2O_3$ was 0.2) was added, the mixture was stirred for 10 minutes. The zirconia sol A, the alumina sol, and the above phosphorus alumina sol were added to the above slurry, the mixture was stirred for 30 minutes, and spray-dried to produce catalyst microspheres. The resulting catalyst microspheres were calcined at 500° C. for 2 hours to produce a catalytic cracking catalyst C41.

Examples 42-43

Catalysts were prepared according to the method of Example 41, and the catalyst formulae were shown in the table below.

Example 44

(1) Preparation of rare earth-modified super-stabilized molecular sieve based on the crystal modification of kaolin:

The zeolite material A was calcined at 650° C. under 100% water vapor for 12 hours to produce an super-stabilized molecular sieve based on the crystal modification of kaolin (abbreviated as super-stabilized molecular sieve), which had the unit cell constant of 2.455. The super-stabilized molecular sieve and deionized water were mixed under vigorously stirring to form a slurry having a solid content of 10 wt %. Lanthanum chloride and water were mixed under vigorously stirring to form a lanthanum chloride solution with a $La_2O_3$ concentration of 5 wt %. The lanthanum chloride solution was added to the super-stabilized molecular sieve slurry, wherein the weight ratio of lanthanum chloride (as $La_2O_3$) to the molecular sieve (dry basis) was 1:20. The mixture was stirred at 70° C. for 1 hour, filtered, washed, dried at 150° C. for 8 hours, and calcined at 500° C. for 4 hours, then washed with an ammonium sulfate solution, wherein the weight ratio of ammonium sulfate to molecular sieve (dry basis) was 1:20, to produce a rare earth-modified super-stabilized molecular sieve based on the crystal modification of kaolin (abbreviated as the rare earth-modified super-stabilized molecular sieve); (2) Preparation of phosphorus alumina sol: Pseudo-boehmite, kaolin and water were mixed under vigorously stirring and dispersed to produce a slurry having a solid content of 15 wt % (the weight ratio of clay (dry basis) to the alumina source as $Al_2O_3$ was 1:1). A concentrated phosphoric acid was added to the above slurry under stirring according to the weight ratio of P/Al=4, and the mixture was reacted at 80° C. for 20 minutes to produce the phosphorus alumina sol.

(3) Catalyst preparation: According to the catalyst formula shown in the table below, firstly kaolin and water were mixed under vigorously stirring to produce a kaolin slurry having a solid content of 40 wt %, and then an alumina sol was added and mixed under vigorously stirring; each of the rare earth-modified

74

Comparative Examples 30-31

Catalysts were prepared according to the method of Example 44, and the catalyst formulae were shown in the table below. The rare earth-modified super-stabilized molecular sieves were prepared based on zeolite materials D and E.

| | Catalyst No. | Kaolin wt % | Rare earth-modified super-stabilized molecular sieve | | | | | | ZSP-3 wt % | Acidified | | | | Phosphorus alumina sol |
| | | | Zeolite material | wt % | Rare earth content (wt %) | Na$_2$O content (wt %) | Silica-alumina ratio | | pseudo-boehmite wt % | Alumina sol wt % | Zirconia sol No. | Zirconia sol wt % | |
|---|---|---|---|---|---|---|---|---|---|---|---|---|---|---|
| Example | 41 C41 | 30 | A | 2 | 4 | 0.9 | 7.04 | 28 | 5 | 5 | A | 5 | 25 |
| | 42 C42 | 30 | B | 4 | 12 | 1.1 | 5.59 | 26 | 10 | 8 | B | 5 | 17 |
| | 43 C43 | 30 | C | 7 | 6 | 0.98 | 6.57 | 23 | 8 | 4 | C | 10 | 18 |
| | 44 C44 | 30 | A | 9 | 4 | 0.85 | 7.29 | 21 | 10 | 5 | B | 20 | 5 |
| | 45 C45 | 40 | B | 5 | 6 | 1 | 6.59 | 20 | 15 | 5 | A | 5 | 10 |
| | 46 C46 | 20 | C | 5 | 8 | 1.03 | 6.36 | 35 | 8 | 10 | C | 12 | 10 |
| Comparative | 30 D30 | 40 | D | 5 | 6 | 1.07 | 6.52 | 20 | 20 | 5 | | | 10 |
| Example | 31 D31 | 40 | E | 5 | 6 | 1.2 | 6.5 | 20 | 15 | 5 | D | 5 | 10 | super-stabilized molecular sieve and the ZSP-3 molecular sieve and water were mixed under vigorously stirring, and dispersed with homogenizer to produce a rare earth-modified super-stabilized molecular sieve slurry having a slurry solid content of 35 wt % and a ZSP-3 molecular sieve slurry having a slurry solid content of 35 wt % respectively; the kaolin slurry, the rare earth-modified super-stabilized molecular sieve slurry and the ZSP-3 molecular sieve slurry were mixed under stirring, and then the phosphorus alumina sol obtained in step (2) was added, the mixture was stirred for 10 minutes. Finally, the alumina sol was added to the above catalyst mixed slurry, the mixture Examples 47-50

Catalysts were prepared according to the method of Example 7, and the catalyst formulae were shown in the table below.

Comparative Example 32

The catalyst was prepared according to the method of Comparative Example 5, and the catalyst formula was shown in the table below.

| | | Catalyst No. | Kaolin wt % | Rare earth-modified molecular sieve | | | REY wt % | ZSP-3 wt % | β wt % | Acidified | | | Alumina sol wt % | Zirconia sol | |
| No. | | | | Zeolite Material | wt % | Rare earth content (wt %) | | | | pseudo-boehmite wt % | Silica-alumina material No. | wt % | | No. | wt % |
|---|---|---|---|---|---|---|---|---|---|---|---|---|---|---|---|
| Example | 47 | C47 | 30 | A | 30 | 12 | | | | 15 | A | 5 | 10 | A | 10 |
| | 48 | C48 | 30 | B | 25 | 15 | | 10 | | 10 | B | 5 | 5 | A | 15 |
| | 49 | C49 | 40 | C | 20 | 18 | | 5 | | 15 | A | 10 | 5 | B | 10 |
| | 50 | C50 | 25 | A | 35 | 10 | | | 10 | 10 | B | 5 | 5 | C | 10 |
| Comparative Example | 32 | D32 | 40 | | | | 20 | 5 | | 30 | | | 5 | | | was stirred for 30 minutes, and spray-dried to produce catalyst microspheres. The resulting catalyst microspheres were calcined at 500° C. for 2 hours to produce a catalytic cracking catalyst C44.

Examples 45-46

Catalysts were prepared according to the method of Example 44, and the catalyst formulae were shown in the table below, wherein in the preparation of the rare earth-modified super-stabilized molecular sieve based on the crystal modification of kaolin, except for different rare earth contents, the preparation method was identical to that of Example 44.

Catalyst Evaluation

The evaluation of the catalysts was carried out with respect to the following feedstock oils.

The composition and physical properties of feedstock oils were shown in the following tables:

| Item | Wuhun III feedstock oil |
|---|---|
| Density (20° C.), g/cm$^3$ | 0.9044 |
| Refraction (20° C.) | 1.5217 |
| Viscosity (100° C.), mm$^2$/s | 9.96 |
| Freezing point, ° C. | 40 |
| Aniline point, ° C. | 95.8 |
| C, wt % | 85.98 |

-continued

| Item | Wuhun III feedstock oil |
|------|------------------------|
| H, wt % | 12.86 |
| S, wt % | 0.55 |
| N, wt % | 0.18 |
| Carbon residue, m % | 3 |
| Distillation range, ° C. | |
| Initial boiling point | 243 |

$$Coke\ selectivity = coke\ yield/conversion\ rate \times 100$$

$$Coke\ factor = coke\ yield \times (1 - conversion\ rate)/conversion\ rate \times 100$$

The coking factor was an important indicator for judging the coke selectivity of the catalyst. The smaller the coking factor, the better the coke selectivity of the catalyst.

Wuhun III was used as the feedstock oil, and the evaluation results were listed in the following table:

| Catalyst | C1 | C2 | C3 | C4 | C5 | C6 | D1 | D2 | D3 | D4 |
|----------|----|----|----|----|----|----|----|----|----|-----|
| Microreactive activity, % | 75 | 73 | 71 | 70 | 72 | 77 | 68 | 58 | 62 | 65 |
| Dry gas wt % | 1.51 | 2.45 | 3.47 | 4.02 | 2.98 | 1.62 | 2.57 | 1.87 | 2.15 | 2.32 |
| Liquefied gas wt % | 14.56 | 19.09 | 22.21 | 24.25 | 17.65 | 16.16 | 20.06 | 15.56 | 18.27 | 18.01 |
| $C_5$ + Gasoline wt % | 52.82 | 47.11 | 43.56 | 39.46 | 45.86 | 53.98 | 43.04 | 39.44 | 41.18 | 43.01 |
| Cycled oil wt % | 15.81 | 16.09 | 16.13 | 17.43 | 18.46 | 14.41 | 17.68 | 21.59 | 19.42 | 18.85 |
| Slurry oil wt % | 9.14 | 9.18 | 8.65 | 8.76 | 9.32 | 7.99 | 10.24 | 15.26 | 12.82 | 11.47 |
| Coke wt % | 6.16 | 6.08 | 5.98 | 6.08 | 5.73 | 6.04 | 6.41 | 6.28 | 6.16 | 6.34 |
| Conversion rate/wt % | 75.05 | 74.73 | 75.22 | 73.81 | 72.22 | 77.8 | 72.08 | 63.15 | 67.76 | 69.68 |
| Total liquid yield/wt % | 83.19 | 82.29 | 81.9 | 81.14 | 81.97 | 84.55 | 80.78 | 76.59 | 78.87 | 79.87 |
| Coke selectivity % | 8.21 | 8.14 | 7.95 | 8.24 | 7.93 | 7.76 | 8.89 | 9.94 | 9.09 | 9.1 |
| Coke factor | 2.05 | 2.06 | 1.97 | 2.16 | 2.2 | 1.72 | 2.48 | 3.66 | 2.93 | 2.76 |

-continued

| Item | Wuhun III feedstock oil |
|------|------------------------|
| 5% | 294 |
| 10% | 316 |
| 30% | 395 |
| 50% | 429 |
| 70% | 473 |
| 90% | — |

| Item | Hydro-upgraded oil |
|------|--------------------|
| Density (20° C.), g/cm³ | 0.9334 |
| Refraction (70° C.) | 1.5061 |
| SARA, m % | |
| Saturates | 55.6 |
| Aromatics | 30 |
| Resins | 14.4 |
| Asphaltenes | <0.1 |
| Freezing point, ° C. | 34 |
| Metal content, ppm | |
| Ca | 3.9 |
| Fe | 1.1 |
| Mg | <0.1 |
| Na | 0.9 |
| Ni | 3.1 |
| Pb | <0.1 |
| V | 0.5 |
| C m % | 86.88 |
| H m % | 11.94 |
| S m % | 0.7 |
| Carbon residue m % | 1.77 |

The catalyst was aged and deactivated under 100% steam at 800° C. for 24 hours. Evaluation was performed on a fixed fluidized bed ACE micro-reactor.

The evaluation conditions were as follows: reaction temperature was 500° C., catalyst-oil ratio (weight) was 6, WHSV was 16 h⁻¹, Among them, conversion rate=gasoline yield+liquefied gas yield+dry gas yield+coke yield $$Total\ liquid\ yield = gasoline\ yield + liquefied\ gas\ yield + cycle\ oil\ yield$$

The catalyst was aged and deactivated under 100% steam at 800° C. for 24 hours. Evaluation was performed on a fixed fluidized bed ACE micro-reactor.

The evaluation conditions were as follows: reaction temperature was 500° C., catalyst-oil ratio (weight) was 6, WHSV was 16 h⁻¹, Among them, conversion rate=gasoline yield+liquefied gas yield+dry gas yield+coke yield $$Coke\ selectivity = coke\ yield/conversion\ rate \times 100$$

$$Coke\ factor = coke\ yield \times (1 - conversion\ rate)/conversion\ rate \times 100$$

Wuhun III was used as the feedstock oil, and the evaluation results were listed in the following table:

| Catalyst | C19 | C20 | C21 | C22 | C23 | C24 | D15 |
|----------|-----|-----|-----|-----|-----|-----|-----|
| Dry gas wt % | 1.49 | 1.98 | 2.64 | 2.05 | 1.94 | 1.89 | 1.48 |
| Liquefied gas wt % | 15.5 | 16.89 | 18.48 | 16.68 | 17.59 | 16.85 | 15.45 |
| C5 + Gasoline wt % | 51.95 | 49.62 | 47.53 | 49.71 | 47.68 | 52.82 | 46.64 |
| Cycled oil wt % | 16.73 | 16.85 | 17.02 | 16.82 | 17.45 | 14.43 | 18.34 |
| Slurry oil wt % | 8.47 | 8.73 | 8.65 | 8.92 | 9.41 | 8.12 | 11.51 |
| Coke wt % | 5.86 | 5.93 | 5.68 | 5.82 | 5.93 | 5.89 | 6.58 |
| Conversion rate/wt % | 74.8 | 74.42 | 74.33 | 74.26 | 73.14 | 77.45 | 70.15 |
| Coke selectivity % | 7.83 | 7.97 | 7.64 | 7.84 | 8.11 | 7.6 | 9.38 |
| Coke factor | 1.97 | 2.04 | 1.96 | 2.02 | 2.18 | 1.71 | 2.8 |
| Wear index, m %/h | 0.8 | 0.9 | 0.7 | 0.6 | 1 | 0.9 | 5.8 |

The catalyst was aged and deactivated under 100% steam at 800° C. for 17 hours. Evaluation was performed on a fixed fluidized bed ACE micro-reactor.

The evaluation conditions were as follows: reaction temperature was 520° C., catalyst-oil ratio (weight) was 4, WHSV was 16 h⁻¹, Among them, conversion rate=gasoline yield+liquefied gas yield+dry gas yield+coke yield $$Coke\ selectivity = coke\ yield/conversion\ rate \times 100$$

$$Coke\ factor = coke\ yield \times (1 - conversion\ rate)/conversion\ rate \times 100$$

Hydro-upgraded oil was used as the feedstock oil, and the evaluation results were listed in the following table:

| Catalyst | C7 | C8 | C9 | C10 | C11 | C12 | D5 | D6 | D7 | D8 | D9 | D10 |
|---|---|---|---|---|---|---|---|---|---|---|---|---|
| Microreactive activity, % | 75 | 74 | 71 | 72 | 70 | 76 | 65 | 66 | 60 | 68 | 64 | 63 |
| Dry gas wt % | 1.44 | 2.05 | 2.51 | 2.11 | 1.98 | 1.74 | 1.28 | 1.32 | 1.02 | 1.48 | 1.24 | 1.18 |
| Liquefied gas wt % | 15.66 | 16.69 | 17.56 | 16.71 | 16.48 | 16.26 | 14.98 | 15.01 | 13.12 | 15.49 | 14.79 | 14.42 |
| C5 + Gasoline wt % | 51.97 | 50.91 | 49.82 | 51.05 | 49.89 | 52.47 | 47.01 | 47.12 | 43.42 | 47.91 | 46.87 | 46.25 |
| Cycled oil wt % | 16.61 | 16.09 | 15.81 | 15.89 | 16.48 | 16.02 | 18.24 | 18.13 | 20.82 | 17.31 | 18.37 | 18.81 |
| Slurry oil wt % | 8.27 | 8.18 | 7.94 | 8.17 | 8.86 | 7.39 | 11.25 | 11.21 | 13.94 | 10.64 | 11.64 | 11.82 |
| Coke wt % | 6.05 | 6.08 | 6.36 | 6.07 | 6.31 | 6.12 | 7.24 | 7.21 | 7.68 | 7.17 | 7.09 | 7.52 |
| Conversion rate/wt % | 75.12 | 75.73 | 76.25 | 75.94 | 74.66 | 76.59 | 70.51 | 70.66 | 65.24 | 72.05 | 69.99 | 69.37 |
| Coke selectivity % | 8.05 | 8.03 | 8.34 | 7.99 | 8.45 | 7.99 | 10.27 | 10.2 | 11.77 | 9.95 | 10.13 | 10.84 |
| Coke factor | 2 | 1.95 | 1.98 | 1.92 | 2.14 | 1.87 | 3.03 | 2.99 | 4.09 | 2.78 | 3.04 | 3.32 |

The catalyst was aged and deactivated under 100% steam at 800° C. for 15 hours. Evaluation was performed on a fixed fluidized bed ACE micro-reactor.

The evaluation conditions were as follows: reaction temperature was 500° C., catalyst-oil ratio (weight) was 6, WHSV was 16 h$^{-1}$, Among them, conversion rate=gasoline yield+liquefied gas yield+dry gas yield+coke yield Hydro-upgraded oil was used as the feedstock oil, and the evaluation results were listed in the following table:

| Catalyst | C30 | C31 | C32 | C33 | C34 | D22 | D23 | D24 |
|---|---|---|---|---|---|---|---|---|
| Microreactive activity, % | 76 | 75 | 77 | 75 | 77 | 70 | 68 | 71 |
| Dry gas wt % | 1.61 | 2.07 | 2.38 | 2.17 | 2.42 | 1.91 | 1.48 | 1.86 |
| Liquefied gas wt % | 14.23 | 15.19 | 16.01 | 15.79 | 15.41 | 15.22 | 14.31 | 15.17 |
| C5 + Gasoline wt % | 52.13 | 51.06 | 51.87 | 50.28 | 51.92 | 46.11 | 47.76 | 47.22 |
| Cycled oil wt % | 15.61 | 15.71 | 14.34 | 15.84 | 14.01 | 19.23 | 19.03 | 18.03 |
| Slurry oil wt % | 9.83 | 9.73 | 8.84 | 9.54 | 9.91 | 11.17 | 11.01 | 11.25 |
| Coke wt % | 6.59 | 6.24 | 6.56 | 6.38 | 6.33 | 6.36 | 6.41 | 6.47 |
| Conversion rate/wt % | 74.56 | 74.56 | 76.82 | 74.62 | 76.08 | 69.6 | 69.96 | 70.72 |
| Total liquid yield/wt % | | | | | | | | |
| Coke selectivity % | 8.84 | 8.37 | 8.54 | 8.55 | 8.32 | 9.14 | 9.16 | 9.15 |
| Coke factor | 2.25 | 2.13 | 1.98 | 2.17 | 1.99 | 2.78 | 2.75 | 2.68 |

The catalyst was impregnated and polluted by Micheal method, and the heavy metals polluted were 1000 μg/g nickel and 3000 μg/g vanadium. The polluted catalyst was aged at 780° C. under 100 vol % water vapor for 4 hours, and then evaluated on the ACE apparatus. The evaluation conditions were as follows: the reaction temperature was 500° C., the catalyst-oil ratio (weight ratio) was 6, and WHSV was 16 h$^{-1}$.

Hydro-upgraded oil was used as the feedstock oil, and the evaluation results were listed in the following table:

| Catalyst | C30 | C31 | C32 | C33 | C34 | D22 | D23 | D24 |
|---|---|---|---|---|---|---|---|---|
| Microreactive activity, % | 67 | 66 | 67 | 65 | 67 | 59 | 57 | 60 |
| Dry gas wt % | 1.41 | 1.45 | 1.52 | 1.32 | 1.47 | 1.23 | 1.92 | 1.34 |
| Liquefied gas wt % | 12.32 | 12.53 | 13.73 | 13.12 | 13.63 | 11.13 | 11.15 | 11.98 |
| C5 + Gasoline wt % | 47.01 | 46.22 | 46.91 | 44.81 | 46.17 | 40.12 | 39.89 | 41.01 |
| Cycled oil wt % | 20.43 | 21.11 | 19.82 | 21.58 | 19.89 | 27.31 | 26.71 | 25.54 |
| Slurry oil wt % | 11.51 | 11.15 | 10.61 | 11.31 | 11.13 | 11.83 | 12.08 | 11.68 |
| Coke wt % | 7.32 | 7.54 | 7.41 | 7.86 | 7.71 | 8.38 | 8.25 | 8.45 |
| Conversion rate/wt % | 68.06 | 67.74 | 69.57 | 67.11 | 68.98 | 60.86 | 61.21 | 62.78 |

The catalyst was aged and deactivated under 100% steam at 800° C. for 12 hours. Evaluation was performed on a fixed fluidized bed ACE micro-reactor.

The evaluation conditions were as follows: reaction temperature was 550° C., catalyst-oil ratio (weight) was 6, WHSV was 16 h$^{-1}$, Among them, conversion rate=gasoline yield+liquefied gas yield+dry gas yield+coke yield Lower carbon olefin selectivity=(propylene+ethylene)yield/conversion rate×100%

Coke selectivity=coke yield/conversion rate×100

Coke factor=coke yield×(1-conversion rate)/conversion rate×100

Ethylene concentration=ethylene yield/dry gas yield

Propylene concentration=Propylene yield/Liquefied gas yield

Wuhun III was used as the feedstock oil, and the evaluation results were listed in the following table:

| Catalyst | C41 | C42 | C43 | C44 | C45 | C46 | D30 | D31 |
|---|---|---|---|---|---|---|---|---|
| Dry gas wt % | 4.93 | 4.79 | 4.48 | 4.35 | 4.55 | 5.28 | 4.25 | 4.58 |
| Liquefied gas wt % | 35.97 | 36.85 | 35.66 | 34.44 | 34.51 | 36.41 | 32.55 | 33.27 |
| Ethylene wt % | 2.29 | 2.25 | 2.02 | 1.91 | 1.73 | 2.45 | 1.55 | 1.62 |
| Propylene wt % | 19.58 | 19.52 | 18.83 | 18.16 | 17.92 | 22.35 | 14.63 | 14.27 |
| C5 + Gasoline wt % | 31.46 | 35.03 | 34.67 | 33.94 | 32.93 | 32.42 | 29.67 | 28.71 |
| Cycled oil wt % | 12.35 | 9.02 | 9.81 | 10.99 | 11.33 | 10.24 | 14.21 | 14.13 |
| Slurry oil wt % | 10.11 | 8.13 | 9.15 | 9.85 | 10.86 | 9.04 | 11.87 | 11.77 |
| Coke wt % | 5.18 | 6.18 | 6.23 | 6.43 | 5.82 | 6.61 | 7.45 | 7.54 |
| Conversion rate/wt % | 77.54 | 82.85 | 81.04 | 79.16 | 77.81 | 80.72 | 73.92 | 74.1 |
| Lower carbon olefin selectivity | 28.2 | 26.28 | 25.73 | 25.35 | 25.25 | 30.72 | 21.89 | 21.44 |
| Propylene concentration | 54.43 | 52.97 | 52.8 | 52.73 | 51.93 | 61.38 | 44.95 | 42.89 |
| Ethylene concentration | 46.45 | 46.97 | 45.09 | 43.91 | 38.02 | 46.4 | 36.47 | 35.37 |
| Coke selectivity % | 6.68 | 7.46 | 7.69 | 8.12 | 7.48 | 8.19 | 10.08 | 10.18 |
| Coke factor | 1.5 | 1.28 | 1.46 | 1.69 | 1.66 | 1.58 | 2.63 | 2.64 |
| Wear index, m %/h | 0.8 | 0.6 | 0.7 | 0.6 | 0.9 | 1 | 3.9 | 4.8 |

The catalyst was aged and deactivated under 100% steam at 800° C. for 15 hours. Evaluation was performed on a fixed fluidized bed ACE micro-reactor.

The evaluation conditions were as follows: reaction temperature was 500° C., catalyst-oil ratio (weight) was 6, WHSV was 16 h$^{-1}$, Hydro-upgraded oil was used as the feedstock oil, and the evaluation results were listed in the following table:

| Catalyst | C47 | C48 | C49 | C50 | D32 |
|---|---|---|---|---|---|
| Microreactive activity, % | 77 | 79 | 78 | 75 | 70 |
| Dry gas wt % | 1.62 | 2.15 | 1.75 | 2.02 | 1.91 |
| Liquefied gas wt % | 14.85 | 16.31 | 15.83 | 16.21 | 15.22 |
| C5 + Gasoline wt % | 52.64 | 52.75 | 52.95 | 51.72 | 46.11 |
| Cycled oil wt % | 16.09 | 15.58 | 15.12 | 15.72 | 19.23 |
| Slurry oil wt % | 8.65 | 7.49 | 8.47 | 8.22 | 11.17 |
| Coke wt % | 6.15 | 5.72 | 5.88 | 6.11 | 6.36 |
| Conversion rate/wt % | 75.26 | 76.93 | 76.41 | 76.06 | 69.6 |
| Total liquid yield/wt % | 83.58 | 84.64 | 83.9 | 83.65 | 80.56 |
| Coke selectivity % | 8.17 | 7.44 | 7.7 | 8.03 | 9.14 |
| Coke factor | 2.02 | 1.72 | 1.82 | 1.92 | 2.78 |
| Wear index, m %/h | 0.7 | 0.6 | 0.9 | 0.9 | — |

The catalyst was impregnated and polluted by Micheal method, and the heavy metals polluted were 1000 μg/g nickel and 3000 μg/g vanadium. The polluted catalyst was aged at 780° C. under 100 vol % water vapor for 4 hours, and then evaluated on the ACE apparatus. The evaluation conditions were as follows: the reaction temperature was 500° C., the catalyst-oil ratio (weight ratio) was 6, and WHSV was 16 h-1.

Hydro-upgraded oil was used as the feedstock oil, and the evaluation results were listed in the following table:

| Catalyst | C47 | C48 | C49 | C50 | D32 |
|---|---|---|---|---|---|
| Microreactive activity, wt % | 69 | 70 | 69 | 66 | 59 |
| Dry gas yield, wt % | 1.51 | 1.98 | 1.72 | 1.92 | 1.23 |
| Liquefied gas yield, wt % | 13.31 | 15.84 | 14.53 | 14.25 | 11.13 |
| C5 + Gasoline yield, wt % | 47.24 | 46.47 | 46.24 | 46.12 | 40.12 |
| Cycled oil yield, wt % | 20.44 | 19.08 | 20.06 | 20.56 | 27.31 |
| Slurry oil yield, wt % | 10.67 | 10.12 | 10.62 | 10.72 | 11.83 |
| Coke yield, wt % | 6.83 | 6.51 | 6.83 | 6.43 | 8.38 |
| Conversion rate, wt % | 68.89 | 70.8 | 69.32 | 68.72 | 60.86 |

The invention claimed is:

1. A catalytic cracking catalyst, comprising 10-70 wt % of a cracking active component, 10-60 wt % of a binder and 10-70 wt % of a clay, wherein the cracking active component comprises 5-100 wt % of a first Y molecular sieve and 0-95 wt % of a second molecular sieve;

wherein the first Y molecular sieve is obtained from a modification treatment of a molecular sieve based on crystal modification of kaolin, and has a sodium oxide content of less than 2 wt %; and wherein, based on an XRD pattern thereof, the molecular sieve based on the crystal modification of kaolin has a crystallinity calculated by a peak height method of ≥60%, and a ratio of the crystallinity by the peak height method to a crystallinity calculated by a peak area method is K1, K1=0.76-0.89; and wherein the molecular sieve based on the crystal modification of kaolin has a silica-alumina molar ratio measured with a unit cell constant a0 of 5.0-5.5, and a ratio of the silica-alumina molar ratio measured with the unit cell constant a0 to a silica-alumina molar ratio measured with a chemical method is K2, K2=0.87-0.93.

2. The catalytic cracking catalyst according to claim 1, wherein the crystallinity calculated by the peak height method is ≥80%.

3. The catalytic cracking catalyst according to claim 1, wherein the K1=0.80-0.89.

4. The catalytic cracking catalyst according to claim 1, wherein the K2=0.87-0.92.

5. The catalytic cracking catalyst according to claim 1, wherein the K1=0.77-0.88 and the K2=0.87-0.91.

6. The catalytic cracking catalyst according to claim 1, wherein the molecular sieve based on the crystal modification of kaolin has a proportion of macropores and mesopores of 10-20%.

7. The catalytic cracking catalyst according to claim 1, wherein the silica-alumina molar ratio measured with the unit cell constant a0 is 5.2-5.5.

8. The catalytic cracking catalyst according to claim 1, wherein the molecular sieve based on the crystal modification of kaolin is prepared with a process comprising the steps of:

(1) converting kaolin into metakaolin by calcining and dehydrating at 500-900° C., and pulverizing the metakaolin into metakaolin powder with a particle size of less than 10 microns;

(2) adding a directing agent, sodium silicate, a sodium hydroxide solution and water to the metakaolin powder to produce a reaction raw material A, wherein a mass ratio of the directing agent to the metakaolin is 0.01-

1.0, and the reaction raw material A has a composition by molar ratio of $Na_2O:Al_2O_3:SiO_2:H_2O=1\text{-}2.5:1:4\text{-}9:40\text{-}100$;

(3) crystallizing the reaction raw material A at 88-98° C. under stirring for 1-70 hours, adding thereto a second silicon source to obtain a reaction raw material B, wherein the second silicon source is silica comprising 0.1-10 wt % of the total amount of the added silicon, calculated as silica; and (4) crystallizing the reaction raw material B under stirring at 88-98° C. and obtaining a product.

9. The catalytic cracking catalyst according to claim 1, wherein the first Y molecular sieve has 10-20 wt % of $RE_2O_3$.

10. The catalytic cracking catalyst according to claim 1, wherein the second molecular sieve is one or more selected from HY, REY, REHY, USY, REUSY, DASY, REDASY BEA structure molecular sieve, MFI structure molecular sieve, and mordenite; the binder is one or more selected form zirconia sol, silica sol, alumina sol, acidified pseudo-boehmite, and metal-modified pseudo-boehmite; the clay is one or more selected from kaolin, montmorillonite, diatomite, halloysite, metahalloysite, saponite, rectorite, sepiolite, attapulgite, hydrotalcite, and bentonite; or the catalytic cracking catalyst contains 10-70 wt % of a cracking active component, 1-20 wt % of a silica-alumina material, 10-60 wt % of a binder and 10-70 wt % of a clay;

wherein the cracking active component comprises 25-100 wt % of a first Y molecular sieve and 0-75 wt % of a second molecular sieve; the first Y molecular sieve is a Y molecular sieve synthesized by in-situ crystallization having a sodium oxide content of less than 2 wt %; the silica-alumina material has an anhydrous chemical formula by weight of $(0\text{-}1)Na_2O\cdot(15\text{-}50)Al_2O_3\cdot(85\text{-}50)SiO_2$, a most probable pore size of 10-100 nm, a specific surface area of 150-600 m²/g, a pore volume of 0.5-1.5 mL/g, and a proportion of the pore volume of the pores having a pore diameter of greater than 10 nm to the total pore volume of 70-98%; or the catalytic cracking catalyst comprises 10-60 wt % of a cracking active component, 20-60 wt % of a binder, and 10-70 wt % of a clay; wherein the binder comprises 1-50 wt % of a zirconia sol, and 50-99 wt % of a second binder, the zirconia sol comprises 0.5-20 wt % of $ZrO_2$, a stabilizer, an alkali cation and water, wherein the molar ratio of the stabilizer to Zr is 1-6, the pH value of the zirconia sol is 1-7; the cracking active component comprises 70-100 wt % of a Y molecular sieve and 0-30 wt % of a second molecular sieve; or the catalytic cracking catalyst comprises 10-60 wt % of a cracking active component on the dry basis, 20-60 wt % of a binder on the dry basis, and 0-70 wt % of a second clay on the dry basis; wherein, based on the dry basis weight of the binder, on the dry basis, the binder comprises 1-50 wt % of a zirconia sol, 50-99 wt % of a phosphorus-aluminum inorganic binder and 0-45 wt % of a third binder; the zirconia sol comprises 0.5-20 wt % of $ZrO_2$, a stabilizer, an alkali cation and water, wherein the molar ratio of the stabilizer to Zr is 1-6, the pH value of the zirconia sol is 1-7; the phosphorus-aluminum inorganic binder contains 15-40 wt % of an aluminum source component as $Al_2O_3$, 45-80 wt % of a phosphorus component of $P_2O_5$ and 0-40 wt % of a first clay on the dry basis, and has a P/Al weight ratio of 1-6, a pH value of 1-3.5 and a solid content of 15-60 wt %; or based on the dry basis weight of the catalytic cracking catalyst, the catalytic cracking catalyst comprises 10-70 wt % of a cracking active component, 1-20 wt % of a zirconia binder, 1-20 wt % of a silica sol binder, 0-50 wt % of an alumina-based binder and 10-70 wt % of a clay, the zirconia binder is a zirconia sol, the zirconia sol comprises 0.5-20 wt % of $ZrO_2$, a stabilizer, an alkali cation and water, wherein the molar ratio of the stabilizer to Zr is 1-6, the pH value of the zirconia sol is 1-7; or the catalytic cracking catalyst comprises a molecular sieve, an alumina-based binder, a clay and a composite, based on the total amount of the catalyst, the content of the molecular sieve is 10-70 wt %, the content of the alumina-based binder is 5-30 wt %, the content of the clay is 10-70 wt %, the content of the composite is 6-50 wt %; the molecular sieve comprises a first molecular sieve and an optional second molecular sieve, based on the total amount of the molecular sieve, the content of the first molecular sieve is 70-100 wt %, the content of the second molecular sieve is 0-30 wt %; the composite comprises a zirconia sol and a silica-alumina material, the zirconia sol comprises 0.5-20 wt % of $ZrO_2$, a stabilizer, an alkali cation and water, wherein the molar ratio of the stabilizer to Zr is 1-6, the pH value of the zirconia sol is 1-7; the first molecular sieve is a Y molecular sieve, wherein the content of the rare earth element in the Y molecular sieve is 0-20 wt %; the second molecular sieve is a pentasil molecular sieve.

11. A process for preparing the catalytic cracking catalyst according to claim 1, comprising the following steps:

(1) preparing the first Y molecular sieve;

(2) making a clay, a cracking active component and a binder form a slurry, wherein the cracking active component comprises the first Y molecular sieve and an optional second molecular sieve; and (3) spray-drying the slurry obtained in step (2).

12. The process for preparing the catalytic cracking catalyst according to claim 11, wherein the process for preparing the first Y molecular sieve comprises the following steps:

S1: calcining and dehydrating kaolin at 500-900° C., and pulverizing the calcined and dehydrated kaolin to obtain a metakaolin powder;

S2: adding a directing agent, sodium silicate, a sodium hydroxide solution and water to the metakaolin powder to produce a reaction raw material A, wherein the mass ratio of the directing agent to the metakaolin is 0.01-1.0, wherein, in the reaction raw material A, the molar ratio of $Na2O:Al2O3:SiO2:H2O=1\text{-}2.5:1:4\text{-}9:40\text{-}100$;

S3: crystallizing the reaction raw material A at 88-98° C. under stirring for 1-70 hours, then supplementing a second silicon source to obtain a reaction raw material B, wherein, calculated based on both as silica, the second silicon source accounts for comprises 0.1-10 wt % of the total amount of added silicon in the reaction raw material B;

S4: crystallizing the reaction raw material B under stirring at 88-98° C. and obtaining a product; and S5: ion-exchanging the product to obtain the Y molecular sieve.

13. The catalytic cracking catalyst according to claim 8, wherein the directing agent has a composition in which $SiO2:Al2O3:Na2O:H2O=10\text{-}17:0.7\text{-}1.3:11\text{-}18:200\text{-}350$.

14. The preparation process according to claim 12, wherein the second silicon source has the sodium content as $Na_2O$ of <1 wt %.

15. The process for preparing the catalytic cracking catalyst according to claim 12, wherein the second silicon source is a solid silica gel.

16. The process for preparing the catalytic cracking catalyst according to claim 15, wherein the solid silica gel has an average pore size of 1.5-2.0 nm, or the solid silica gel has an average pore size of 4.0-5.0 nm, or the solid silica gel has an average pore size of 10.0 nm or more, or the solid silica gel has an average pore size of 0.8 nm or less.

17. The process for preparing the catalytic cracking catalyst according to claim 12, wherein the second silicon source is a liquid silica gel.

18. The process for preparing the catalytic cracking catalyst according to claim 17, wherein the liquid silica gel has the $SiO_2$ content by weight of 1-30%.

19. The process for preparing the catalytic cracking catalyst according to claim 12, wherein both as silica, the second silicon source comprises 4-10 wt % of the total amount of the added silicon.

20. The process for preparing the catalytic cracking catalyst according to claim 12, wherein the ion-exchanging in S1 is carried out in a solution comprising an ammonium salt, a rare earth salt, or both.

21. The process for preparing the catalytic cracking catalyst according to claim 12, wherein further comprising calcining the ion-exchanged product obtained from S5 to obtain the first Y molecular sieve.

22. The process for preparing the catalytic cracking catalyst according to claim 2, wherein the first Y molecular sieve has the rare earth content as $RE_2O_3$ of 10-20 wt %, and the sodium oxide content of less than 2 wt %.

23. A catalytic cracking process, comprising: contacting a hydrocarbon oil with the catalytic cracking catalyst according to claim 1 under conditions that cause a catalytic cracking reaction.

\* \* \* \* \*